US012696141B2

(12) United States Patent
Jia et al.

(10) Patent No.: US 12,696,141 B2
(45) Date of Patent: Jul. 28, 2026

(54) COMMUNICATION METHOD AND COMMUNICATION APPARATUS

(71) Applicant: HUAWEI TECHNOLOGIES CO., LTD., Shenzhen (CN)

(72) Inventors: Jianxin Jia, Shanghai (CN); Wenfu Wu, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 18/152,985

(22) Filed: Jan. 11, 2023

(65) Prior Publication Data

US 2023/0164640 A1 May 25, 2023

Related U.S. Application Data

(63) Continuation of application No. PCT/CN2021/105944, filed on Jul. 13, 2021.

(30) Foreign Application Priority Data

Jul. 13, 2020 (CN) .......................... 202010671517.9

(51) Int. Cl.
*H04W 36/00* (2009.01)
*H04W 76/30* (2018.01)

(52) U.S. Cl.
CPC ... *H04W 36/0007* (2018.08); *H04W 36/0016* (2013.01); *H04W 76/30* (2018.02)

(58) Field of Classification Search
None
See application file for complete search history.

(56) References Cited

U.S. PATENT DOCUMENTS

2007/0213081 A1    9/2007  Zhang
2023/0026061 A1*   1/2023  Liu ........................ H04W 48/16

FOREIGN PATENT DOCUMENTS

CN        1581744 A      2/2005
CN      103067865 A  *  4/2013 ............. H04L 45/16
EP        4117299 A1     1/2023
EP        4171074 A1     4/2023
JP      2010506534 A     2/2010
(Continued)

OTHER PUBLICATIONS

Australian Office Action issued in corresponding Australian Application No. 2021308253, dated Sep. 8, 2023, pp. 1-4.
(Continued)

*Primary Examiner* — Kouroush Mohebbi
(74) *Attorney, Agent, or Firm* — HAUPTMAN HAM, LLP

(57) ABSTRACT

A communication method and apparatus. A first access network device determines that a first terminal device is a last terminal device that receives data of a first multicast service via the first access network device in response to the first terminal device being in a handover preparation phase in which the first terminal device is handed over from the first access network device to a second access network device. The first access network device sends first information that is used to release a first tunnel. The first tunnel is used to transmit the data of the first multicast service between the first access network device and a core network device.

20 Claims, 18 Drawing Sheets

<u>800</u>

(56) References Cited

FOREIGN PATENT DOCUMENTS

WO          2020001253 A1     1/2020

OTHER PUBLICATIONS

3GPP TR 23. 757 V0.4.0 (Jun. 2020),"3rd Generation Partnership Project;Technical Specification Group Services and System Aspects;Study on architectural enhancements for 5G multicast-broadcast services (Release 17)",Jun. 22, 2020,p. 27-28,75-76,154-156,total 10 pages.

Japanese Office Action issued in corresponding Japanese Application No. 2023-501551, dated Jun. 25, 2024, pp. 1-7.

Japanese Office Action issued in corresponding Japanese Patent Application No. 2023-501551, dated Feb. 6, 2024, pp. 1-2.

India Office Action issued in corresponding India Patent Application No. 202327006499, dated Apr. 28, 2023, pp. 1-6.

Australian Office Action issued in corresponding Australian Application No. 2021308253, dated Sep. 4, 2024, pp. 1-3.

3rd Generation Partnership Project; Technical Specification Group Services and System Aspects; Study on architectural enhancements for 5G multicast-broadcast services (Release 17), (Jun. 22, 2020), 3GPP Draft; 23757-040, 3rd Generation Partnership Project (3GPP), Mobile Competence Centre ; 650, Route Des Lucioles ; F-06921 Sophia-Antipolis Cedex ; France, 157 pages.

ZTE, "Adding clause 7.2.5 on the shared delivery tunnel handling", vol. SA WG2, no. Electronic, Elbonia; May 17, 2021-May 28, 2021, (May 10, 2021), 3GPP Draft; S2-2104194, 3rd Generation Partnership Project (3GPP), Mobile Competence Centre ; 650, Route Des Lucioles ; F-06921 Sophia-Antipolis Cedex ; France, 3 pages.

Nokia et al, "MBS Session Management for NG-U resources setup", vol. RAN WG3, no. E-Meeting; Nov. 2, 2020-Nov. 12, 2020, (Oct. 22, 2020), 3GPP Draft; R3-206248, 3rd Generation Partnership Project (3GPP), Mobile Competence Centre ; 650, Route Des Lucioles ; F-06921 Sophia-Antipolis Cedex ; France, 10 pages.

Supplementary European Search Report issued in corresponding European U.S. Appl. No. 21/842,393, dated Nov. 3, 2023, pp. 1-3.

Huawei, HiSilicon, KI1: Update to Solution #3: Add support for UE leaving MBS, 3GPP TSG-WG SA2 Meeting #139E e-meeting S2-2003965, Elbonia, Jun. 1-12, 2020, total 3 pages.

Chinese First Office Action issued in corresponding Chinese Application No. 202010671517.9, dated May 21, 2026, pp. 1-15.

* cited by examiner

System architecture 100

Terminal device 110

Access network device 120

Session management network element 140

Access and mobility management network element 130

Service data

Multicast
service data

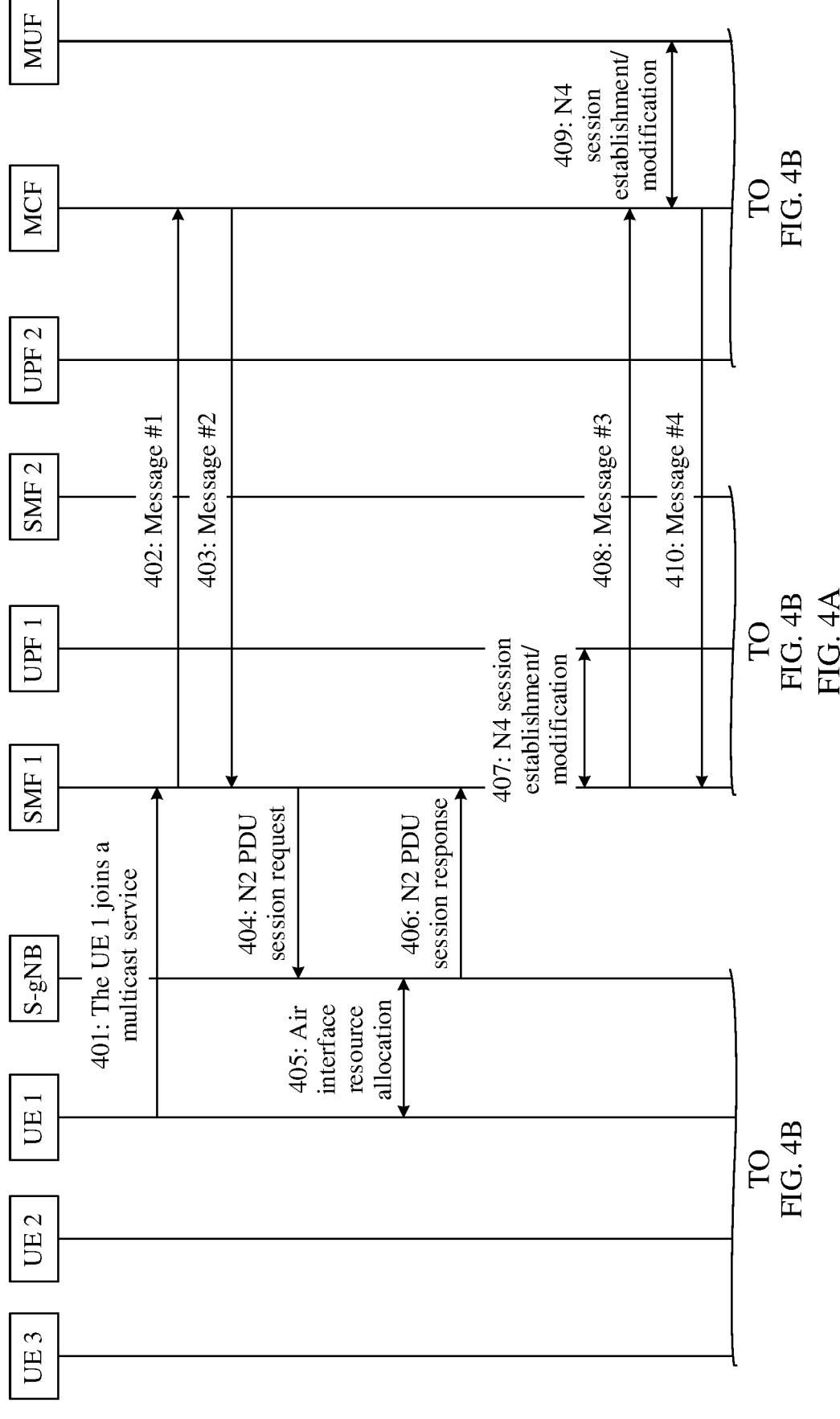

<u>600</u>

800

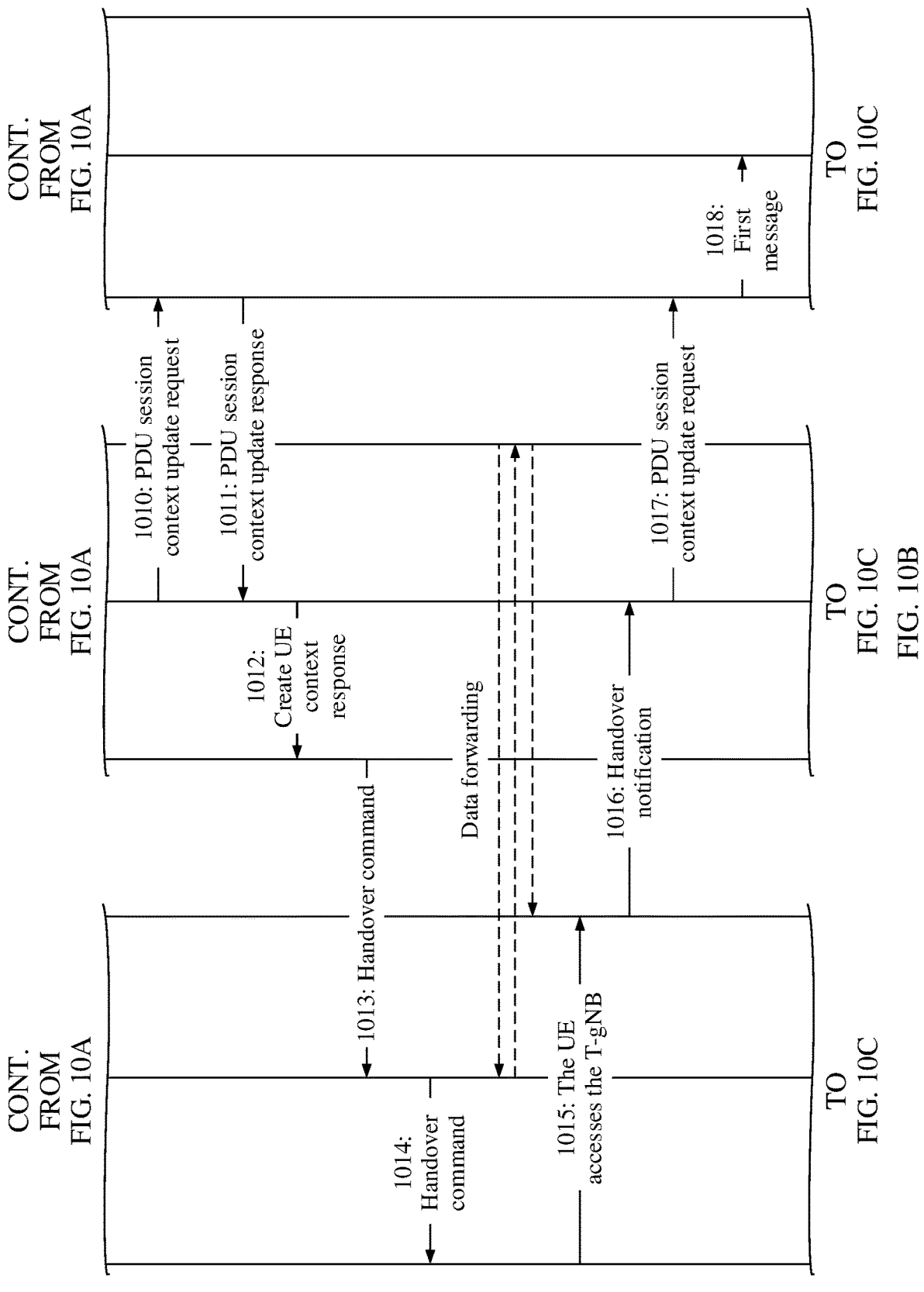

COMMUNICATION METHOD AND COMMUNICATION APPARATUS

CROSS-REFERENCE TO RELATED APPLICATIONS

This application is a continuation of International Application No. PCT/CN2021/105944, filed on Jul. 13, 2021, which claims priority to Chinese Patent Application No. 202010671517.9, filed on Jul. 13, 2020. The disclosures of the aforementioned applications are hereby incorporated by reference in their entireties.

TECHNICAL FIELD

This application relates to the communications field, and more specifically, to a communication method and a communication apparatus.

BACKGROUND

With development of a mobile internet, mobile high-definition video services are experiencing a surge. Users have gradually changed from watching hot programs on fixed televisions to watching hot programs on mobile terminals such as mobile phones. Therefore, the video services have increasingly strong impact on the mobile internet. If transmission of the video services can be optimized through air interface multicast, impact of video traffic on a mobile network is greatly reduced.

In previous generations of mobile communication technologies, for example, a 3rd generation (3G) mobile communication technology and a 4th generation (4G) mobile communication technology, it is very difficult to promote a multicast solution. For example, in the multicast solution in the previous generations of mobile communication technologies, a dedicated network element and interface that support multicast need to be added based on an existing communication architecture, and a dedicated multicast channel is further needed for support. This not only increases overheads of operators, but also increases complexity of terminals.

To overcome the foregoing difficulties, how to support a multicast/broadcast service (5G Multicast Broadcast Service, 5 MBS) based on a 5th generation (5G) mobile communication network architecture becomes a key research topic. A key issue of research of the 5MBS research topic is multicast/broadcast service session management (MBS (multicast/broadcast service) session management). For this issue of research, how to release a multicast session tunnel is a problem to be urgently resolved.

SUMMARY

Embodiments of this application provide a communication method and apparatus for a multicast service, to release a tunnel for transmitting data of the multicast service between an access network device and a core network device. This helps reduce network resource overheads.

According to a first aspect, a communication method is provided. The method includes:

A first access network device knows that a first terminal device is a last terminal device that receives data of a first multicast service via the first access network device when the first terminal device is in a handover preparation phase in which the first terminal device is handed over from the first access network device to a second access network device.

The first access network device sends first information, where the first information is used to release a first tunnel, and the first tunnel is used to transmit the data of the first multicast service between the first access network device and a core network device.

Therefore, in this embodiment of this application, the first access network device may know, when the first terminal device is in the handover preparation phase in which the first terminal device is handed over from the first access network device to the second access network device, that the first terminal device is the last terminal device that receives the data of the first multicast service via the first access network device, and send the first information to release the first tunnel used to transmit the data of the first multicast service between the first access network device and the core network device. This helps reduce network resource overheads.

For example, the first access network device may be a source access network device, and the second access network device is a target access network device.

The first multicast service may include one multicast service or a plurality of different multicast services. This is not limited.

In an example of this application, the first information may include an indication (indication) used to release the first tunnel and information about the first tunnel.

In another example of this application, the first information may include an indication (indication) used to release the first tunnel and identification information of the first multicast service.

In another example of this application, the first information may include an indication (indication) used to release the first tunnel, identification information of the first multicast service, and information about the first tunnel.

The information about the first tunnel may be used to uniquely determine the first tunnel, for example, may be a tunnel endpoint identifier (TED) of the first tunnel or an ID of the first tunnel. This is not limited herein. The identification information of the first multicast service may be used to uniquely determine a multicast service, for example, may be a multicast service ID, a multicast service name, a multicast address, or a multicast group ID. This is not limited herein.

In this embodiment of this application, the handover preparation phase may be a phase in which the source access network device, the target access network device, or the core network device (which may be an AMF, an SMF, a UPF, or the like herein, and is not limited) prepares, for the first terminal device, a resource needed by the handover. The resource needed by the handover may include a forwarding tunnel, radio bearer configuration information needed by the first terminal device to receive service data via the target access network device, an air interface resource configured by the target access network device for the first terminal device, or the like. This is not limited in this embodiment of this application.

In an example, in an Xn handover scenario, the handover preparation phase may be a process in which the source access network device receives a measurement report of the first terminal device, and makes a handover decision on the first terminal device based on the measurement report, where a decision result is handover; and the source access network device sends a handover request to the target access network device, and receives a handover request acknowledgement sent by the target access network device.

In an example, in N2 handover, the handover preparation phase may be a process in which the source access network device receives a measurement report of the first terminal device, and sends handover required to a source access and mobility management function network element based on the measurement report, and the source access and mobility management function network element receives a create UE context response from a target access and mobility management network element.

The source access network device may know, at any time point in the handover preparation phase, that the first terminal device is the last terminal device that receives the data of the first multicast service via the first access network device.

In some optional embodiments, in the handover preparation phase, when the first terminal device that has joined the first multicast service sends a measurement report to the source access network device, the source access network device makes a handover decision on the first terminal device based on the measurement report, where a decision result is handover; and the source access network device may update a quantity of terminal devices that have joined the first multicast service via the source access network device, for example, decrease the quantity of terminal devices by 1. When the quantity of terminal devices is 0, the source access network device may know that the first terminal device is the last terminal device that receives the data of the first multicast service via the first access network device.

In some optional embodiments, the quantity of terminal devices that have joined the multicast service via the source access network device may be included in a multicast context, a multicast session context, a multicast group context, or a multicast service context corresponding to a multicast service associated with a PDU session of the first terminal device.

For example, the core network device may be a multicast user plane function network element, for example, may be an MUF, an M-UPF, an MS-UPF, or an MB-UPF. This is not limited. In this case, the first tunnel may include a tunnel used to transmit the first multicast service between the source access network device and the multicast user plane function network element (such as the MUF, the M-UPF, the MS-UPF, or the MB-UPF).

For example, the core network device may be a user plane function network element, for example, may be the UPF. In this case, the first tunnel may include a tunnel used to transmit the first multicast service between the source access network device and the user plane function network element (for example, the UPF).

It should be noted that, when the core network device is the user plane function network element, the user plane function network element may include a user plane function that can be used to process the multicast service. That is, it may be considered that the user plane function that can be used to process the multicast service (for example, the MUF, the M-UPF, the MS-UPF, or the MB-UPF) may be combined with the user plane function network element into a function network element. Correspondingly, in this case, a session management function network element may include a control plane function that can be used to process the multicast service. That is, the control plane function that can be used to process the multicast service (for example, the MCF, the M-SMF, the MS-SMF, or the MB-SMF) may be combined with the session management function network element into a function network element.

With reference to the first aspect, in some implementations of the first aspect, for example, in the Xn handover scenario, that the first access network device sends first information includes:

The first access network device sends a handover request to the second access network device, where the handover request requests to hand over the first terminal device from the first access network device to the second access network device, and the handover request includes the first information.

For example, when receiving a measurement report of the first terminal device, and determining, based on the measurement report, that the first terminal device needs to be handed over to the second access network device, or determining to send a handover request to the second access network device, the first access network device may know that the first terminal device is the last terminal device that has joined the first multicast service via the first access network device. In this case, the handover request sent by the first access network device to the second access network device may carry the first information.

Correspondingly, after receiving the handover request from the first access network device, the second access network device may send a path switch request (for example, an N2 path switch request, N2 Path Switch Request) to the access and mobility management function network element (for example, an AMF), where the path switch request includes the first information. Then, the access and mobility management function network element may send a PDU session context update request (for example, an Nsmf_PDUSession_UpdateSMContext Request) to the session management function network element, where the PDU session context update request includes the first information.

Further, when the core network device is a multicast user plane function network element, after receiving the PDU session context update request, the session management function network element may send a first message to the multicast session management function network element, where the first message includes the first information. For example, the first message may be an N16 message. After receiving the first message, the multicast session management function network element may send a fifth message to the multicast user plane function network element, where the fifth message may include the first information. For example, the fifth message may be an N4 session update request. The multicast user plane function network element may obtain the first information based on the fifth message, to release the first tunnel.

When the core network device is a user plane function network element, after receiving the PDU session context update request, the session management function network element may send an N4 session update request to the user plane function network element, where the N4 session update request may include the first information. The user plane function network element may obtain the first information based on the N4 session update request, to release the first tunnel.

Therefore, in this embodiment of this application, in the Xn handover scenario, the handover request sent by the first access network device to the second access network device carries the first information, so that the first information is transmitted to the core network device, and the core network device can release the first tunnel based on the first information. Therefore, in this embodiment of this application, the first tunnel for transmitting the data of the first multicast service between the access network device and the core network device can be released in the Xn handover scenario. This helps reduce network resource overheads.

In addition, in the Xn handover scenario, the first access network device can include the first information in existing signaling (for example, the handover request), so that the first information is finally sent to the multicast user plane function network element or the user plane function network element. This helps further reduce network resource overheads.

With reference to the first aspect, in some implementations of the first aspect, for example, in the N2 handover scenario, that the first access network device sends first information includes:

The first access network device sends handover required (for example, handover required) to a first access and mobility management function network element, where the handover required includes the first information.

For example, when receiving a measurement report of the first terminal device, or determining to send the handover required to the first access and mobility management function network element, the first access network device may know that the first terminal device is the last terminal device that has joined the first multicast service via the first access network device. In this case, the handover required sent by the first access network device to the first access and mobility management function network element may include the first information. For example, the first access and mobility management function network element may be a source access and mobility management function network element.

Correspondingly, after receiving the handover required, the first access and mobility management function network element may send a create UE context request (for example, an Namf_Communication_CreateUEContext Request) to a second access and mobility management function network element, where the create UE context request includes the first information. Then, the second access and mobility management function network element sends a PDU session update context request to a session management function network element, where the PDU session update context request may include the first information. The second access and mobility management function network element may be referred to as a target access and mobility management function network element.

Further, when the core network device is a multicast user plane function network element, after receiving the PDU session context update request, the session management function network element may send a first message to the multicast session management function network element, where the first message includes the first information. For example, the first message may be an N16 message. After receiving the first message, the multicast session management function network element may send a fifth message to the multicast user plane function network element, where the fifth message may include the first information. For example, the fifth message may be an N4 session update request. Correspondingly, the multicast user plane function network element may obtain the first information based on the fifth message, to release the first tunnel. The multicast user plane function network element may alternatively release the first tunnel based on the fifth message.

When the core network device is a user plane function network element, after receiving the PDU session context update request, the session management function network element may send a session update request (for example, an N4 session update request) to the user plane function network element, where the session update request may include the first information. Correspondingly, the multicast user plane function network element may obtain the first information based on the session update request, to release the first tunnel.

Therefore, in this embodiment of this application, in the N2 handover scenario, the handover required sent by the first access network device to the first access and mobility management function network element carries the first information, so that the first information is transmitted to the core network device, and the core network device can release the first tunnel based on the first information. Therefore, in this embodiment of this application, the first tunnel for transmitting the data of the first multicast service between the access network device and the core network device can be released in the N2 handover scenario. This helps reduce network resource overheads.

In addition, in the N2 handover scenario, the first access network device can include the first information in existing signaling (for example, the handover required), so that the first information is finally sent to the multicast user plane function network element or the user plane function network element. This helps further reduce network resource overheads.

With reference to the first aspect, in some implementations of the first aspect, that the first access network device sends first information includes:

The first access network device sends a third message to a third access and mobility management function network element, where the third message includes the first information, and when the first terminal device joins the first multicast service, the third access and mobility management function network element is an access and mobility management function network element selected by the first access network device for the first multicast service.

For example, the first access network device may know, at any time point in the handover preparation phase, that the first terminal device is the last terminal device that has joined the first multicast service via the first access network device. When or after knowing that the first terminal device is the last terminal device that has joined the first multicast service via the first access network device, the first access network device may send the third message to the third access and mobility management function network element. This is not limited in this application.

Correspondingly, the third access and mobility management function network element receives the third message. Then, the third access and mobility management function network element may send a fourth message to a multicast session management function network element, where the fourth message carries the first information. For example, the fourth message may be an N11 message. After receiving the fourth message, the multicast session management function network element may send, to the multicast user plane function network element, a fifth message, which carries the first information. For example, the fifth message may be an N4 session update request. Correspondingly, the multicast user plane function network element may obtain the first information based on the fifth message, to release the first tunnel.

In some optional embodiments, the third access and mobility management function network element may alternatively be another access and mobility management function network element related to or unrelated to the first terminal device. For example, the access and mobility management function network element related to the first terminal device may be an access and mobility management function network element that can provide a non-access stratum (NAS) signaling service for the first terminal device, and the access and mobility management function network element unrelated to the first terminal device may be an access and mobility management function network element that cannot provide the NAS signaling service for the first terminal device.

In some optional embodiments, the third access and mobility management function network element may be a same network element as the foregoing source access and mobility management function network element, or may be a same network element as the foregoing target access and mobility management function network element. This is not limited in this embodiment of this application.

Therefore, in this embodiment of this application, the third message sent by the first access network device to the third access and mobility management function network element carries the first information, so that the first information is transmitted to the core network device, and the core network device can release the first tunnel based on the first information. Therefore, in this embodiment of this application, the first tunnel for transmitting the data of the first multicast service between the access network device and the core network device can be released. This helps reduce network resource overheads.

According to a second aspect, a communication method is provided. The method includes:

A second access network device receives a handover request from a first access network device, where the handover request requests to hand over a first terminal device from the first access network device to the second access network device, the handover request includes first information, the first information is used to release a first tunnel, and the first tunnel is used to transmit data of a first multicast service between the first access network device and a core network device.

The second access network device sends a path switch request to an access and mobility management function network element, where the path switch request includes the first information.

According to a third aspect, a communication method is provided. The method includes:

An access and mobility management function network element receives a path switch request from a second access network device, where the path switch request includes first information, the first information is used to release a first tunnel, and the first tunnel is used to transmit data of a first multicast service between a first access network device and a core network device.

The access and mobility management function network element sends a protocol data unit PDU session context update request to a session management function network element, where the PDU session context update request includes the first information.

According to a fourth aspect, a communication method is provided. The method includes:

A session management function network element receives a protocol data unit PDU session context update request from an access and mobility management function network element, where the PDU session context update request includes first information, the first information is used to release a first tunnel, and the first tunnel is used to transmit data of a first multicast service between a first access network device and a core network device.

The session management function network element sends a first message to a multicast session management function network element, where the first message includes the first information.

With reference to the fourth aspect, in some possible implementations of the fourth aspect, the first message is an N16 message.

According to a fifth aspect, a communication method is provided. The method includes:

A session management function network element receives a protocol data unit PDU session context update request from an access and mobility management function network element, where the PDU session context update request includes first information, the first information is used to release a first tunnel, and the first tunnel is used to transmit data of a first multicast service between a first access network device and a core network device.

The session management function network element sends a session update request to a user plane function network element, where the session update request includes the first information.

According to a sixth aspect, a communication method is provided. The method includes:

A multicast session management function network element receives a first message from a session management function network element, where the first message includes first information, the first information is used to release a first tunnel, and the first tunnel is used to transmit data of a first multicast service between a first access network device and a core network device.

The multicast session management function network element sends a fifth message to a multicast user plane function network element, where the fifth message includes the first information.

With reference to the sixth aspect, in some possible implementations of the sixth aspect, the first message is an N16 message.

With reference to the sixth aspect, in some possible implementations of the sixth aspect, the fifth message is an N4 session update request.

According to a seventh aspect, a communication method is provided. The method includes:

A first access and mobility management function network element receives handover required from a first access network device, where the handover required includes first information, the first information is used to release a first tunnel, and the first tunnel is used to transmit data of a first multicast service between the first access network device and a core network device.

The first access and mobility management function network element sends a create user equipment UE context request to a second access and mobility management function network element, where the create UE context request includes the first information.

According to an eighth aspect, a communication method is provided. The method includes:

A second access and mobility management function network element receives a create user equipment UE context request from a first access and mobility management function network element, where the create UE context request includes first information, the first information is used to release a first tunnel, and the first tunnel is used to transmit data of a first multicast service between a first access network device and a core network device.

The second access and mobility management function network element sends a protocol data unit PDU session context update request to a session management function network element, where the PDU session context update request includes the first information.

According to a ninth aspect, a communication method is provided, including:

A third access and mobility management function network element receives a third message from a first access network device, where the third message includes first information, the first information is used to release a first tunnel, the first tunnel is used to transmit data of a first multicast service between the first access network device and a core network device, and when a first terminal device joins the first multicast service, the third access and mobility management function network element is an access and mobility management function network element selected by the first access network device for the first multicast service.

The third access and mobility management function network element sends a fourth message to a multicast session management function network element, where the fourth message includes the first information.

With reference to the ninth aspect, in some possible implementations of the ninth aspect, the third message is an N2 message.

According to a tenth aspect, a communication method is provided, including:

A multicast session management function network element receives a fourth message from a third access and mobility management function network element, where the fourth message includes first information, the first information is used to release a first tunnel, the first tunnel is used to transmit data of a first multicast service between a first access network device and a core network device, and when a first terminal device joins the first multicast service, the third access and mobility management function network element is an access and mobility management function network element selected by the first access network device for the first multicast service.

The multicast session management function network element sends a fifth message to a multicast user plane function network element, where the fifth message includes the first information.

With reference to the tenth aspect, in some possible implementations of the tenth aspect, the fifth message is an N4 session update request.

With reference to the ninth aspect or the tenth aspect, in some possible implementations of the ninth aspect or the tenth aspect, the fourth message is an N11 message.

According to an eleventh aspect, a communication method is provided. The method includes:

A multicast user plane function network element receives a fifth message from a multicast session management function network element, where the fifth message includes first information, the first information is used to release a first tunnel, and the first tunnel is used to transmit data of a first multicast service between a first access network device and a core network device.

The multicast user plane function network element releases the first tunnel based on the first information.

According to a twelfth aspect, a communication method is provided. The method includes:

A user plane function network element receives a session update request from a session management network element, where the session update request includes first information, the first information is used to release a first tunnel, and the first tunnel is used to transmit data of a first multicast service between a first access network device and a core network device.

The user plane function network element releases the first tunnel based on the first information.

With reference to the eleventh aspect or the twelfth aspect, in some possible implementations of the eleventh aspect or the twelfth aspect, the first tunnel may be released by removing a related resource of the first tunnel, for example, a tunnel endpoint identifier.

With reference to the eleventh aspect or the twelfth aspect, in some possible implementations of the eleventh aspect or the twelfth aspect, the first information includes an indication used to release the first tunnel and information about the first tunnel.

The releasing the first tunnel includes: releasing the first tunnel based on the indication used to release the first tunnel and the information about the first tunnel.

In this way, the multicast user plane function network element or the user plane function network element can release the first tunnel (for example, may be one or more first tunnels, which are not limited) corresponding to the information about the first tunnel included in the first information.

With reference to the eleventh aspect or the twelfth aspect, in some possible implementations of the eleventh aspect or the twelfth aspect, the first information includes an indication used to release the first tunnel and identification information of the first multicast service.

The releasing the first tunnel includes:

determining the first multicast service based on the identification information of the first multicast service;

determining the first tunnel for transmitting the data of the first multicast service between the first access network device and the core network device; and releasing the first tunnel based on the indication used to release the first tunnel.

In this way, the multicast session function network element or the session function network element may release all multicast session tunnels corresponding to the first multicast service indicated in the first information, namely, the first tunnels (for example, all the first tunnels) used to transmit the data of the first multicast service between a source access network device and the core network device.

With reference to the eleventh aspect or the twelfth aspect, in some possible implementations of the eleventh aspect or the twelfth aspect, the first information includes an indication used to release the first tunnel, identification information of the first multicast service, and information about the first tunnel.

The releasing the first tunnel includes:

determining the first multicast service based on the identification information of the first multicast service;

determining, based on the information about the first tunnel, the first tunnel from tunnels for transmitting the data of the first multicast service between the first access network device and the core network device; and releasing the first tunnel based on the indication used to release the first tunnel.

In this way, the multicast user plane function network element or the user plane function network element can release the first tunnel corresponding to the information about the first tunnel included in the first information. In addition, when the first tunnel is determined based on both the identification information of the first multicast service and the information about the first tunnel, the first tunnel needs to be determined only from one or more multicast session tunnels corresponding to the first multicast service. This helps determine the first tunnel more accurately and quickly, and improve efficiency of releasing the first tunnel.

It should be understood that for beneficial effects achieved in the second aspect to the twelfth aspect and the corresponding implementations of this application, refer to beneficial effects achieved in the first aspect and the corresponding implementations of this application. Details are not described again.

According to a thirteenth aspect, a communication apparatus is provided. The apparatus includes a module or a unit configured to perform the communication method according to any one of the first aspect to the twelfth aspect or the possible implementations of any one of the first aspect to the twelfth aspect.

According to a fourteenth aspect, a communication apparatus is provided. The apparatus includes a processor, and the processor is configured to invoke a computer program from a memory and run the computer program, to perform the communication method according to any one of the first aspect to the twelfth aspect or the possible implementations of any one of the first aspect to the twelfth aspect.

Optionally, the communication apparatus may further include the memory, and the memory is configured to store the program executed by the processor.

The communication apparatus may be, for example, an access network device, an access and mobility management function network element, a session management function network element, a multicast session management function network element, or a multicast user plane function network element.

According to a fifteenth aspect, a chip is provided. The chip includes a processor and a communication interface. The communication interface is configured to communicate with an external device or an internal device. The processor is configured to implement the method according to any one of the first aspect to the twelfth aspect or the possible implementations of any one of the first aspect to the twelfth aspect.

Optionally, the chip may further include a memory. The memory stores instructions. The processor is configured to execute the instructions stored in the memory or other instructions. When the instructions are executed, the processor is configured to implement the method according to any one of the first aspect to the twelfth aspect or the possible implementations of the first aspect to the twelfth aspect.

Optionally, the chip may be integrated into an access network device, an access and mobility management function network element, a session management function network element, a multicast session management function network element, or a multicast user plane function network element.

According to a sixteenth aspect, a computer-readable storage medium is provided. The computer-readable storage medium stores program code to be executed by a synchronization apparatus, and the program code includes instructions used to implement the method according to any one of the first aspect to the twelfth aspect or the possible implementations of any one of the first aspect to the twelfth aspect.

According to a seventeenth aspect, a computer program product including instructions is provided. When the computer program product runs on a computer, the computer is enabled to perform the method according to any one of the first aspect to the twelfth aspect or the possible implementations of any one of the first aspect to the twelfth aspect.

According to an eighteenth aspect, a communication system is provided, including an apparatus configured to perform the method according to any one of the first aspect or the possible implementations of the first aspect, an apparatus configured to perform the method according to the second aspect, the third aspect, and the fourth aspect, and an apparatus configured to perform the method according to any one of the eleventh aspect or the possible implementations of the eleventh aspect.

According to a nineteenth aspect, a communication system is provided, including an apparatus configured to perform the method according to any one of the first aspect or the possible implementations of the first aspect, an apparatus configured to perform the method according to the second aspect, the third aspect, the fifth aspect, and the sixth aspect, and an apparatus configured to perform the method according to any one of the twelfth aspect or the possible implementations of the twelfth aspect.

According to a twentieth aspect, a communication system is provided, including an apparatus configured to perform the method according to any one of the first aspect or the possible implementations of the first aspect, an apparatus configured to perform the method according to the seventh aspect, the eighth aspect, and the fourth aspect, and an apparatus configured to perform the method according to any one of the eleventh aspect or the possible implementations of the eleventh aspect.

According to a twenty-first aspect, a communication system is provided, including an apparatus configured to perform the method according to any one of the first aspect or the possible implementations of the first aspect, an apparatus configured to perform the method according to the seventh aspect, the eighth aspect, the fifth aspect, and the sixth aspect, and an apparatus configured to perform the method according to any one of the twelfth aspect or the possible implementations of the twelfth aspect.

According to a twenty-second aspect, a communication system is provided, including an apparatus configured to perform the method according to any one of the first aspect or the possible implementations of the first aspect, an apparatus configured to perform the method according to the ninth aspect and the tenth aspect, and an apparatus configured to perform the method according to any one of the eleventh aspect or the possible implementations of the eleventh aspect.

BRIEF DESCRIPTION OF DRAWINGS

FIG. 4A to FIG. 4C are a schematic flowchart in which a terminal device joins a multicast service;

FIG. 10A to FIG. 10C are a specific example of another communication method according to an embodiment of this application;

DESCRIPTION OF EMBODIMENTS

The following describes technical solutions of this application with reference to the accompanying drawings.

The technical solutions of embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, a system architecture evolution (SAE) system, an LTE frequency division duplex FDD) system, LTE time division duplex (TDD), a universal mobile telecommunications system (UMTS), a worldwide interoperability for microwave access (WiMAX) communication system, a 5th generation (5G) system or a new radio (NR), and a subsequent evolved communication system.

Figures 1, 2:
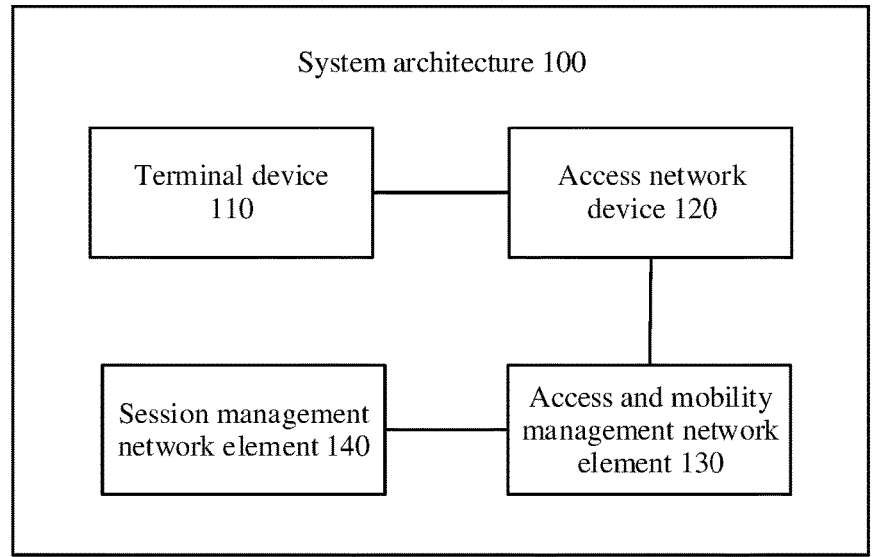
FIG. 1 is a schematic diagram of a system architecture according to an embodiment of this application.
FIG. 2 is a schematic diagram of another system architecture according to an embodiment of this application.

FIG. 1 is a schematic diagram of a communication system according to an embodiment of this application. In FIG. 1, an access network device, a core network device, and a terminal device are included. The terminal device is connected to the access network device, and the access network device is connected to the core network device, so that the terminal device can communicate with the core network device by using the access network device.

The terminal device in embodiments of this application may also be referred to as a user equipment (user equipment, UE), a mobile station (mobile station, MS), a mobile terminal (mobile terminal, MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/ data connectivity for a user, for example, a handheld device having a wireless connection function or an on-board device. Currently, some terminals may be, for example, a mobile phone, a tablet computer, a laptop computer, a palmtop, a mobile internet device (MID), a wearable device, a virtual reality (VR) device, an augmented reality (AR) device, a wireless terminal in industrial control, a wireless terminal in selfdriving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, an on-board device, a wearable device, a terminal device in a 5G network, or a terminal device in an evolved public land mobile network (PLMN). This is not limited in embodiments of this application.

By way of example, and not limitation, in embodiments of this application, the wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the terminal device may alternatively be a terminal device in an internet of things (IoT) system. IoT is an important part of future development of information technologies. A main technical feature of the IoT is connecting things to a network by using a communication technology, to implement an intelligent network for human-machine interconnection and thing-thing interconnection.

If the various terminal devices described above are located in a vehicle (for example, placed in the vehicle or installed in the vehicle), the terminal devices may be all considered as on-board terminal devices. For example, the on-board terminal devices are also referred to as on-board units (OBUs).

In embodiments of this application, the terminal device may further include a relay (relay). Alternatively, it is understood as that any device that can perform data communication with a base station may be considered as a terminal device.

The access network device in embodiments of this application may be a device configured to communicate with the terminal device. The access network device may alternatively be referred to as an access device or a radio access network device, and may be an evolved NodeB (eNB or eNodeB) in an LTE system, or may be a radio controller in a cloud radio access network (CRAN) scenario. Alternatively, the access device may be a relay station, an access point, an on-board device, a wearable device, an access device in a 5G network, a network device in a future evolved PLMN network, or the like. The access device may be an access point (AP) in a WLAN, or may be a gNB in a new radio (NR) system. This is not limited in embodiments of this application.

In addition, in embodiments of this application, the access network device is a device in a RAN, in other words, is a RAN node that connects the terminal device to a wireless network. For example, by way of example, but not limitation, the access network device may be, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). In a network structure, the network device may include a central unit (CU) node, a distributed unit (DU) node, a RAN device including a CU node and a DU node, or a RAN device including a control plane CU node (CU-CP node), a user plane CU node (CU-UP node), and a DU node.

The access network device provides a service for a cell. The terminal device communicates with the access network device by using a transmission resource (for example, a frequency domain resource, or in other words, a spectrum resource) used for the cell. The cell may be a cell corresponding to the access network device (for example, a base station), and the cell may belong to a macro base station, or may belong to a base station corresponding to a small cell. The small cell herein may include: a metro cell, a micro cell, a pico cell, a femto cell, and the like. These small cells have features of small coverage and low transmit power, and are suitable for providing a high-rate data transmission service.

For ease of understanding embodiments of this application, a communication system applicable to embodiments of this application is first described in detail with reference to FIG. 1. As shown in FIG. 1, the system architecture 100 includes: a terminal device 110, an access network device 120, an access and mobility management function network element 130, and a session management function network element 140.

The access and mobility management function network element 130 and the session management function network element 140 are core network devices. For example, the terminal device 110 may access a core network by using the access network device 120, to implement data transmission. The access and mobility management function network element 130 may receive, from the access network device, a request for joining the terminal device 110 to a multicast service, and request the session management function network element 140 to join the terminal device 110 to the multicast service. The session management function network element 140 may create a corresponding multicast session tunnel for the terminal device 110, and join the terminal device 110 to the multicast service, to transmit a data stream of the multicast service to the terminal device 110.

The system architecture 100 may be configured to perform a multicast service transmission method in embodiments of this application.

Because the multicast service transmission method in this application is mainly based on a 5G mobile communication technology and another future mobile communication technology, the following describes another system architecture: a 5G system architecture in embodiments of this application with reference to FIG. 2.

It should be noted that a multicast service solution in this application may be applied to a broadcast service.

FIG. 2 shows another system architecture 200 according to an embodiment of this application. As shown in FIG. 2, the system architecture 200 may specifically include the following network elements:

1. User equipment UE.

2. (Radio) access network ((R)AN): It is used to provide a network access function for an authorized user in a specific area, and can use transmission tunnels with different quality based on user levels, service requirements, and the like. A (R)AN network element can manage radio resources and provide an access service for a terminal device, to complete forwarding of a control signal and user data between the terminal device and a core network. The (R)AN may also be understood as a base station in a conventional network.

3. Access and mobility management function (AMF): It is mainly used for mobility management, access management, and the like. Specifically, the AMF may be configured to implement a function other than session management in functions of a mobility management entity (MME), for example, a function such as lawful interception or access authorization (or authentication).

4. Session management function (SMF): It is mainly used for session management, internet protocol (IP) address assignment and management of a terminal device, manageable user plane function selection, a termination point of a policy control or charging function interface, a downlink data notification, and the like.

It should be understood that, in the system architecture 100, the terminal device 110 may be the UE in FIG. 2, the access network device 120 may be the RAN in FIG. 2, the access and mobility management function network element 130 may be the AMF in FIG. 2, and the session management function network element 140 may be the SMF in FIG. 2. This is not limited.

Optionally, the system architecture 200 may further include:

5. User plane function (UPF): It may also be referred to as a user plane function network element, and is used for packet routing and forwarding, quality of service (QoS) processing of user plane data, and the like. The UPF is specifically classified into an intermediate-UPF (I-UPF) and an anchor UPF (PSA).

6. Data network (DN): It is used to provide a network for transmitting data, for example, an internet network. In the architecture in this embodiment of this application, the PSA accesses a remote DN, and an L-PSA may access a local DN.

7. Authentication server function (AUSF): It is mainly used for user authentication and the like.

8. Policy control function (PCF): It is a unified policy framework used for guiding network behavior, and provides policy rule information and the like for a control plane function network element (for example, an AMF or SMF network element).

9. Unified data management (UDM): It is used for user identifier processing, access authentication, registration, mobility management, or the like.

10. Application function (AF): It mainly supports interaction with a 3rd generation partnership project (3GPP) core network to provide a service, for example, affects a data routing decision or a policy control function, or provides some third-party services for a network side. The AF may be understood as a third-party server, for example, an application server in the internet, provides related service information, including providing quality of service requirement information corresponding to a service to the PCF, and sending user plane data information of the service to a PSA-UPF. The AF may be a content provider (CP).

11. Network slice selection function (NSSF): It is used for network slice selection.

In the system architecture 200, an N1 interface is a reference point between the terminal device and the AMF; an N2 interface is a reference point between the (R)AN and the AMF, and is configured to send a non-access stratum (NAS) message and the like; an N3 interface is a reference point between the (R)AN and the I-UPF, and is configured to transmit user plane data and the like; an N4 interface is a reference point between the SMF and the I-UPF, and is configured to transmit information such as tunnel identifier information of an N3 connection, data buffer indication information, and a downlink data notification message; an N5 interface is a reference point between the PCF and the AF; an N6 interface is a reference point between the UPF and the DN, and is used to transmit user plane data and the like; an N7 interface is a reference point between the SMF and the PCF; an N8 interface is a reference point between the AMF and the UDM; an N9 interface is a reference point between UPFs; an N10 interface is a reference point between the SMF and the UDM; an N11 interface is a reference point between the AMF and the SMF; an N12 interface is a reference point between the AMF and the AUSF; and an N22 interface is a reference point between the AMF and the NSSF.

Optionally, the system architecture 200 may further include:

12. Multicast control plane function (MCF): It is also referred to as a multicast session management function (M-SMF), a multicast service session management function (MS-SMF), or a multicast/broadcast session management function (MB-SMF), and is a control plane function that can be used to process a multicast service, for example, to interconnect the MCF, the M-SMF, or the MB-SMF with the PCF, to create resources for the multicast service. It should be noted herein that in a 5G network, the MCF, M-SMF, MS-SMF, or MB-SMF network element may alternatively have another name, and implement the control plane function for the multicast service. It should be noted herein that, as described above, "multicast" in this application is a concept in a broad sense, and may include multicast or broadcast. That is, embodiments of this application may be applied to both multicast service transmission and broadcast service transmission. "Multicast" mentioned in this application may be replaced with "multicast or broadcast". Therefore, the multicast control plane function (MCF), the multicast session management function (M-SMF), the multicast service session management function (MS-SMF), and the multicast/broadcast session management function (MB-SMF) have a same meaning and may be replaced with each other. This is not limited herein.

13. Multicast user plane function (MUF): It is also referred to as a multicast user plane function (M-UPF), a multicast service user plane function (MS-UPF), or a multicast/broadcast user plane function (MB-UPF), and is a user plane function that can be used to process the multicast service, for example, to transfer multicast service data. It should be noted herein that in the 5G network, the MUF, M-UPF, MS-UPF, or MB-UPF network element may alternatively have another name, and implement the user plane function for the multicast service. It should be noted herein that, as described above, "multicast" in this application is a concept in a broad sense, and may include multicast or broadcast. That is, embodiments of this application may be applied to both multicast service transmission and broadcast service transmission. "Multicast" mentioned in this application may be replaced with "multicast or broadcast". Therefore, the multicast user plane function (MUF), the multicast user plane function (M-UPF), the multicast service session management (MS-UPF), and the multicast/broadcast session management (MB-UPF) have a same meaning and may be replaced with each other. This is not limited herein.

In the system architecture 200, the MCF, the M-SMF, the MS-SMF, or the MB-SMF may be integrated into the PCF (or the SMF or an NEF), and the MUF, the M-UPF, the MS-UPF, or the MB-UPF may be integrated into the UPF. This is not limited in this embodiment of this application.

It should be understood that the foregoing system architecture 200 applied to this embodiment of this application is merely an example of a network architecture described from a perspective of a reference point architecture, and a network architecture applicable to this embodiment of this application is not limited thereto. Any network architecture that can implement functions of the foregoing network elements is applicable to this embodiment of this application.

It should be noted that, names of interfaces between the foregoing network elements in FIG. 2 are merely examples, and the interfaces may have other names during specific implementation. This is not specifically limited in this embodiment of this application.

It should be noted that, names of the network elements (such as the SMF, the AF, and the UPF) included in FIG. 2 are also merely examples, and do not constitute any limitation on functions of the network elements. In the 5G network and another future network, the foregoing network elements may alternatively have other names. This is not specifically limited in this embodiment of this application. For example, in a 6th generation (6G) network, some or all of the foregoing network elements may still use terms in 5G, or may have other names. A general description is provided herein. Details are not described again below. In addition, it should be understood that, names of messages (or signaling) transmitted between the foregoing network elements are merely examples, and do not constitute any limitation on functions of the messages.

To facilitate understanding of embodiments of this application, the following first briefly describes terms used in this application.

1. Multicast and Unicast

Unicast may be understood as "point to point" communication. Unicast has a plurality of meanings, which are specifically as follows:

At a service layer, a unicast service means that data of the service is sent to a specific terminal device.

Unicast between network elements means that there is a unicast tunnel between a source network element and a target network element (that is, an IP address of the target network element is a unicast IP address).

For an air interface, an air interface unicast mode means that a radio access network sends service data to a single terminal device.

At a core network service layer, unicast means that service data is sent to a terminal device by using a protocol data unit (PDU) session.

In this application document, a unicast manner in sending manners determined by an SMF means sending data of a multicast service to a terminal device by using a PDU session.

Multicast may be referred to as "groupcast", and may be understood as "point to multipoint" (PTM) communication. Multicast has a plurality of meanings, which are specifically as follows:

At a service layer, a multicast service means that data of the service is sent to a plurality of terminal devices.

Multicast between network elements means that there is a multicast tunnel between a source network element and a target network element (that is, an IP address of the target network element is a multicast IP address).

For an air interface, an air interface multicast mode means that a plurality of terminal devices may receive, at the same time or on a same frequency, one piece of service data sent by a radio access network.

At a core network service layer, multicast means sending data of a multicast service to a terminal device by using a multicast session. The multicast session includes: a unicast tunnel or a multicast tunnel between network elements, and an air interface radio bearer in a unicast mode or an air interface radio bearer in a multicast mode.

In embodiments of this application, a multicast manner in sending manners determined by an SMF means sending data of a multicast service to a terminal device by using a multicast session.

In a multicast manner, service data may be transmitted to all target nodes at a time, or service data may be transmitted only to a specific object. Therefore, in the multicast manner, point to multipoint transmission may be implemented between one sending node and a plurality of reception nodes. This resolves a problem of low efficiency of a unicast manner.

It should be noted that a broadcast service may be sent to a terminal device by using a multicast session. This is not limited in embodiments of this application. "Multicast" in this application is a concept in a broad sense, and may include multicast or broadcast. That is, embodiments of this application may be applied to both multicast service transmission and broadcast service transmission. "Multicast" mentioned in this application may be replaced with "multicast or broadcast".

Figure 3A:
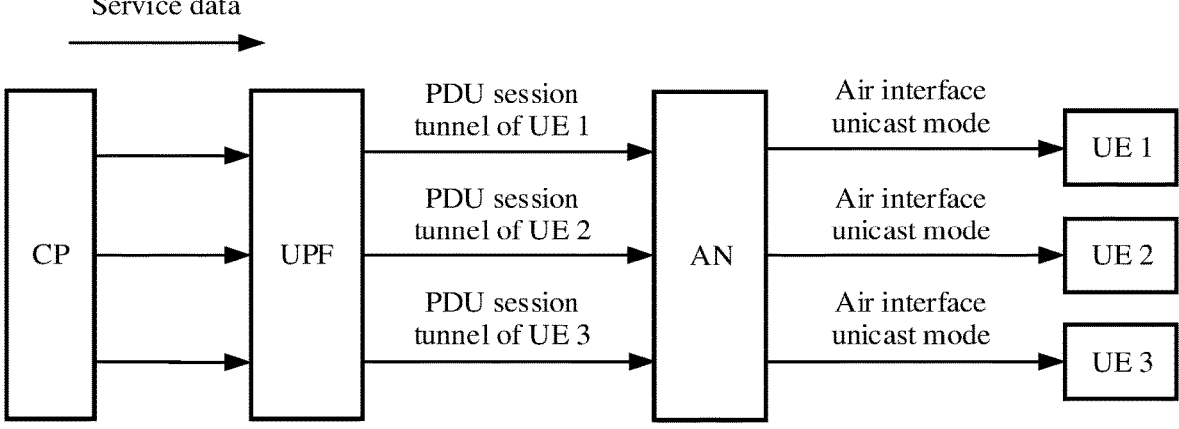
FIG. 3A is a schematic diagram of transmitting service data according to an embodiment of this application.

FIG. 3A is a schematic diagram of transmitting service data according to an embodiment of this application. The schematic diagram shown in FIG. 3A may be used to transmit multicast service data (in a unicast manner), and may further be used to transmit unicast service data. In FIG. 3A, each of three UEs respectively corresponds to a different PDU session. Three different pieces of service data sent by a CP may be sent to the UEs by using respective corresponding PDU sessions. Specifically, a service transmission path between the CP and an AN may include a transmission path between the CP and a UPF and a transmission path between the UPF and the AN. The transmission path between the UPF and the AN may be referred to as a PDU session tunnel, and different PDU sessions have different PDU session tunnels. Three PDU session tunnels in this schematic diagram respectively correspond to the three UEs. On an air interface, the AN may separately send the service data to a UE 1, a UE 2, and a UE 3 in a unicast manner, namely, a PTP manner. In the schematic diagram, the service data of the UEs may be different (for example, target addresses are IP addresses of the UEs), and the service data of the UEs may be respectively sent to the UEs through independent transmission paths of the UEs.

Figure 3B:
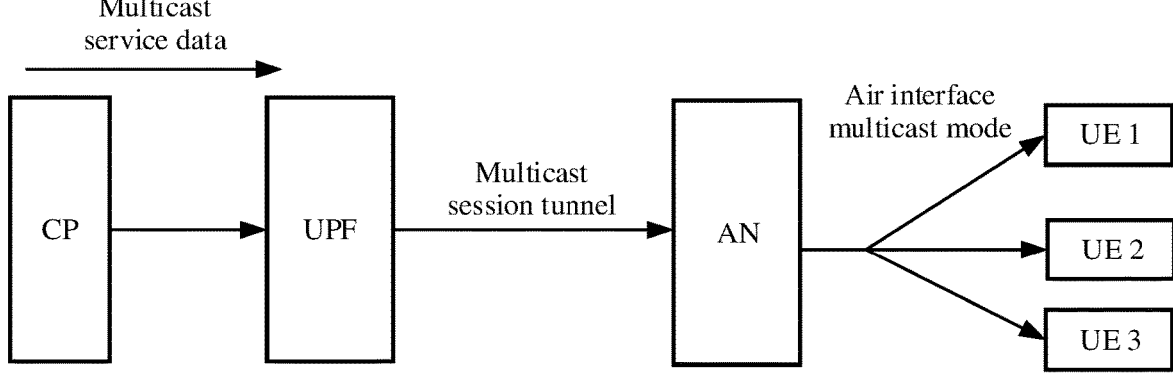
FIG. 3B is a schematic diagram of transmitting another service data according to an embodiment of this application.

FIG. 3B is a schematic diagram of transmitting another service data according to an embodiment of this application. The schematic diagram shown in FIG. 3B is used to transmit multicast service data. In FIG. 3B, the multicast service data may be sent from a CP to a UE 1, a UE 2, and a UE 3. A multicast service transmission path between the CP and an AN may include a transmission path between the CP and a UPF and a transmission path between the UPF and the AN. The transmission path between the UPF and the AN may use a tunnel to transmit the multicast service data, for example, use a tunnel according to the general tunnel protocol (GTP). Therefore, the transmission path between the UPF and the AN may be referred to as a multicast session tunnel, and the multicast session tunnel is shared by the UE 1, the UE 2, and the UE 3. On an air interface, the AN may send the multicast service data to the UE 1, the UE 2, and the UE 3 in a PTM manner. In other words, only one piece of data needs to be sent, and all the three UEs can receive the data. In the schematic diagram, only one piece of multicast service data is sent on a transmission path from the CP to the UE, and a plurality of UEs may receive the multicast service data at the same time.

In this application, both the multicast session tunnel and a PDU session tunnel are tunnels between a user plane network element (for example, a UPF) and an access network AN (for example, a base station). The multicast session tunnel may be used to transmit a multicast QoS flow of a multicast service, and the PDU session tunnel may be used to transmit a unicast QoS flow of a unicast service, and may further be used to transmit a unicast QoS flow corresponding to the multicast QoS flow of the multicast service.

It should be understood that the multicast QoS flow is transmitted between the UPF and a gNB 1, and data received by each UE may be referred to as multicast service data after being processed by a service data adaptation protocol (SDAP) layer, a packet data convergence protocol (PDCP) layer, a radio link control (RLC) layer, a media access control (MAC) layer, and a physical (PHY) layer of the gNB 1.

2. Multicast Service, Multicast Service Flow, and Multicast Quality of Service (QoS) Flow The multicast service may include one or more multicast service flows, which are indicated by information about the multicast service. The information about the multicast service includes at least description information of the multicast service. The description information of the multicast service may include description information of the one or more multicast service flows. The description information of the multicast service flow includes at least one of the following: a quality of service index (QFI) that the multicast service flow needs to have, feature information of the multicast service flow (such as a multicast address, a target port number, and a source address of the multicast service), and a QoS requirement (such as jitter, a delay, a packet loss rate, and bandwidth) of the multicast service flow. The QoS requirement of the multicast service flow is used to establish a multicast QoS flow. One multicast session may include one or more multicast QoS flows. In other words, the multicast service may be transmitted by using one or more multicast QoS flows in a multicast session tunnel in which the multicast session is located.

It should be understood that a PDU session is at a UE level, and the multicast session is at a service level. One PDU session of one UE may be associated with a plurality of multicast sessions. To be specific, the PDU session of the UE may join a plurality of multicast services. One multicast service may be served by one multicast session. One multicast session includes a unicast or multicast tunnel from a data network to a core network and then to a radio access network, and a unicast or multicast air interface resource that is allocated by the radio access network and that is used to send the multicast service.

In addition to the description information of the multicast service, the multicast service information may further include information about the terminal device, for example, may include an identifier of one or more terminal devices that are allowed (or request) to join the multicast service, an identifier of a terminal device group, and the like.

A globally unique multicast service identifier (multicast ID, MCID) may be allocated to one multicast service, and the MCID may uniquely identify the multicast service in a PLMN. It should be understood that the English name MCID is not limited in this application, and the MCID may alternatively be replaced with another name, but a function of the MCID is to uniquely identify a multicast service. For example, the MCF shown in FIG. 2 may obtain information about a multicast service from the CP, and then send the obtained information about the multicast service to the PCF, and the PCF may generate a policy and charging control (PCC) rule based on the information about the multicast service. If the information about the multicast service may be applied to all terminal devices, the generated PCC rule may also be applied to all the terminal devices. Otherwise, the generated PCC rule may be related to one or more terminal devices related to the multicast service. Optionally, if the MCF allocates an MCID to the multicast service, the MCF may send the MCID and the information about the multicast service together to the PCF. Correspondingly, the PCC rule generated by the PCF for the multicast service may also include the MCID. Alternatively, the MCF does not allocate the MCID to the multicast service, the PCF allocates the MCID, and the PCF may send, to the MCF by using a response message, the MCID allocated to the multicast service.

3. Multicast Capability of an Access Network Device

Based on the related descriptions of unicast and multicast, in this embodiment of this application, that the access network device supports a multicast function may be understood as that the access network device supports sending the multicast service data to the terminal device in a PTM data sending manner, and that the access network device does not support the multicast function may be understood as that the access network device does not support sending the multicast service data to the terminal device in the PTM data sending manner. The access network device that does not support the multicast function may send, by using the PDU session, the multicast service that the terminal device has joined. The access network device that supports the multicast function may receive multicast service data from a core network through the multicast session tunnel, and send the multicast service data to a plurality of terminal devices that have joined the multicast service.

4. PDU Session of a Handed-Over Terminal Device

When the terminal device is handed over from a source access network device to a target access network device, a PDU session of the terminal device needs to be handed over from the source access network device to the target access network device. In this case, the PDU session may be referred to as the PDU session of the handed-over terminal device.

In this embodiment of this application, that the PDU session is associated with a multicast service may be understood as that a context of the PDU session is associated with the multicast service. Specifically, at the source access network device, the terminal device may apply to join the multicast service through a user plane or a control plane of the PDU session. Optionally, the terminal device may associate the PDU session with the multicast service by storing identification information of the multicast service in the context of the PDU session. For example, if the terminal device joins through the user plane of the PDU session to watch CCTV 1, the PDU session is associated with one multicast service. If the terminal device also joins to watch CCTV 10, the PDU session is further associated with one multicast service. For the source access network device that supports a multicast function, after the terminal device joins the multicast service through the user plane or the control plane of the PDU session, the multicast service may be transmitted to the source access network device through a multicast session tunnel by using a multicast QoS flow, and the source access network device may send the multicast service data to the terminal device in an air interface point-to-point manner or an air interface point-to-multipoint manner. For the source access network device that does not support a multicast function, after the terminal device joins the multicast service through the user plane or the control plane of the PDU session, the multicast service is transmitted to the source access network device through the PDU session tunnel by using a unicast QoS flow, and the source access network device sends the multicast service data to the terminal device in an air interface point-to-point manner.

It should be understood that, after reaching the RAN, the multicast service data is processed by a service data adaptation protocol (SDAP) layer, a packet data convergence protocol (PDCP) layer, a radio link control (RLC) layer, a media access control (MAC) layer, and a physical (PHY) layer of the RAN, and is sent to each UE that receives the multicast service data.

Currently, the 3GPP has approved project initiation, and carries out research of how to support a multicast and broadcast function (namely, 5G multicast broadcast service, 5 MBS) based on a current 5G network architecture, as a key research topic. In a 5G or future evolved network, the access network device that supports the multicast function is deployed.

Figure 4B:
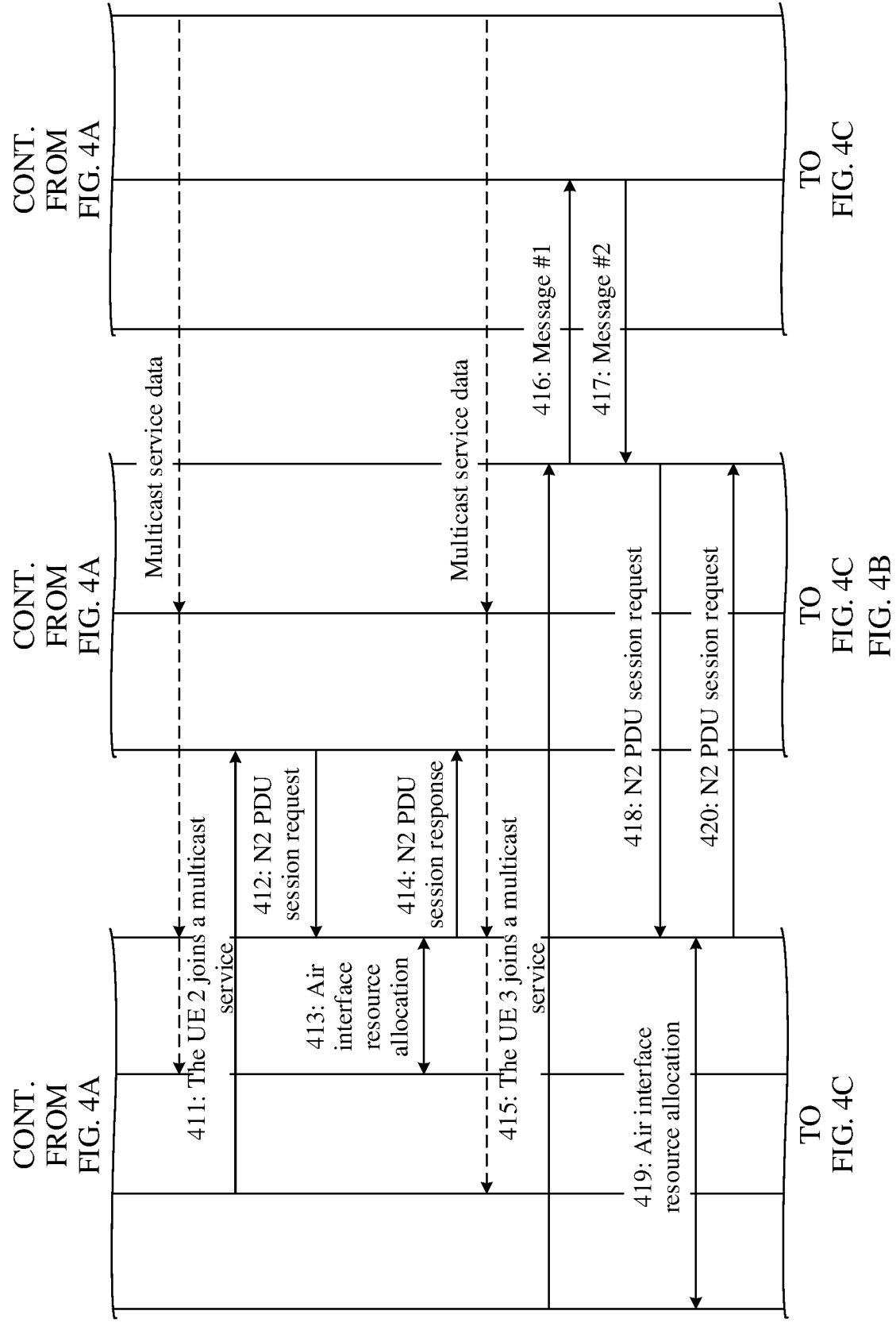
Figure 4C:
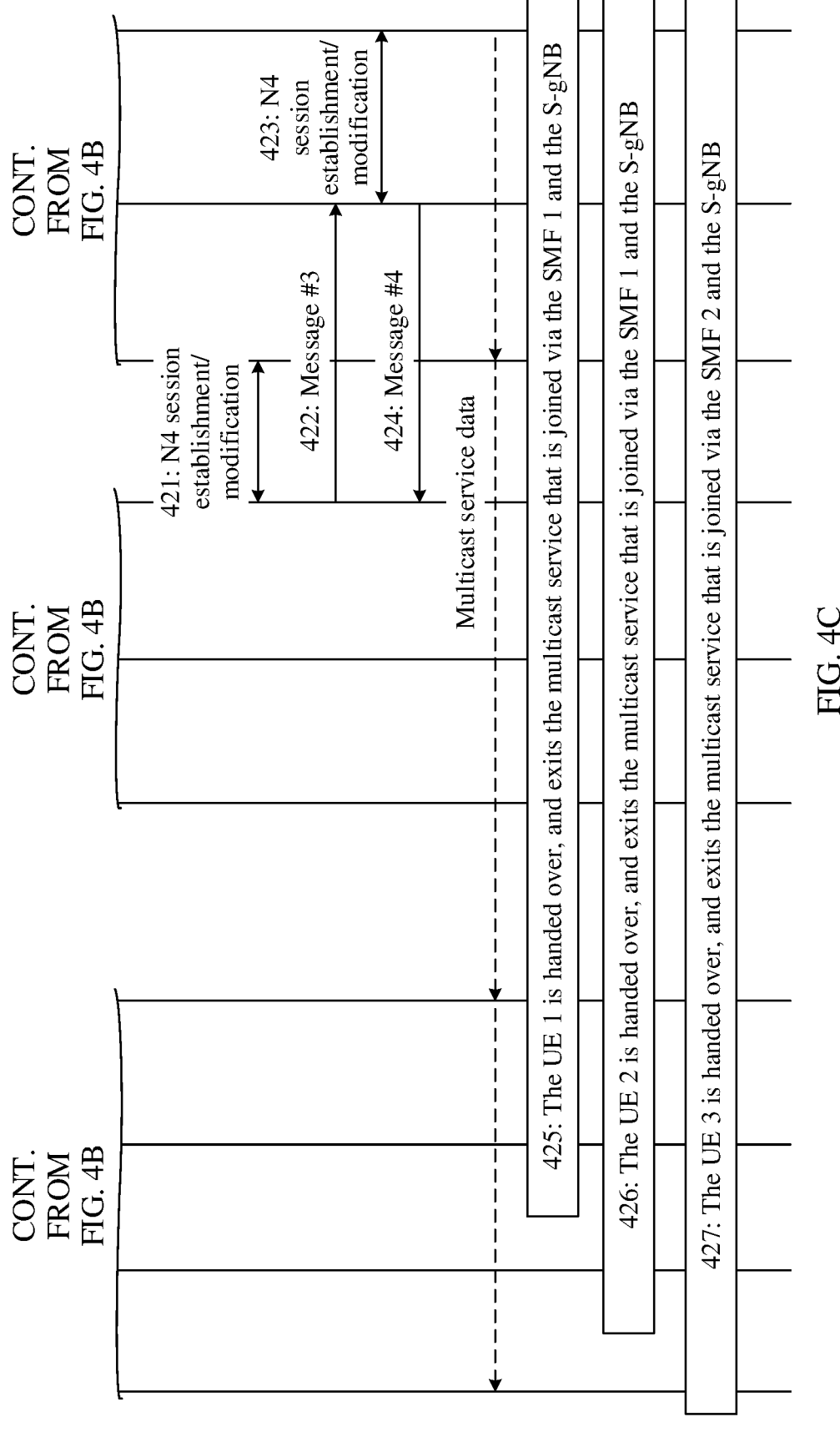

With reference to FIG. 4A to FIG. 4C, the following describes a procedure in which a terminal device joins a multicast service. For example, in FIG. 4A to FIG. 4C, an example in which the terminal device being a UE 1, a UE 2, and a UE 3 joins the multicast service is used for description.

As shown in FIG. 4A to FIG. 4C, a process in which the UE 1 joins the multicast service via a source gNB (S-gNB) and an SMF 1 is described in steps 401 to 410. A transmission path of the multicast service includes a transmission path between an MUF and a UPF 1 and a transmission path between the UPF 1 and the S-gNB.

401: The UE 1 sends a request for joining a multicast service to the SMF 1, where the request includes related information of the multicast service. The related information may be, for example, an identifier of the multicast service or multicast IP address information.

402: The SMF 1 sends a message #1 to an MCF, where the message #1 notifies the MCF that the UE 1 joins the multicast service via the S-gNB and the SMF 1.

403: The MCF sends a message #2 to the SMF 1, where the message #2 is used to respond to the message #1 in step 402.

404: The SMF 1 sends an N2 PDU session request to the S-gNB, to request the S-gNB to allocate a related air interface resource of the multicast service to the UE 1.

405: The S-gNB allocates the related air interface resource of the multicast service to the UE 1, and generates tunnel identification information of the S-gNB.

406: The S-gNB sends, to the SMF 1, an N2 PDU session response, which carries the tunnel identification information of the S-gNB.

407: Perform N4 session establishment/modification between the SMF 1 and the UPF 1.

For example, the SMF 1 sends, to the UPF 1, an N4 session establishment/modification request (N4 session establishment/modification request), which includes the tunnel identification information of the S-gNB and tunnel identification information allocated by the SMF 1 to the UPF 1. Next, the UPF 1 sends an N4 session establishment/modification response to the SMF1. Then, a multicast session tunnel between the S-gNB and the UPF 1 is established.

408: The SMF 1 sends a message #3 to the MCF, where the message #3 requests to establish a tunnel for transmitting multicast service data between the MUF and the UPF 1. For example, the message #3 may carry the tunnel identification information allocated by the SMF 1 to the UPF 1.

409: The MCF sends, to the MUF, an N4 session establishment/modification request, which includes the tunnel identification information allocated by the SMF 1 to the UPF 1, and further includes tunnel identification information allocated by the MCF to the MUF. Then, the MUF sends an N4 session establishment/modification response to the MCF, and the tunnel between the MUF and the UPF 1 is established.

410: The MCF sends a message #4 to the SMF 1, where the message #4 is used to respond to the message #3 in step 408.

After step 410, a multicast service data transmission path from a multicast service source to the MUF to the UPF 1 and to the S-gNB is established. The UE 1 may receive the multicast service data through the multicast service data transmission path.

Still refer to FIG. 4A to FIG. 4C. After the UE 1 joins the multicast service via the S-gNB and the SMF 1, the UE 2 may further join the multicast service via the S-gNB and the SMF 1. For example, reference may be made to the following steps 411 to 414.

411: The UE 2 sends a request for joining a multicast service to the SMF 1, where the request includes related information of the multicast service. Herein, for the related information of the multicast service, refer to the description in step 401.

412: The SMF 1 sends an N2 PDU session request to the S-gNB, to request the S-gNB to allocate a related air interface resource of the multicast service to the UE 2.

Because the UE 2 also applies to join the multicast service via the S-gNB and the SMF 1, that is, both the UE 1 and the UE 2 apply to join the multicast service via a same SMF (namely, the SMF 1), the SMF 1 only needs to request the S-gNB to allocate the air interface resource of the multicast service to the UE 2. To be specific, the S-gNB still receives multicast service data through the multicast session tunnel between the UPF 1 and the S-gNB, and sends the multicast service data to the UE 2.

413: The S-gNB allocates the related air interface resource of the multicast service to the UE 2.

It should be noted that, because all UEs that have joined the multicast service via the same SMF share the multicast session tunnel from the UPF1 to the S-gNB, to be specific, the UE 1 and the UE 2 share the multicast session tunnel between the UPF 1 and the S-gNB, in step 410, the S-gNB does not need to generate tunnel identification information.

414: The S-gNB sends an N2 PDU session response to the SMF 1, to respond to step 412.

After step 414, a multicast service data transmission path from a multicast service source to the MUF to the UPF 1 and to the S-gNB is established. The UE 2 may receive the multicast service data through the multicast service data transmission path.

Still refer to FIG. 4A to FIG. 4C. The UE3 may further join the multicast service. Different from that the UE 1 and the UE 2 join the multicast service, the UE 3 joins the multicast service via the S-gNB and an SMF 2. A transmission path of the multicast service includes a transmission path between an MUF and a UPF 2 and a transmission path between the UPF 2 and the S-gNB. For example, reference may be made to the following steps 415 to 424.

415: The UE 3 sends a request for joining a multicast service to the SMF 2, where the request includes related information of the multicast service.

Because the UE 3 applies to join the multicast service via another SMF (namely, the SMF 2), subsequent steps 416 to 424 need to be performed. Descriptions of steps 416 to 424 are similar to those of steps 402 to 410. For details, refer to the foregoing descriptions. Details are not described herein again.

After step 424, a multicast service data transmission path from a multicast service source to the MUF to the UPF 2 and to the S-gNB is established. The UE 3 may receive the multicast service data through the multicast service data transmission path.

In some embodiments, due to mobility of the UE, the UE may be triggered to be handed over, for example, handed over from the S-gNB to a target gNB (T-gNB). As a result, the UE exits the multicast service that is joined at a source access network device. For example, reference may be made to steps 425 to 427.

425: The UE 1 is handed over, and exits the multicast service that is joined via the SMF 1 and the S-gNB.

426: The UE 2 is handed over, and exits the multicast service that is joined via the SMF 1 and the S-gNB.

427: The UE 3 is handed over, and exits the multicast service that is joined via the SMF 2 and the S-gNB.

The T-gNB may or may not support a multicast function. This is not limited in this embodiment.

When the terminal device is handed over from a source access network device that supports the multicast function to a target access network device (where the target access network device supports or does not support the multicast function), to reduce network resource overheads, how to release a multicast session tunnel between the source access network device and a core network device is an urgent problem to be resolved.

In view of this, embodiments of this application provide a communication method and apparatus. A source access network device or a session management function network element can know that no other terminal device receives data of a multicast service via a source access network device after a terminal device is handed over from the source access network device to a target access network device. In other words, the terminal device is a last terminal device that receives the data of the multicast service via the source access network device, and the source access network device or the session management function network element determines to release a multicast session tunnel between the source access network device and a core network device.

The following describes embodiments of this application in detail with reference to the accompanying drawings.

The technical solutions in this application may be used in a wireless communication system, for example, the communication system shown in FIG. 1 or the communication system shown in FIG. 2. There may be a wireless communication connection relationship between communication apparatuses in the wireless communication system. One of the communication apparatuses may be, for example, an access network device (for example, a source access network device) or a chip configured in the access network device (for example, the source access network device), and the other apparatus may be, for example, a session management function network element or a chip configured in the session management function network element. This is not limited in embodiments of this application.

Without loss of generality, embodiments of this application are first described in detail by using a communication process of a terminal device as an example. It may be understood that, any access network device in the wireless communication system or any chip configured in the access network device may perform communication based on a same method, and any session management function network element in the wireless communication system or any chip configured in the session management function network element may perform communication based on a same method. This is not limited in this application.

Figure 5A:
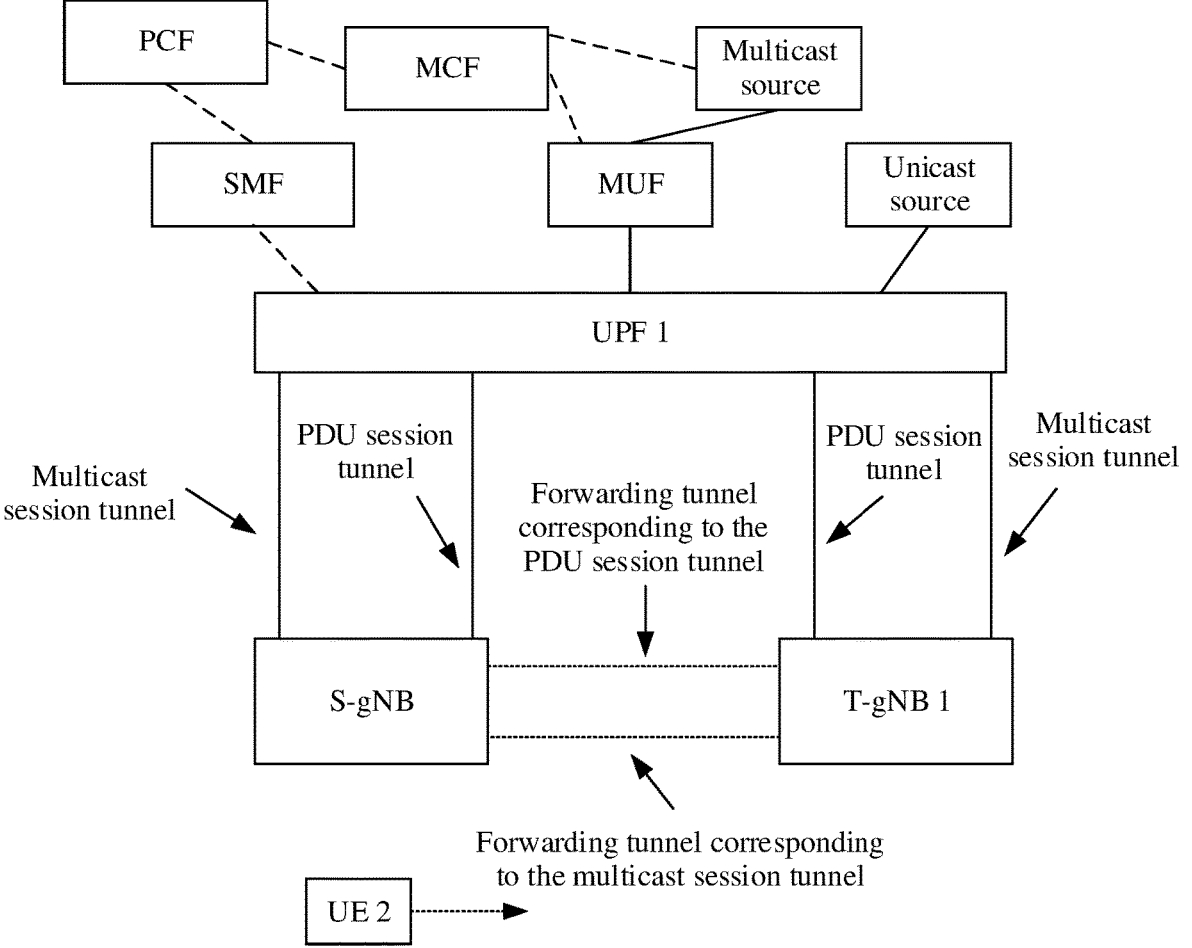
FIG. 5A is a schematic diagram of an application scenario to which a solution according to an embodiment of this application is applicable.
Figure 5B:
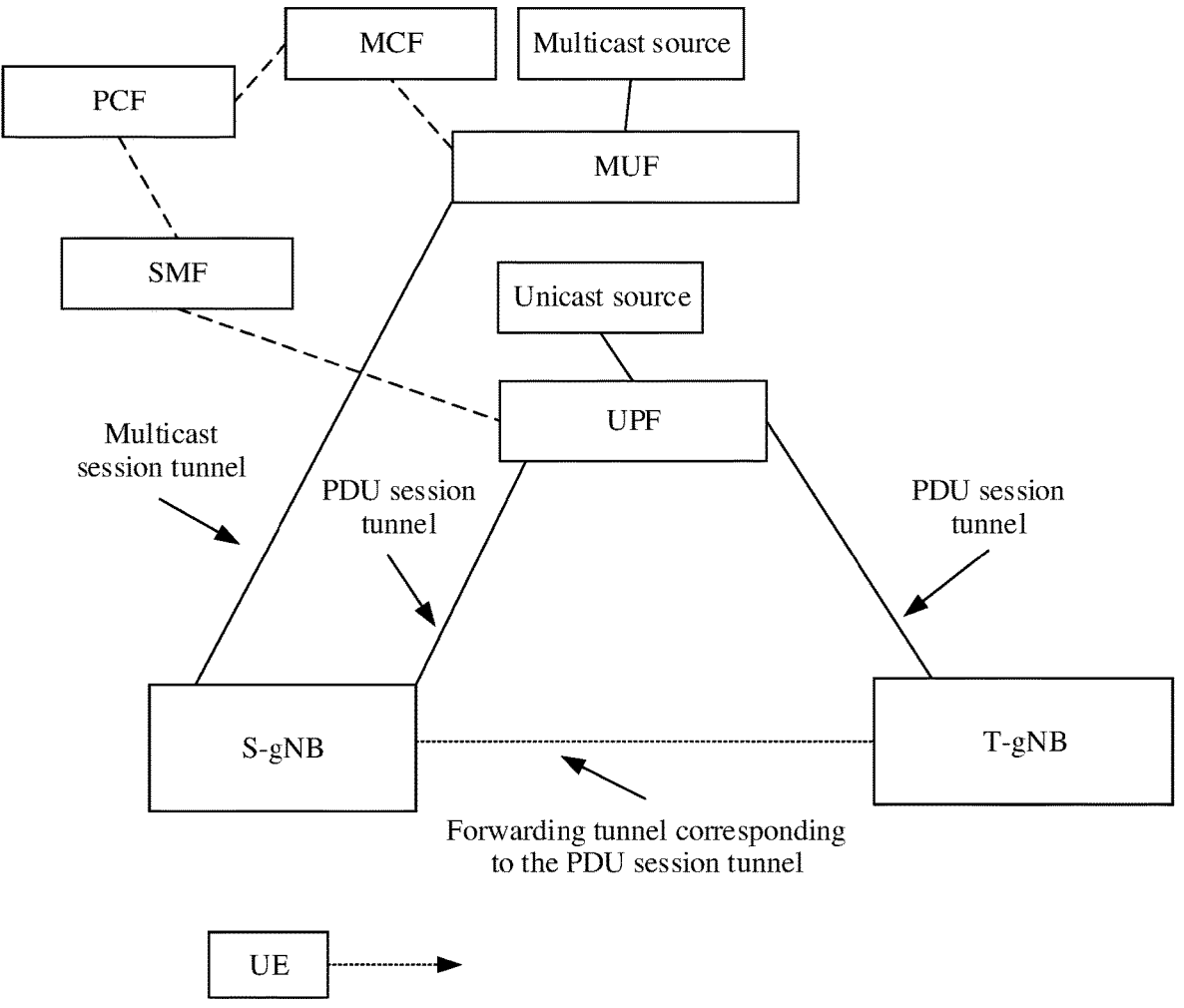
FIG. 5B is a schematic diagram of an application scenario to which a solution according to an embodiment of this application is applicable.
Figure 5C:
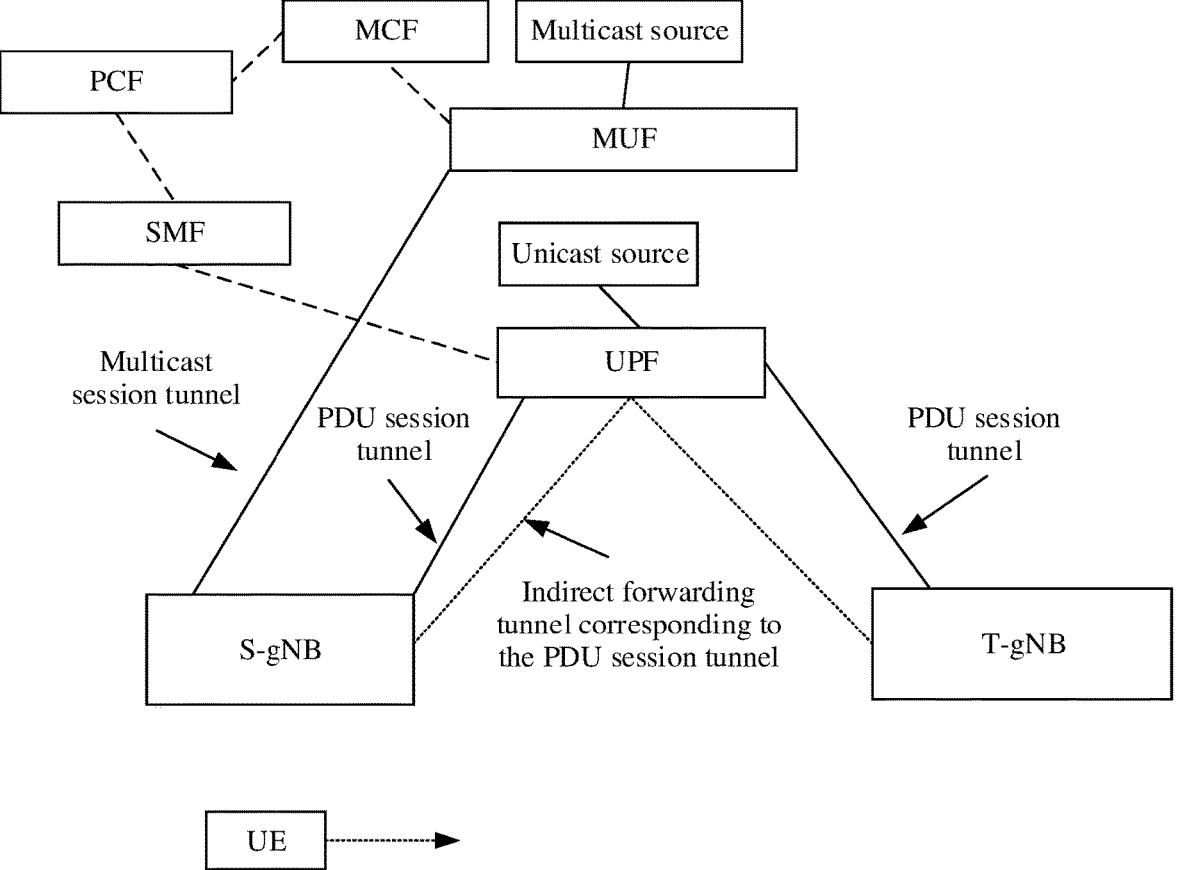
FIG. 5C is a schematic diagram of an application scenario to which a solution according to an embodiment of this application is applicable.

The following describes, with reference to FIG. 5A, FIG. 5B, and FIG. 5C, examples of scenarios to which the solutions in embodiments of this application are applied.

In FIG. 5A, a UE 2 is handed over from an S-gNB to a T-gNB 1, and the T-gNB 1 supports a multicast function. There are a multicast session tunnel and a PDU session tunnel between the S-gNB and the UPF 1, and there are a multicast session tunnel and a PDU session tunnel between the T-gNB 1 and a UPF 1. In this case, there are both a forwarding tunnel corresponding to the PDU session tunnel between the S-gNB and the T-gNB 1 and a forwarding tunnel corresponding to the multicast session tunnel between the S-gNB and the T-gNB 1. For example, the UPF 1 and the UE 2 in FIG. 5A may be the UPF 1 and the UE 2 in FIG. 4A to FIG. 4C.

It should be noted that in FIG. 5A, only an example in which the T-gNB 1 supports the multicast function is used for description. However, embodiments of this application are not limited thereto. In another embodiment, the T-gNB 1 may alternatively not support the multicast function. When the T-gNB 1 does not support the multicast function, there is no multicast session tunnel between the T-gNB 1 and the UPF 1, and there is no forwarding tunnel corresponding to the multicast session tunnel between the S-gNB and the T-gNB 1.

In FIG. 5B, a UE is handed over from an S-gNB to a T-gNB, and the T-gNB does not support a multicast function. There is a multicast session tunnel between the S-gNB and an MUF, there is a PDU session tunnel between the S-gNB and a UPF, and there is a PDU session tunnel between the T-gNB and the UPF. In this case, there is a forwarding tunnel corresponding to the PDU session tunnel between the S-gNB and the T-gNB, and there is no forwarding tunnel corresponding to the multicast session tunnel between the S-gNB and the T-gNB.

It should be noted that in FIG. 5B, only an example in which the T-gNB does not support the multicast function is used for description. However, embodiments of this application are not limited thereto. In another embodiment, the T-gNB may alternatively support the multicast function. When the T-gNB supports the multicast function, there is a multicast session tunnel between the T-gNB and the MUF, and there is a forwarding tunnel corresponding to the multicast session tunnel between the S-gNB and the T-gNB.

In FIG. 5C, a UE is handed over from an S-gNB to a T-gNB, and the T-gNB does not support a multicast function. There is a multicast session tunnel between the S-gNB and an MUF, there is a PDU session tunnel between the S-gNB and a UPF, and there is a PDU session tunnel between the T-gNB and the UPF. In this case, there is an indirect forwarding tunnel corresponding to the PDU session tunnel between the S-gNB and the UPF, and there is an indirect forwarding tunnel corresponding to the PDU session tunnel between the UPF and the T-gNB. In other words, the S-gNB needs to send, to the UPF through the indirect forwarding tunnel, a PDU session that needs to be sent to the T-gNB, and the UPF then sends the PDU session to the T-gNB through the indirect forwarding tunnel.

It should be noted that in FIG. 5C, only an example in which the T-gNB does not support the multicast function is used for description. However, embodiments of this application are not limited thereto. In another embodiment, the T-gNB may alternatively support the multicast function. When the T-gNB supports the multicast session tunnel, there is a multicast session tunnel between the T-gNB and the MUF, there is an indirect forwarding tunnel corresponding to the multicast session tunnel between the S-gNB and the UPF, and there is an indirect forwarding tunnel corresponding to the multicast session tunnel between the UPF and the T-gNB. Embodiments of this application may further be applied to a scenario in which the T-gNB supports the multicast function.

It should be further noted that, the scenarios in FIG. 5A, FIG. 5B, and FIG. 5C are special scenarios for ease of describing the technical solutions in embodiments of this application, and the technical solutions provided in embodiments of this application are not limited to FIG. 5A, FIG. 5B, and FIG. 5C. In other words, the technical solutions provided in embodiments of this application may also be applied to another scenario that is not listed. For example, the another scenario that is not listed may include, for example, the following three cases.

Case 1: For a PDU session of a terminal device to be handed over, in a handover process, an SMF and an anchor UPF that serve the PDU session of the terminal device to be handed over remain unchanged. For example, for the scenario in FIG. 5A, the anchor UPF is the UPF 1 in the figure, and is the UPF in FIG. 5B and FIG. 5C.

Case 2: At the source access network device, for a multicast service associated with a PDU session of a terminal device to be handed over, assuming that a control plane multicast network element that serves a group service of the source access network device is an MCF-1, and a user plane multicast network element is an MUF-1, the MUF-1 may be connected to an anchor UPF in which the PDU session of the terminal device is located (that is, the MUF is connected to the UPF 1 in FIG. 5A). Optionally, the MUF-1 may alternatively be connected to the source access network device. In addition, the MUF-1 may alternatively be connected to the source access network device by using another UPF. In other words, the MUF-1 may alternatively be connected to the another UPF other than the anchor UPF of the PDU session of the terminal device.

Case 3: For a target access network device, network elements that serve the multicast service associated with a PDU session of a terminal device to be handed over may be an MCF-1 and an MUF-1, or may be another MCF and another MUF. The MUF may be directly connected to the target access network device, or may be connected to an anchor UPF of the PDU session of the terminal device to be handed over, or may be connected to the target access network device by using another UPF (namely, a non-anchor UPF).

The following describes, with reference to FIG. 6 to FIG. 10A to FIG. 10C, a communication method provided in embodiments of this application.

Figure 6:
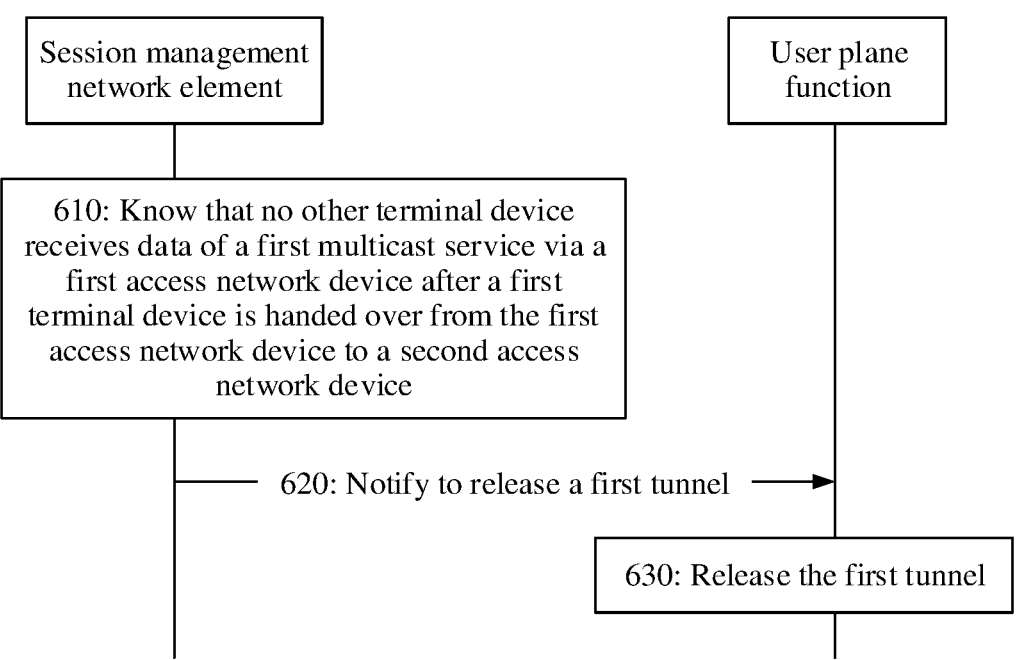
FIG. 6 is a schematic flowchart of a communication method according to an embodiment of this application.

FIG. 6 is a schematic flowchart of a communication method 600 from a perspective of device interaction according to an embodiment of this application. As shown in FIG. 6, the method 600 includes steps 610 to 630.

610: A session management function network element knows that no terminal device receives data of a first multicast service via a first access network device after a first terminal device is handed over from the first access network device to a second access network device.

For example, at a service layer, the first multicast service means that the data of the service may be sent to a plurality of terminal devices. Specifically, for the multicast service and multicast, refer to the foregoing descriptions. Details are not described again.

The first access network device may be referred to as a source access network device, and the second access network device may be referred to as a target access network device.

For example, after the first terminal device is handed over from the source access network device to the target access network device, when a quantity of terminal devices that have joined the first multicast service via the session management function network element and the source access network device is 0, the session management function network element may determine that after the first terminal device is handed over from the source access network device to the target access network device, no other terminal device receives the data of the first multicast service via the source access network device (in other words, no other terminal device joins the first multicast service via the session management function network element and the source access network device).

In some optional embodiments, the quantity of terminal devices that have joined the multicast service via the source access network device may be included in a multicast context, a multicast session context, a multicast group context, or a multicast service context corresponding to a multicast service associated with a PDU session of the first terminal device. In other words, depending on whether another terminal device other than the terminal device in the multicast context, the multicast session context, the multicast group context, or the multicast service context receives the first multicast service, the session management network element determines that no terminal device receives the data of the first multicast service via the first access network device after the first terminal device is handed over from the first access network device to the second access network device.

In some optional embodiments, the session management function network element may further update the quantity of terminal devices that have joined the multicast service via the session management function network element and the source access network device.

For example, after receiving a PDU session context update request, the session management network element updates the quantity of terminal devices that have joined the multicast service via the session management function network element and the source access network device in the multicast context, the multicast session context, the multicast group context, or the multicast service context corresponding to the multicast service associated with the PDU session of the first terminal device, for example, decreases the quantity of terminal devices by 1, to obtain a quantity of terminal devices that currently have joined the first multicast service via the session management function network element and the source access network device.

In an example, after the first terminal device is handed over from the source access network device to the target access network device, and before the session management function network element updates the stored quantity of terminal devices that have joined the first multicast service via the session management function network element and the access network device, the session management function network element may determine whether another terminal device receives the data of the first multicast service via the source access network device. In this case, when determining that the first terminal device is a last terminal device that has joined the first multicast service via the session management function network element and the source access network device, in other words, there is one terminal device (namely, the first terminal device) that has joined the first multicast service via the session management function network element and the source access network device, the session management function network element may know that no other terminal device receives the data of the first multicast service via the source access network device.

In another example, after the first terminal device is handed over from the source access network device to the target access network device, and the session management function network element updates the stored quantity of terminal devices that have joined the multicast service via the session management function network element and the access network device, the session management function network element may determine whether another terminal device receives the data of the first multicast service via the source access network device. In this case, when determining that the quantity of terminal devices that have joined the first multicast service via the session management function network element and the source access network device is 0, the session management function network element may know that no other terminal device receives the data of the first multicast service via the source access network device.

620: The session management function network element notifies a user plane function to release a first tunnel.

The first tunnel is used to transmit the data of the first multicast service between the first access network device and a core network device. The core network device may be a UPF.

For example, the first tunnel may include a tunnel used to transmit the first multicast service between the first access network device and the UPF, namely, a multicast session tunnel used to transmit the first multicast service. Specifically, for the multicast session tunnel, refer to the foregoing descriptions. Details are not described again.

In other words, after knowing that no other terminal device receives the data of the first multicast service via the first access network device after the first terminal device is handed over from the first access network device to the second access network device, the session management function network element may notify the user plane function to release the first tunnel. For example, the session management network element may send, to the first terminal device, an N4 session update request, which carries first information, used to release the first tunnel.

For example, the first information may include an indication, a request, or a notification (notify or notification) for releasing the first tunnel. Optionally, the first information may alternatively include information about the first tunnel and/or identification information of the first multicast service. This is not limited in this embodiment of this application.

For example, the first information may include an indication, a request, or a notification (notify or notification) for releasing the first tunnel, and may further include information about the first tunnel. Optionally, the first information may alternatively include identification information of the first multicast service. This is not limited in this embodiment of this application.

For example, the first information may include an indication, a request, or a notification (notify or notification) for releasing the first tunnel, and may further include information ab out the first tunnel and identification information of the first multicast service. This is not limited in this embodiment of this application.

The information about the first tunnel may be used to uniquely determine the first tunnel, for example, may be a tunnel endpoint identifier (TEID) of the first tunnel. This is not limited herein. The identification information of the first multicast service may be used to uniquely determine a multicast service, for example, may be a multicast service ID, a multicast service name, a multicast address, or a multicast group ID. This is not limited herein.

630: The user plane function releases the first tunnel.

For example, after receiving the N4 session update request (carrying the first information) sent by the session management function network element, the user plane function may release the first tunnel, for example, remove a related resource of the first tunnel (for example, remove the tunnel endpoint identifier of the first tunnel) based on tunnel identification information in the first information.

Therefore, in this embodiment of this application, when knowing that no other terminal device receives the data of the first multicast service via the first access network device after the first terminal device is handed over from the first access network device to the second access network device, the session management function network element may notify the user plane function to release the first tunnel used to transmit the first multicast service between the source access network device and the core network device, to release the multicast session tunnel between the access network device and the core network device. This helps reduce network resource overheads.

Figure 7A:
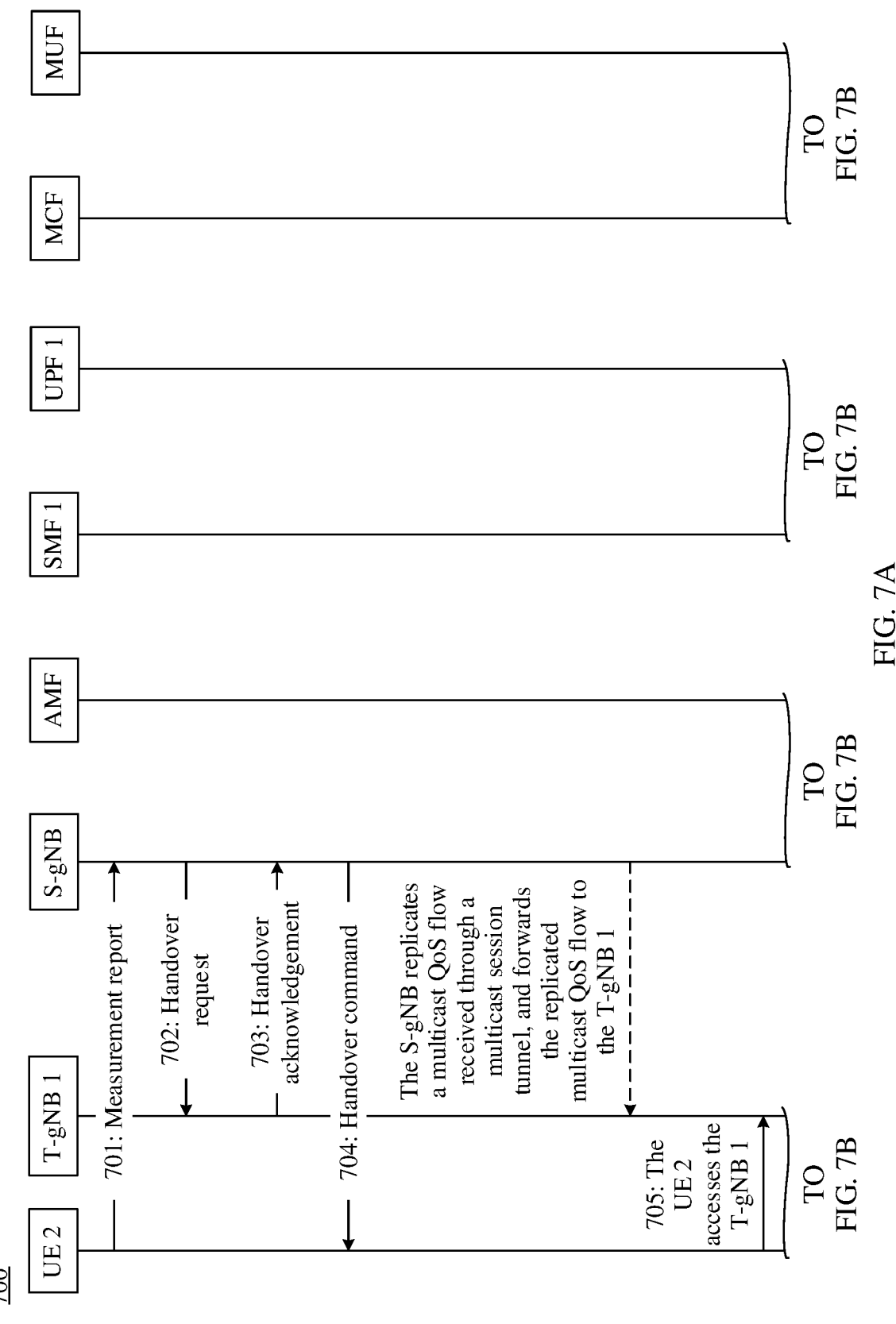
FIG. 7A and FIG. 7B are a specific example of a communication method according to an embodiment of this application.
Figure 7B:
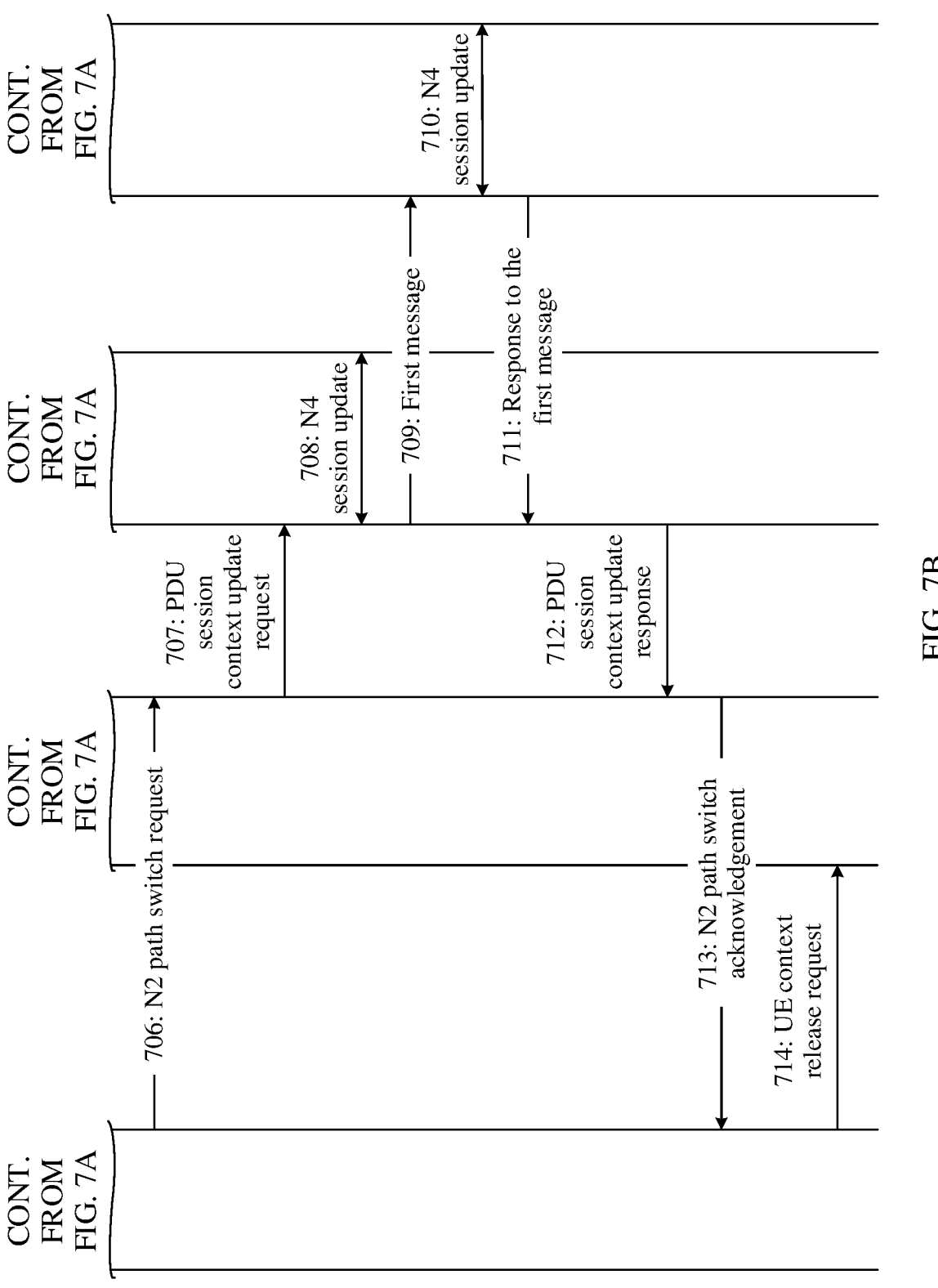

The following describes, with reference to FIG. 7A and FIG. 7B, a specific example of a communication method according to an embodiment of this application. In the following embodiment, an example in which the session management function network element is an SMF, the source access network device is an S-gNB, and the user plane function is a UPF is used for description. For implementation methods of a chip in the SMF, a chip in the S-gNB, and a chip in the UPF, refer to specific descriptions of the SMF, the S-gNB, and the UPF. Details are not described again.

Optionally, in FIG. 7A and FIG. 7B, a core network device further includes an AMF, an MCF, and an MUF. Alternatively, in some optional embodiments, a core network device may not include an MCF and an MUF. Instead, some functions or units in the SMF implement functions of the MCF, and some functions or units in the UPF implement functions of the MUF. This is not limited in this embodiment of this application.

FIG. 7A and FIG. 7B are a schematic flowchart of another communication method 700 according to an embodiment of this application. In the method 700, an SMF 1 determines whether a multicast session tunnel between the S-gNB and a UPF 1 needs to be released.

It should be noted that in FIG. 7A and FIG. 7B, an example in which a UE to be handed over is the UE 2 in FIG. 4A to FIG. 4C is used for description. To be specific, a process in which the SMF 1 determines whether to release the multicast session tunnel between the S-gNB and the UPF 1, after the UE 2 is handed over and exits the multicast service that is joined via the SMF 1 and the S-gNB in step 426 in FIG. 4A to FIG. 4C is described in the method 700.

In some embodiments, when a T-gNB 1 to which the UE 2 is handed over supports a multicast function, the method 700 is applicable to the scenario shown in FIG. 5A. The following describes the method 700 with reference to the scenario in FIG. 5A. As shown in FIG. 7A and FIG. 7B, the method 700 may include steps 701 to 716. It should be noted that, this solution is also applicable to a scenario in which the T-gNB 1 does not support the multicast function. This is not limited herein. The scenario shown in FIG. 5A is merely an example.

It should be understood that FIG. 7A and FIG. 7B show steps or operations of the communication method 700 provided in this embodiment of this application, but these steps or operations are merely examples. In this embodiment of this application, other operations or variations of the operations in FIG. 7A and FIG. 7B may be further performed. In addition, steps in the figure may be performed in a sequence different from that presented in the figure, and it is possible that not all operations in the figure need to be performed.

Optionally, before step 701, the S-gNB may know a capability of the T-gNB 1, namely, a capability about whether the multicast function is supported. For example, when there is an Xn connection between the T-gNB 1 and the S-gNB, the T-gNB 1 may notify the S-gNB of capability information of the T-gNB 1 by using an Xn interface, where Xn may be an interface of the Xn connection between the S-gNB and the T-gNB. For example, when the T-gNB 1 supports the multicast function, the T-gNB sends indication information #1 to the S-gNB, where the indication information #1 indicates that the T-gNB 1 supports the multicast function.

701: The UE 2 sends a measurement report to the S-gNB.

Correspondingly, the S-gNB receives the measurement report, and decides to hand over the UE 2 to the T-gNB 1.

702: The S-gNB sends a handover request to the T-gNB 1. Herein, the S-gNB may know that the T-gNB 1 supports the multicast function.

For example, the handover request may include PDU session information of the UE 2 to be handed over. The PDU session information includes a PDU session identifier and QoS information corresponding to a unicast service included in a PDU session. If a PDU session of the UE to be handed over is further associated with a multicast service, the PDU session information further includes QoS information corresponding to the associated multicast service. For example, the QoS information of the unicast service includes a unicast QoS flow identifier (QFI) corresponding to the unicast service and a QoS parameter, and the QoS information of the multicast service includes a multicast QoS flow identifier (QFI) corresponding to the multicast service and a QoS parameter.

In addition, the handover request may further include a QFI of a QoS flow that the S-gNB intends to forward to the T-gNB 1 and an endpoint identifier that is of a forwarding tunnel and that is generated by the S-gNB. For example, the QoS flow that the S-gNB intends to forward to the T-gNB 1 may be a unicast QoS flow and/or a multicast QoS flow.

For example, when a service flow that the S-gNB intends to forward to the T-gNB 1 includes a multicast QoS flow, the handover request may include a QFI of the multicast QoS flow and an endpoint identifier that is of a forwarding tunnel corresponding to a multicast session tunnel and that is generated by the S-gNB. When a service flow that the S-gNB intends to forward to the T-gNB 1 includes a unicast QoS flow, the handover request may include a QFI of the unicast QoS flow and an endpoint identifier that is of a forwarding tunnel corresponding to a unicast session tunnel and that is generated by the S-gNB.

In other words, if the S-gNB intends to forward a unicast QoS flow through a forwarding tunnel corresponding to a PDU session tunnel, the handover request may include a QFI corresponding to the unicast QoS flow and an endpoint identifier generated by the S-gNB for the forwarding tunnel. If the S-gNB intends to forward a multicast QoS flow through a forwarding tunnel corresponding to a multicast session tunnel, the handover request may include a QFI corresponding to the multicast QoS flow and an endpoint identifier generated by the S-gNB for the forwarding tunnel.

It should be noted that the reason why the S-gNB needs to forward the service flow through the forwarding tunnel is that after step 704, to be specific, after the S-gNB delivers a handover command to the UE 2, the UE 2 is disconnected from the S-gNB. In this case, the UE 2 temporarily cannot receive data via the S-gNB, and the UE 2 does not access the T-gNB 1 yet. In other words, the UE 2 cannot receive, via the S-gNB, data in this time period of step 704 and step 705. Therefore, the S-gNB needs to forward this part of data to the T-gNB 1 through the forwarding tunnel for buffering. After step 705, to be specific, after the UE 2 accesses the T-gNB 1, the T-gNB 1 delivers this part of data to the UE 2.

703: The T-gNB 1 sends a handover acknowledgement (handover request ACK) to the S-gNB.

For example, the T-gNB 1 prepares, based on the QoS information of the unicast service and the QoS information of the multicast service that are received from the S-gNB, a radio resource for the UE to be handed over. For example, the T-gNB 1 may determine, based on a QoS parameter corresponding to a QFI of each service flow, a quantity of air interface data radio bearers (DRBs) and a mapping relationship between the QFI and the DRB. In addition, the T-gNB 1 may further determine, based on a QoS parameter corresponding to a QFI to which each DRB is mapped, a configuration parameter corresponding to the DRB. The configuration parameter corresponding to the DRB is, for example, whether an acknowledged mode or an unacknowledged mode is used by a radio link control (RLC) layer corresponding to the DRB. Finally, the T-gNB 1 creates a corresponding DRB.

After preparing the radio resource, the T-gNB 1 sends the handover acknowledgement to the S-gNB. In some optional embodiments, the T-gNB 1 may send, to the S-gNB, information that needs to be relayed to the UE 2 via the S-gNB. For example, the T-gNB 1 may send radio bearer configuration information of the T-gNB 1 to the UE 2 via the S-gNB. The radio bearer configuration information may be used by the UE 2 to receive, after the UE 2 accesses the T-gNB 1, unicast service data and/or multicast service data delivered by the T-gNB 1.

In some optional embodiments, when the handover request in step 702 includes a QFI of a service flow (including a QFI of a unicast QoS flow and/or a QFI of a multicast QoS flow) that the S-gNB intends to forward through the forwarding tunnel, and the T-gNB 1 supports data forwarding, the T-gNB 1 allocates an endpoint identifier of the forwarding tunnel.

704: The S-gNB delivers the handover command to the UE 2.

If the T-gNB 1 requires the S-gNB to relay, to the UE 2, radio bearer configuration information needed by the UE 2 to receive service data at the T-gNB 1, the S-gNB sends the radio bearer configuration information to the UE 2. After the S-gNB delivers the handover command to the UE 2, an air interface connection between the UE 2 and the S-gNB is temporarily disconnected.

Then, the S-gNB replicates the multicast QoS flow received through the multicast session tunnel, and forwards the replicated multicast QoS flow to the T-gNB 1.

After the air interface connection between the UE 2 and the S-gNB is disconnected, the S-gNB stops delivering, to the UE 2 to be handed over, service data included in the PDU session and multicast service data associated with the PDU session. For example, the S-gNB stops sending, through the PDU session tunnel, the service data included in the PDU session to the UE 2 to be handed over, and stops forwarding, through the multicast session tunnel, the multicast service data to the UE 2 to be handed over.

For a QoS flow that the UE 2 to be handed over needs to support forwarding, the S-gNB further needs to perform the following work: For a unicast QoS flow that needs to be forwarded to the T-gNB 1, the S-gNB forwards the unicast QoS flow to the T-gNB 1 through the forwarding tunnel corresponding to the PDU session tunnel. After receiving the unicast QoS flow, the T-gNB 1 buffers the unicast QoS flow.

For a multicast QoS flow that needs to be forwarded to the T-gNB 1, the S-gNB first replicates the multicast QoS flow in the multicast session tunnel, and then forwards the replicated multicast QoS flow to the T-gNB 1 through the forwarding tunnel corresponding to the multicast session tunnel. After receiving the multicast QoS flow, the T-gNB 1 buffers the multicast QoS flow.

705: The UE 2 accesses the T-gNB 1.

For example, after the UE 2 accesses the T-gNB 1, the T-gNB 1 sends the received and buffered unicast QoS flow and/or multicast QoS flow to the UE 2. The UE 2 receives corresponding service data based on the radio bearer configuration information sent by the S-gNB in step 704.

706: The T-gNB 1 sends an N2 path switch request to the AMF.

For example, the request includes a QFI of a unicast QoS flow that is successfully handed over and a QFI of a unicast QoS flow that fails to be handed over in the PDU session of the UE 2, and/or a QFI of a multicast QoS flow that is successfully handed over and a QFI of a multicast QoS flow that fails to be handed over in the PDU session. For example, these QFIs may be encapsulated in an N2 SM message.

In some optional embodiments, the N2 path switch request may further include an endpoint identifier that is of a PDU session tunnel and that is allocated by the T-gNB 1 to the UE 2.

In some optional embodiments, the N2 path switch request may further include indication information #2, where the indication information #2 indicates whether a multicast service associated with the PDU session of the UE 2 to be handed over is running on the T-gNB 1.

In a possible case, when the multicast service associated with the PDU session of the UE 2 to be handed over is not running on the T-gNB 1, it indicates that a multicast session tunnel used to transmit the multicast session between the T-gNB 1 and the UPF is not established yet. In this case, the N2 path switch request may further include an endpoint identifier that is of the multicast session tunnel and that is allocated by the T-gNB 1, to establish the multicast session tunnel between the T-gNB 1 and the UPF.

In another possible case, when the multicast service associated with the PDU session of the UE 2 to be handed over is running on the T-gNB 1, or the multicast service is in a running state on the T-gNB 1, it indicates that a multicast session tunnel used to transmit the multicast session between the T-gNB 1 and the UPF has been established. In this case, the N2 path switch request may not include an endpoint identifier of the multicast session tunnel.

707: The AMF sends a PDU session context update request (Nsmf_PDUSession_UpdateSMContext Request) to the SMF 1.

For example, the PDU session context update request includes information included in the N2 SM message in step 706.

In some embodiments, before the UE 2 is handed over to the T-gNB 1, the AMF may collect capability information of the gNB, including capability information of whether multicast function is supported. For example, when being powered on, the T-gNB 1 may report, to the AMF, whether the T-gNB 1 supports the multicast function. In this case, the PDU session context update request may further include the capability information of the T-gNB 1.

Correspondingly, the SMF 1 receives the PDU session context update request. Then, the SMF 1 determines whether to release a multicast session tunnel in which the multicast service associated with the PDU session of the UE 2 to be handed over is located in the S-gNB (namely, a multicast session tunnel used to transmit the multicast service between the UPF 1 and the S-gNB, where it is assumed that a multicast service is transmitted in a multicast session tunnel).

In some embodiments, depending on whether after the UE 2 is handed over from the S-gNB to the T-gNB, another terminal device receives data of the multicast service via the S-gNB, or whether the UE 2 is a last UE that has joined the multicast service via the SMF 1 and the S-gNB, or whether after the UE 2 is handed over from the S-gNB to the T-gNB, a quantity of UEs that have joined the multicast service via the SMF 1 and the S-gNB is 0, the SMF 1 may determine whether to release the multicast session tunnel. For example, the quantity of UEs that have joined the multicast service via the SMF 1 and the S-gNB may be included in a multicast service context. In other words, depending on whether another UE other than the UE 2 in the multicast service context requests the multicast service at the S-gNB, the SMF 1 may determine whether to release the multicast session tunnel in which the multicast service is located. The multicast service context may also be referred to as a multicast session context.

For example, still refer to FIG. 4A to FIG. 4C. The UE 1 and UE 2 join a same multicast service via the SMF 1 and the S-gNB. In subsequent step 425, the UE 1 is handed over, and exits the multicast service that is joined via the SMF 1 and the S-gNB, and in step 426, the UE 2 is handed over, and exits the multicast service that is joined via the SMF 1 and the S-gNB. Therefore, after the UE 2 is handed over to the T-gNB, no other terminal device receives the data of the multicast service via the S-gNB, or the UE 2 is the last UE that has joined the multicast service via the SMF 1 and the S-gNB, or the quantity of UEs that j ion the multicast service via the SMF 1 and the S-gNB is 0. Based on this, the SMF 1 may determine to release the multicast session tunnel in which the multicast service is located.

In some optional embodiments, when the PDU session context update request includes indication information #2, the SMF may determine, based on the indication information #2, whether the multicast service associated with the PDU session of the UE 2 to be handed over is running on the T-gNB 1.

In some optional embodiments, after determining to release the multicast session tunnel in which the multicast service is located, the SMF 1 may generate information #1, indicating the S-gNB to release the multicast session tunnel in which the multicast service is located. The information #1 may be an example of the first information.

For example, the information #1 may include an indication, a notification, or a request for releasing the multicast session tunnel. Optionally, the information #1 may further include information about the multicast session tunnel (for example, a tunnel endpoint identifier TED of the multicast session tunnel, used to determine the multicast session tunnel) and/or identification information of the multicast service.

For example, the information #1 may include an indication, a notification, or a request for releasing the multicast session tunnel, and may further include information about the multicast session tunnel. Optionally, the information #1 may further include identification information of the multicast service.

For example, the information #1 may include an indication, a notification, or a request for releasing the multicast session tunnel, and may further include information about the multicast session tunnel and identification information of the multicast service.

708: Perform N4 session update between the SMF 1 and the UPF 1.

For example, the SMF 1 may send, to the UPF 1, an N4 session update request, which carries a PDU session tunnel endpoint identifier of the T-gNB 1 and a PDU session tunnel endpoint identifier allocated by the SMF 1 to the UPF 1, to establish a PDU session tunnel (N4 Session Modification) between the T-gNB 1 and the UPF 1.

In some optional embodiments, in step 707, if the AMF further sends, to the SMF 1, an endpoint identifier that is of a multicast session tunnel and that is allocated by the T-gNB 1 (that is, in this case, the multicast service associated with the PDU session of the UE 2 to be handed over is not running on the T-gNB 1), the SMF 1 further sends the endpoint identifier that is of the multicast session tunnel and that is from the T-gNB 1 to the UPF 1.

In some embodiments, in step 707, if the SMF 1 generates the information #1, the N4 session update request may include the information #1. The UPF 1 may notify, based on the information #1, to release the tunnel used to transmit the multicast service between the UPF 1 and the S-gNB.

709: The SMF 1 sends a first message to the MCF, to notify to release a tunnel used to transmit the multicast service between the MUF and the UPF 1, namely, the tunnel from the MUF to the UPF 1.

710: Perform an N4 session update between the MCF and the MUF. For example, the MCF may release tunnel identification information that is of the UPF 1 and that is allocated by the SMF1 (namely, tunnel identification information that is of the UPF 1 and that is used to establish the tunnel with the MUF).

711: The MCF sends a response to the first message to the SMF 1.

712: The SMF 1 sends a PDU session context update response (Nsmf_PDUSession_UpdateSMContext Response) to the AMF.

For example, the SMF 1 may release tunnel identification information that is of the MUF and that is allocated by the MCF (namely, the tunnel identification information that is of the UPF 1 and that is used to establish the tunnel with the MUF).

713: The AMF sends an N2 path switch acknowledgement (N2 Path Switch Request ACK) to the T-gNB 1.

714: The T-gNB 1 sends a UE context release request to the S-gNB.

Therefore, in this embodiment of this application, after the UE 2 is handed over from the S-gNB to the T-gNB 1, when determining that no other terminal device receives the data of the multicast service via the S-gNB, the SMF 1 may notify the UPF 1 to release a first tunnel used to transmit the multicast service between the S-gNB and the UPF 1, to release the multicast session tunnel between the S-gNB and the UPF 1. This helps reduce network resource overheads.

Figure 8:
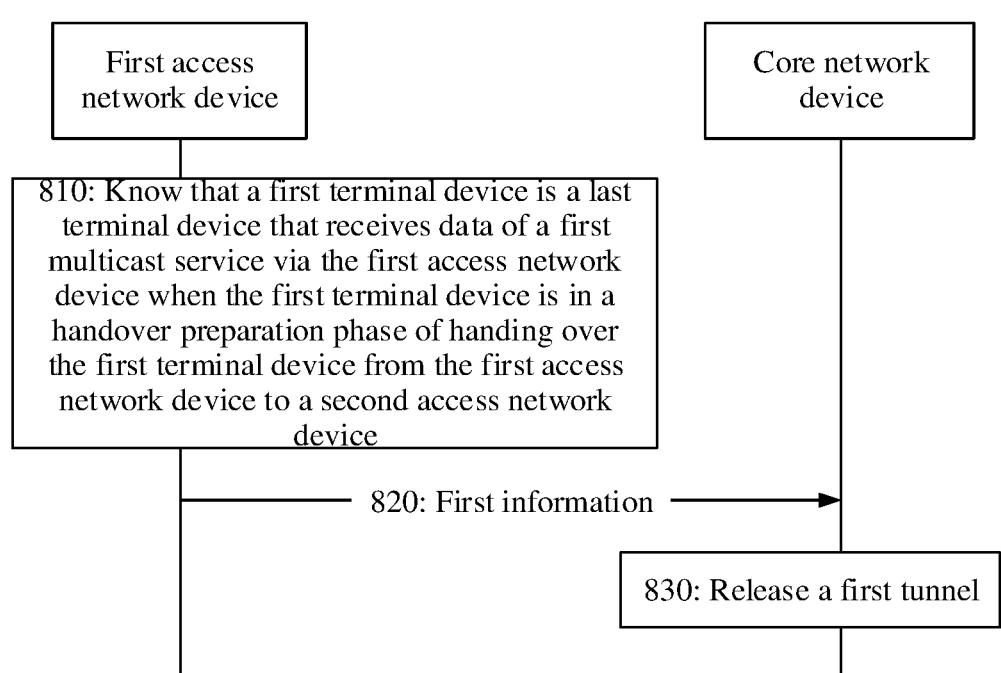
FIG. 8 is a schematic flowchart of another communication method according to an embodiment of this application.

FIG. 8 is a schematic flowchart of a communication method 800 from a perspective of device interaction according to an embodiment of this application. The method 800 may be applied to a scenario in which a first terminal device receives data of a first multicast service via a first access network device. As shown in FIG. 8, the method 800 includes steps 810 to 830.

810: A first access network device knows that a first terminal device is a last terminal device that receives data of a first multicast service via the first access network device when the first terminal device is in a handover preparation phase in which the first terminal device is handed over from the first access network device to a second access network device. Herein, "know" may also be replaced with "perceive", "find", "detect", or the like. This is not limited.

In other words, the first access network device may know, after the first terminal device in the handover preparation phase is handed over to the second access network device, that no other terminal device receives the data of the first multicast service via the first access network device. It should be noted that, that the terminal device receives data of a first multicast service via the first access network device may be understood as that the terminal device has joined the first multicast service via the first access network device. It may also be understood as that, the first terminal is the last first terminal device that receives the data of the first multicast service via the first access network device and that is known in the preparation phase, and the first terminal device is subsequently handed over to the second access network device. It may also be understood as that, the first terminal device is the last first terminal device that receives the data of the first multicast service via the first access network device, and the first terminal device is subsequently handed over to the second access network device.

For example, the first access network device may be referred to as a source access network device, and the second access network device may be referred to as a target access network device.

For example, the handover herein may be Xn handover or N2 handover.

It should be noted that, the handover preparation phase may be a phase in which the source access network device, the target access network device, or a core network device (which may be an AMF, an SMF, a UPF, or the like herein, and is not limited) prepares, for the first terminal device, a resource needed by the handover. The resource needed by the handover may include a forwarding tunnel, radio bearer configuration information needed by the first terminal device to receive service data via the target access network device, an air interface resource configured by the target access network device for the first terminal device, or the like. This is not limited in this embodiment of this application.

Figure 9A:
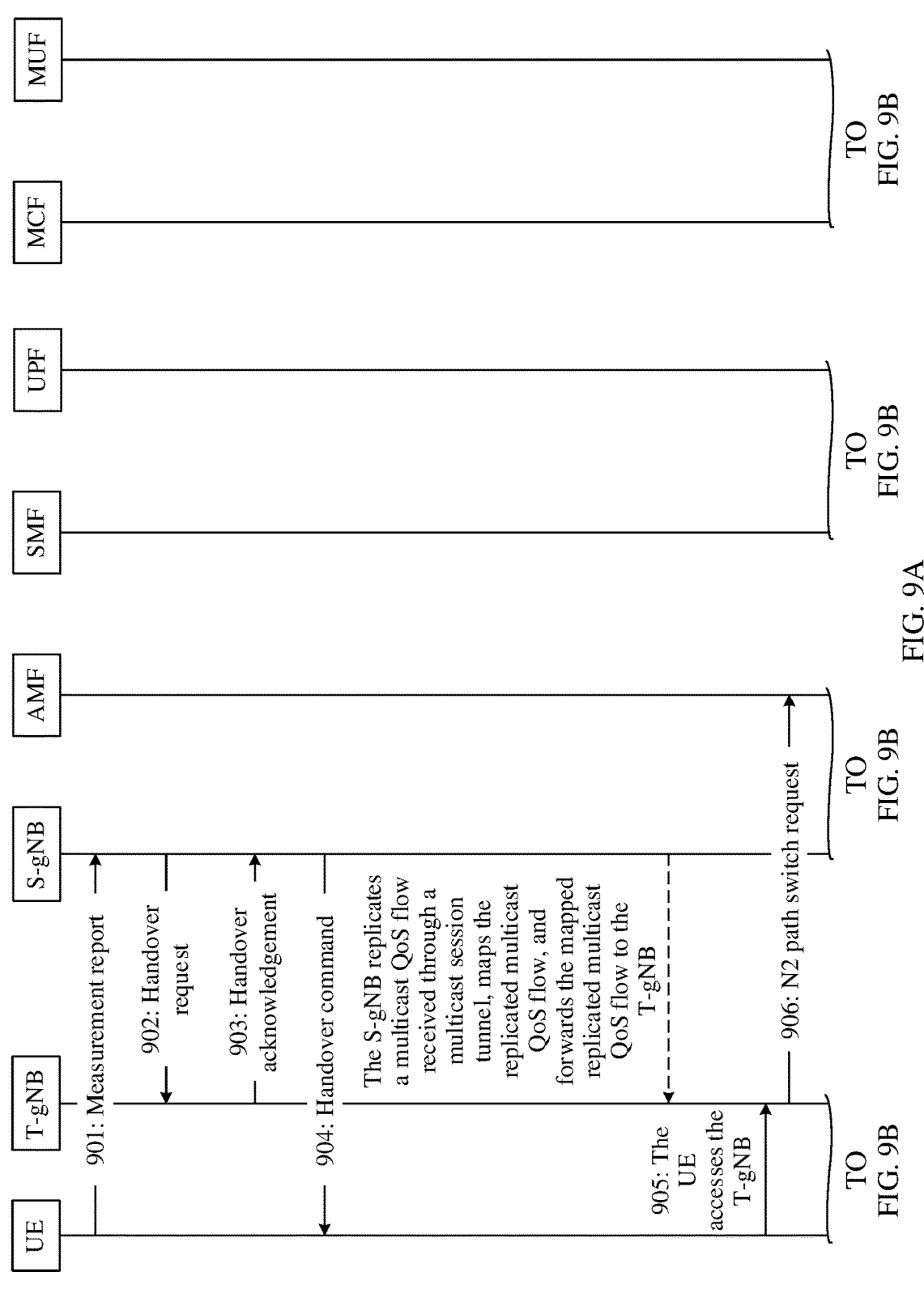
FIG. 9A and FIG. 9B are a specific example of another communication method according to an embodiment of this application.
Figure 9B:
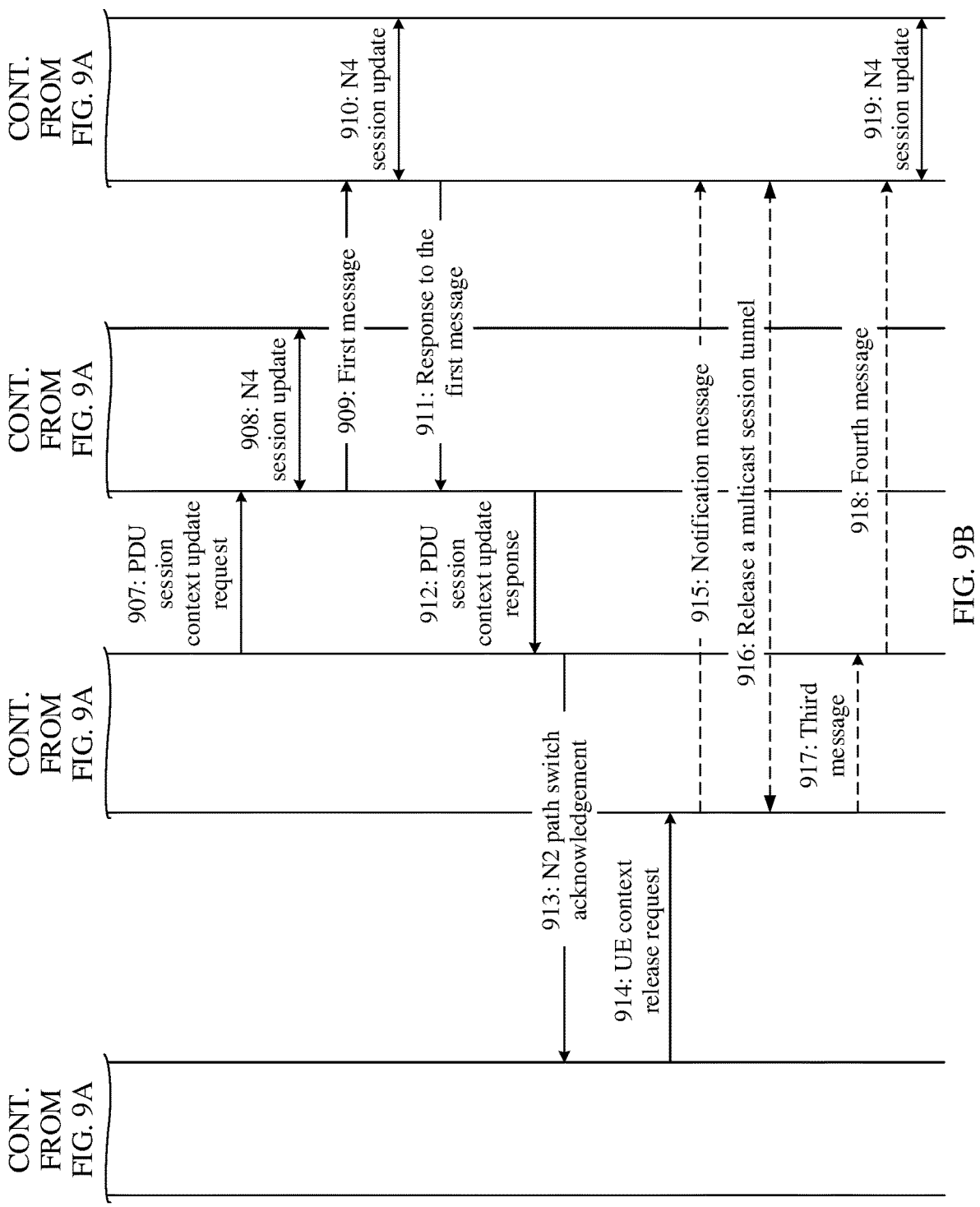

In an Xn handover scenario, the handover preparation phase may be a process in which the source access network device receives a measurement report of the first terminal device, and makes a handover decision on the first terminal device based on the measurement report, where a decision result is handover; and the source access network device sends a handover request to the target access network device, and receives a handover acknowledgement sent by the target access network device, for example, a process of steps 901 to 903 in FIG. 9A and FIG. 9B below.

Figure 10A:
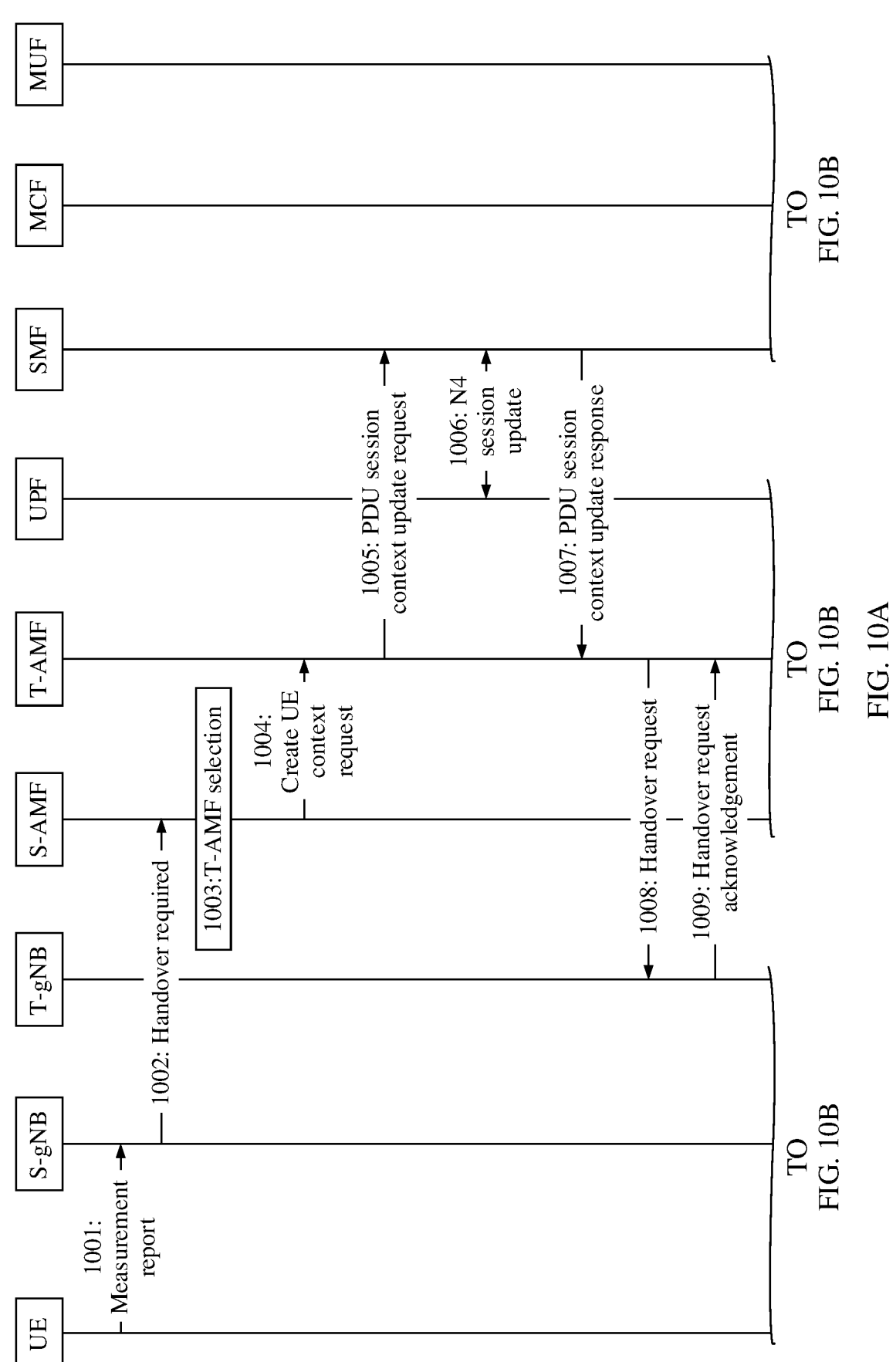
Figure 10C:
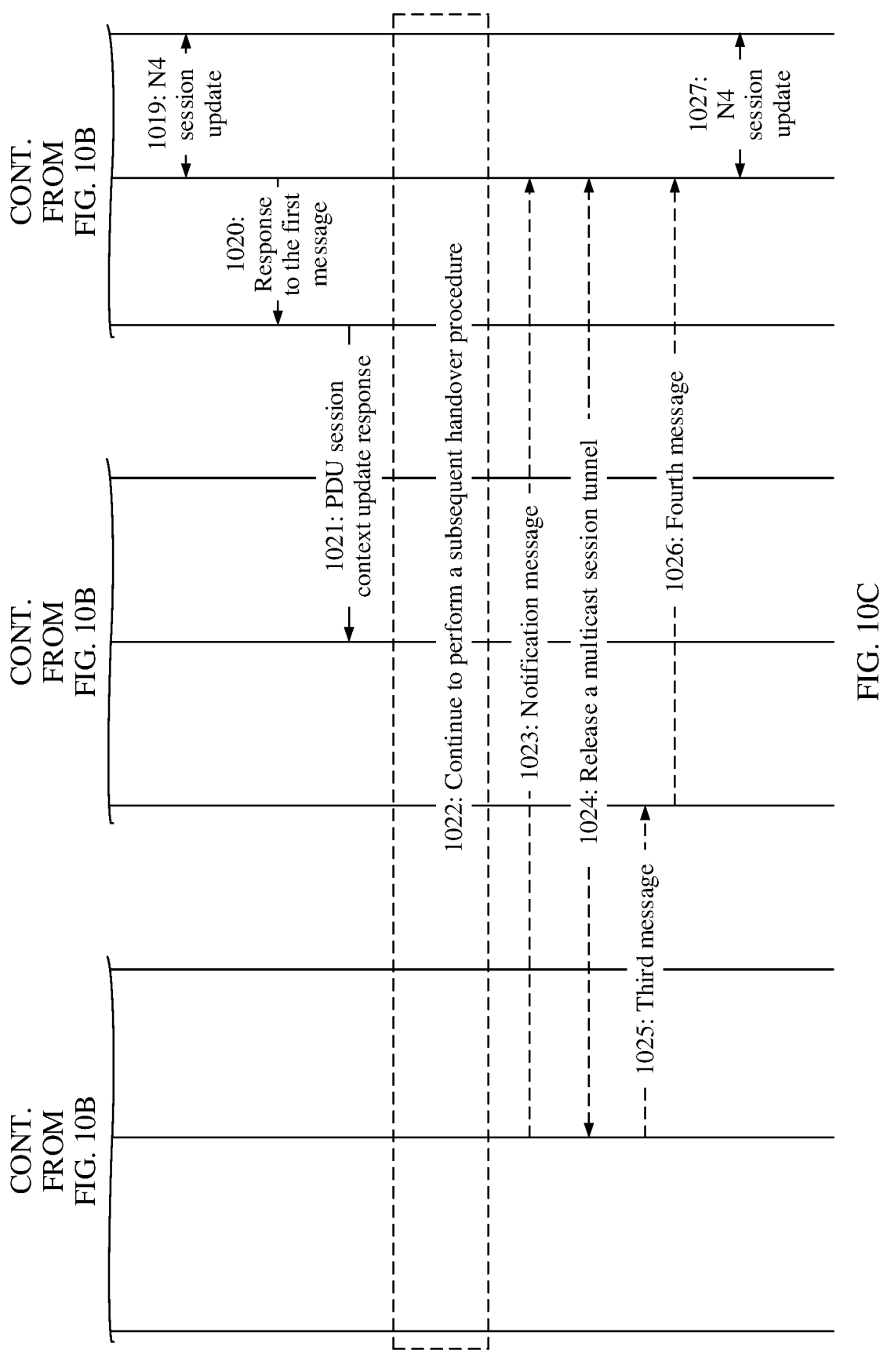

In the N2 handover, the handover preparation phase may be a process in which the source access network device receives a measurement report of the first terminal device, and sends handover required to a source access and mobility management function network element based on the measurement report, and the source access and mobility management function network element receives a create UE context response from a target access and mobility managementment network element, for example, a process of steps 1001 to 1012 in FIG. 10A to FIG. 10C below.

The source access network device may know, at any time point in the handover preparation phase, that the first terminal device is the last terminal device that receives the data of the first multicast service via the first access network device.

For example, in the Xn handover scenario, when the source access network device receives the measurement report of the first terminal device, and makes the handover decision on the first terminal device based on the measurement report, where the decision result is the handover (for example, after step 901 in FIG. 9A and FIG. 9B below), or when sending the handover request to the target access network device (for example, after step 902 in FIG. 9A and FIG. 9B below), or after receiving the handover acknowledgement from the target access network device (for example, after step 903 in FIG. 9A and FIG. 9B below), the source access network device knows that the first terminal device is the last terminal device that receives the data of the first multicast service via the first access network device.

For another example, in an N2 handover scenario, when receiving the measurement report of the first terminal device (for example, after step 1001 in FIG. 10A to FIG. 10C below), or after sending the handover required to the source access and mobility management function network element (for example, after step 1002 in FIG. 10A to FIG. 10C below), the source access network device may know that the first terminal device is the last terminal device that receives the data of the first multicast service via the first access network device.

In some optional embodiments, in the handover preparation phase, when the first terminal device that has joined the first multicast service sends a measurement report to the source access network device, the source access network device makes a handover decision on the first terminal device based on the measurement report, where a decision result is handover; and the source access network device may update a quantity of terminal devices that have joined the first multicast service via the source access network device, for example, decrease the quantity of terminal devices by 1. When the quantity of terminal devices is 0, it may be known that the first terminal device is the last terminal device that receives the data of the first multicast service via the first access network device.

For example, in the Xn handover, after receiving the measurement report of the first terminal device and determining to perform handover (for example, after step 901 in FIG. 9A and FIG. 9B below), or after sending the handover request to the target access network device (for example, after step 902 in FIG. 9A and FIG. 9B below), or after receiving the handover acknowledgement sent by the target access network device (for example, after step 903 in FIG. 9A and FIG. 9B below), the source access network device may update the quantity of terminal devices that have joined the first multicast service via the source access network device. Then, the source access network device may determine, based on the updated quantity of terminal devices, whether the first terminal device is the last terminal device that has joined the first multicast service via the source access network device.

For example, in the N2 handover, after receiving the measurement report of the first terminal device, before sending the handover required to the source access and mobility management function network element, or after sending the handover required to the source access and mobility management function network element, the source access network device may update the quantity of terminal devices that have joined the first multicast service via the source access network device.

For example, in the N2 handover, after receiving the measurement report of the first terminal device (for example, after step 1001 in FIG. 10A to FIG. 10C below), or after sending the handover required to the source access and mobility management function network element (for example, after step 1002 in FIG. 10A to FIG. 10C below), the source access network device may update the quantity of terminal devices that have joined the first multicast service via the source access network device. Then, the source access network device may determine, based on the updated quantity of terminal devices, whether the first terminal device is the last terminal device that has joined the first multicast service via the source access network device.

In some optional embodiments, the quantity of terminal devices that have joined the multicast service via the source access network device may be included in a multicast context, a multicast session context, a multicast group context, or a multicast service context corresponding to a multicast service associated with a PDU session of the first terminal device. In other words, depending on whether another terminal device other than the terminal device in the multicast context, the multicast session context, the multicast group context, or the multicast service context receives the first multicast service, the source access network device determines whether the first terminal device is the last terminal device that receives the data of the first multicast service via the source access network device.

When the first terminal device is the last terminal device in the multicast context, the multicast session context, the multicast group context, or the multicast service context, after the terminal device leaves the source access network device, no other terminal device receives the first multicast service via the source access network device. In this case, the source access network device may know that the first terminal device is the last terminal device that receives the data of the first multicast service via the source access network device.

It should be noted that, in this embodiment of this application, one multicast service may correspond to one multicast session, and correspond to one multicast session tunnel between one access network device and the core network device (such as an MB-UPF or the UPF). It should be noted herein that, one multicast service may alternatively correspond to a plurality of multicast sessions, and correspond to multicast session tunnels between a plurality of access network devices and the core network device.

820: The first access network device sends first information to the core network device. The first information is used to release a first tunnel, and the first tunnel is used to transmit the data of the first multicast service between the first access network device and the core network device.

In some embodiments, the core network device may be a multicast user plane function network element, for example, may be an MUF, an M-UPF, an MS-UPF, or an MB-UPF. This is not limited. In this case, the first tunnel may include a tunnel used to transmit the first multicast service between the source access network device and the multicast user plane function network element (such as the MUF, the M-UPF, the MS-UPF, or the MB-UPF) (where the tunnel is, for example, the multicast session tunnel described above).

In some embodiments, the core network device may be a user plane function network element, for example, may be the UPF. In this case, the first tunnel may include a tunnel used to transmit the first multicast service between the source access network device and the user plane function network element (for example, the UPF) (where the tunnel is, for example, the multicast session tunnel described above).

It should be noted that, when the core network device is the user plane function network element, the user plane function network element may include a user plane function that can be used to process the multicast service. That is, it may be considered that the user plane function that can be used to process the multicast service (for example, the MUF, the M-UPF, the MS-UPF, or the MB-UPF) may be combined with the user plane function network element into a function network element. Correspondingly, in this case, a session management function network element may include a control plane function that can be used to process the multicast service. That is, the control plane function that can be used to process the multicast service (for example, the MCF, the M-SMF, the MS-SMF, or the MB-SMF) may be combined with the session management function network element into a function network element.

In some embodiments, when the core network device is the multicast user plane function network element, the first access network device may first send the first information to the multicast session management function network element, and the multicast session management function network element may then send the first information to the multicast user plane function network element.

In a possible implementation, the first access network device sends the first information to the multicast session management function network element via another network device (such as the second access network device, the AMF, or the SMF), and the multicast session management function network element may then send the first information to the multicast user plane function network element. For example, the multicast session management function network element may be a multicast service session management function network element or a multicast control plane function network element, such as the MB-SMF or the MCF. This is not limited in this embodiment of this application. In a possible implementation, the first access network device sends the first information to the multicast session management function network element via another core network device (for example, the AMF), and the multicast session management function network element may then send the first information to the multicast user plane function network element. In another possible implementation, the first access network device may directly send the first information to the multicast session management function network element, for example, by using a notification message or a request message. This is not limited.

In some embodiments, when the core network device is the user plane function network element, the first access network device may first send the first information to the session management function network element, and the session management function network element may then send the first information to the user plane function network element.

In a possible implementation, the first access network device sends the first information to the session management function network element via another network device (such as the second access network device or the AMF), and the session management network element then sends the first information to the user plane function network element. In a possible implementation, the first access network device sends the first information to the session management function network element via another core network device (for example, the AMF), and the session management function network element then sends the first information to the user plane function network element. In another possible implementation, the first access network device may directly send the first information to the session management function network element, for example, by using a notification message or a request message. This is not limited.

In a first optional implementation scenario, for example, in the Xn handover scenario, when receiving a measurement report of the first terminal device, and determining, based on the measurement report, that the first terminal device needs to be handed over to the second access network device, or determining to send a handover request to the second access network device, the first access network device may know that the first terminal device is the last terminal device that has joined the first multicast service via the first access network device. In this case, the first access network device may send a handover request (for example, a handover request) to the second access network device, where the handover request includes the first information. The handover request may request to hand over the first terminal device from the first access network device to the second access network device.

Correspondingly, after receiving the handover request from the first access network device, the second access network device may send a path switch request (for example, an N2 path switch request) to the access and mobility management function network element (for example, an AMF), where the path switch request includes the first information. Then, the access and mobility management function network element may send a PDU session context update request (for example, an Nsmf_PDUSession_UpdateSMContext Request) to the session management function network element, where the PDU session context update request includes the first information.

Further, when the core network device in step 820 is the multicast user plane function network element, after receiving the PDU session context update request, the session management function network element may send a first message to the multicast session management function network element, where the first message includes the first information. For example, the first message may be an N16 message. After receiving the first message, the multicast session management function network element may send a fifth message to the multicast user plane function network element, where the fifth message may include the first information. For example, the fifth message may be an N4 session update request. The multicast user plane function network element may obtain the first information based on the fifth message, and further perform step 830.

When the core network device in step 820 is the user plane function network element, after receiving the PDU session context update request, the session management function network element may send an N4 session update request to the user plane function network element, where the N4 session update request may include the first information. The user plane function network element may obtain the first information based on the N4 session update request, and further perform step 830.

In a second optional implementation scenario, for example, in an N2 handover scenario, when receiving a measurement report of the first terminal device, or determining to send handover required to the source access and mobility management function network element, the first access network device may know that the first terminal device is the last terminal device that has joined the first multicast service via the first access network device. In this case, the first access network device may send the handover required (for example, handover required) to the first access and mobility management function network element, where the handover required includes the first information. For example, the first access and mobility management function network element may be a source access and mobility management function network element.

Correspondingly, after receiving the handover required, the first access and mobility management function network element may send a create UE context request (for example, an Namf_Communication_CreateUEContext Request) to a second access and mobility management function network element, where the create UE context request includes the first information. Then, the second access and mobility management function network element sends a PDU session update context request to a session management function network element, where the PDU session update context request may include the first information. The second access and mobility management function network element may be referred to as a target access and mobility management function network element.

Further, when the core network device in step 820 is the multicast user plane function network element, after receiving the PDU session context update request, the session management function network element may send a first message to the multicast session management function network element, where the first message includes the first information. For example, the first message may be an N16 message. After receiving the first message, the multicast session management function network element may send a fifth message to the multicast user plane function network element, where the fifth message may include the first information. For example, the fifth message may be an N4 session update request. Correspondingly, the multicast user plane function network element may obtain the first information based on the fifth message, and further perform step 830.

When the core network device in step 820 is the user plane function network element, after receiving the PDU session context update request, the session management function network element may send a session update request (for example, an N4 session update request) to the user plane function network element, where the session update request may include the first information. Correspondingly, the multicast user plane function network element may obtain the first information based on the session update request, and further perform step 830.

In a third optional implementation scenario, when the core network device in step 820 is the multicast user plane function network element, the first access network device may know, at any time point in the handover preparation phase, that the first terminal device is the last terminal device that has joined the first multicast service via the first access network device. When or after knowing that the first terminal device is the last terminal device that has joined the first multicast service via the first access network device, the first access network device may send a third message to a third access and mobility management function network element, where the third message may be an N2 message, and the third message carries the first information. For example, the third access and mobility management function network element may be an access and mobility management function network element that is selected by the first access network device for the first multicast service when the first terminal device joins the first multicast service, or another access and mobility management function network element that is related to or unrelated to the first terminal device.

Further, after receiving the third message, the third access and mobility management function network element may send a fourth message to the multicast session management function network element, where the fourth message carries the first information. For example, the fourth message may be an N11 message. After receiving the fourth message, the multicast session management function network element may send, to the multicast user plane function network element, a fifth message, which may carry the first information. For example, the fifth message may be an N4 session update request. Correspondingly, the multicast user plane function network element may obtain the first information based on the fifth message, and further perform step 830.

For example, when the first terminal device joins the multicast service or a broadcast service, the first access network device may obtain an identifier of the multicast session management function network element. In this way, the first access network device may select the third access and mobility management function network element based on the identifier. For example, the first access network device may query a network repository function (network repository function, NRF) based on the identifier, to obtain an appropriate third access and mobility management function network element.

The access and mobility management function network element related to the first terminal device may be an access and mobility management function network element that can provide a non-access stratum (non-access stratum, NAS) signaling service for the first terminal device, and the access and mobility management function network element unrelated to the first terminal device may be an access and mobility management function network element that cannot provide the NAS signaling service for the first terminal device.

It should be noted that, the third access and mobility management function network element may be a same network element as the foregoing source access and mobility management function network element, or may be a same network element as the foregoing target access and mobility management function network element. This is not limited in this embodiment of this application.

It should be noted that, the third message, for example, the N2 message, may be an existing N2 message (to be specific, the existing N2 message additionally carries the first information), or may be a new N2 message. The new N2 message may be mainly used to release the multicast session tunnel. The new N2 message may follow a naming manner of a service-based interface signaling message, and a specific name of the N2 message is not limited, but a function is used to notify the multicast user plane function network element to release the multicast session tunnel.

It should be noted that, the fourth message, for example, the N11 message, may be an existing N11 message (to be specific, the existing N11 message additionally carries the first information), or may be a new N11 message. The new N11 message may be mainly used to release the multicast session tunnel. The new N11 message may follow a naming manner of a service-based interface signaling message, and a specific name of the N11 message is not limited, but a function is used to notify the multicast user plane function network element to release the multicast session tunnel.

In a fourth optional implementation scenario, the first access network device may know, at any time point in the handover preparation phase, that the first terminal device is the last terminal device that has joined the first multicast service via the first access network device. When or after the first access network device knows that the first terminal device is the last terminal device that has joined the first multicast service via the first access network device, the first access network device may directly send the first information to the core network device.

For example, when the core network device in step 820 is the multicast user plane function network element, the first access network device may directly send the first information to the multicast session management function network element, and the multicast session management function network element then sends the first information to the multicast user plane function network element (for example, includes the first information in the fifth message), to perform step 830. This is not limited.

For example, when the core network device in step 820 is the user plane function network element, the first access network device may directly send the first information to the session management function network element, and the session management function network element then sends the first information to the user plane function network element (for example, includes the first information in the N4 session update request), to perform step 830. This is not limited.

In the first optional implementation scenario or the second optional implementation scenario, after receiving the measurement report of the first terminal device in the handover preparation phase, or when determining to send the handover request or the handover required, the first access network device knows that the first terminal device is the last terminal device that has joined the first multicast service via the first access network device, and the first access network device can include the first information in existing signaling (such as the handover request or the handover required), so that the first information is finally sent to the multicast user plane function network element or the user plane function network element. This helps reduce network resource overheads.

In the third optional implementation scenario or the fourth optional implementation scenario, after receiving the measurement report of the first terminal device in the handover preparation phase, the first access network device knows that the first terminal device is the last terminal device that has joined the first multicast service via the first access network device, and after knowing, immediately sends the third message to the third access and mobility management function network element or immediately sends the first information to the multicast session management function network element or the session management network element, and the first access network device can know, at an earlier time point in the handover preparation phase, that the first terminal device is the last terminal device that has joined the first multicast service via the first access network device. This can help the multicast user plane function network element or the user plane function network element obtain the first information earlier.

In the third optional implementation scenario or the fourth optional implementation scenario, when receiving the handover request acknowledgement in the handover preparation phase, the first access network device knows that the first terminal device is the last terminal device that has joined the first multicast service via the first access network device. Compared with the foregoing knowing, at the earlier time point in the handover preparation phase, that the first terminal device is the last terminal device, the first access network herein can more accurately know that the first terminal device is the last terminal device that has joined the first multicast service via the first access network device. This further helps improve reliability of multicast service transmission.

In an example of this application, the first information may include an indication (indication) used to release the first tunnel and information about the first tunnel.

In another example of this application, the first information may include an indication used to release the first tunnel and identification information of the first multicast service.

In another example of this application, the first information may include an indication used to release the first tunnel, identification information of the first multicast service, and information about the first tunnel.

It should be noted that, when the first information includes the information about the first tunnel, the first information may include information about one, two, or more first tunnels. This is not limited. When the first information includes the identification information of the first multicast service, the first information may include identification information of one, two, or more first multicast services. This is not limited.

The information about the first tunnel may be used to uniquely determine the first tunnel, for example, may be a tunnel endpoint identifier (TED) of the first tunnel or an ID of the first tunnel. This is not limited herein. The identification information of the first multicast service may be used to uniquely determine a multicast service, for example, may be a multicast service ID, a multicast service name, a multicast address, a multicast group ID, a multicast/broadcast session ID (MBS session ID), or a temporary mobile group identity (TMGI). This is not limited herein.

It should be noted that, the first multicast service described in this specification may include one multicast service or a plurality of different multicast services. This is not limited. For example, when the source access network device has two multicast sessions, corresponding to two multicast services and corresponding to two multicast session tunnels, and the source access network device knows, in the handover preparation phase, that a terminal device to be handed over is a last terminal device that receives data of the two multicast services via the source access network device, the source access network device may send first information to the core network device. In this case, the first information is used to release a first tunnel used to transmit the data of the two multicast services between the source access network device and the core network device, the first multicast service includes the two multicast services, and the first tunnel includes the tunnels respectively corresponding to the two multicast services.

830: The core network device releases a first tunnel based on the first information.

For example, the multicast user plane function network element or the user plane function network element may release the first tunnel based on the first information, for example, remove a related resource of the first tunnel (for example, remove a tunnel endpoint identifier of the first tunnel, for example, a TEID; or remove N4 session context information related to the first tunnel of the first multicast service) (for example, including a data detection rule (PDR) and a forwarding action rule (FAR)).

For example, when the first information includes indication used to release the first tunnel and information about the first tunnel, the multicast user plane function network element or the user plane function network element may release the first tunnel based on the indication (indication) used to release the first tunnel and the information about the first tunnel. In an example, when the information about the first tunnel in the first information is a TED of the first tunnel, the multicast user plane function network element or the user plane function network element may release the TED. In another example, when the information about the first tunnel in the first information is an ID of the first tunnel, the multicast user plane function network element or the user plane function network element may determine the first tunnel based on the ID of the first tunnel, and then release the first tunnel based on the indication used to release the first tunnel, for example, remove a related resource of the first tunnel, such as a TEID, or N4 session context information related to the first tunnel of the first multicast service.

In this way, the multicast user plane function network element or the user plane function network element can release the first tunnel (for example, may be one or more first tunnels, which are not limited) corresponding to the information about the first tunnel included in the first information.

For another example, when the first information includes indication used to release the first tunnel and identification information of the first multicast service, the multicast user plane function network element or the user plane function network element may determine the first multicast service based on the identification information of the first multicast service, and then determine the first tunnel for transmitting the data of the first multicast service between the first access network device and the core network device. Specifically, the multicast user plane function network element or the user plane function network element may determine one or a plurality of multicast sessions corresponding to the first multicast service, and one or a plurality of multicast session tunnels corresponding to the one multicast session, or a plurality of multicast session tunnels corresponding to the plurality of multicast sessions. Herein, the determined multicast session tunnel is a tunnel (namely, the first tunnel) for transmitting the data of the first multicast service between the source access network device and the core network device. Then, the multicast user plane function network element or the user plane function network element may release the first tunnel based on the indication used to release the first tunnel, to be specific, release a related resource of the one multicast session tunnel or the plurality of multicast tunnels, such as a TEID, or N4 session context information related to the first tunnel of the first multicast service.

In this way, the multicast session function network element or the session function network element may release all multicast session tunnels corresponding to the first multicast service indicated in the first information, namely, the first tunnels (for example, all the first tunnels) used to transmit the data of the first multicast service between a source access network device and the core network device.

For another example, when the first information includes indication used to release the first tunnel, identification information of the first multicast service, and information about the first tunnel, the multicast user plane function network element or the user plane function network element may determine the first multicast service based on the identification information of the first multicast service. Then, the multicast user plane function network element or the user plane function network element determines the first tunnel for transmitting the data of the first multicast service between the first access network device and the core network device. Specifically, the multicast user plane function network element or the user plane function network element may determine one or a plurality of multicast sessions corresponding to the first multicast service, and one or a plurality of multicast session tunnels corresponding to the one multicast session, or a plurality of multicast session tunnels corresponding to the plurality of multicast sessions. Then, the multicast user plane function network element or the user plane function network element may further determine the first tunnel from the one or plurality of multicast session tunnels based on the information about the first tunnel in the first information. Then, the multicast user plane function network element or the user plane function network element may release the first tunnel based on the indication used to release the first tunnel, for example, remove a related resource of the first tunnel, such as a TEID, or N4 session context information related to the first tunnel of the first multicast service.

In this way, the multicast user plane function network element or the user plane function network element can release the first tunnel corresponding to the information about the first tunnel included in the first information. In addition, when the first tunnel is determined based on both the identification information of the first multicast service and the information about the first tunnel, the first tunnel needs to be determined only from one or more multicast session tunnels corresponding to the first multicast service. This helps determine the first tunnel more accurately and quickly, and improve efficiency of releasing the first tunnel.

It should be noted that, when the first information includes the indication used to release the first tunnel, the identification information of the first multicast service, and the information about the first tunnel, the multicast user plane function network element or the user plane function network element may further determine, based on only one of the identification information of the first multicast service and the information about the first tunnel, the first tunnel that needs to be released. For example, when determining the first tunnel based on only the identification information of the first multicast service, the multicast user plane function network element or the user plane function network element may ignore the information about the first tunnel included in the first information. For another example, when determining the first tunnel based on only the information about the first tunnel, the multicast user plane function network element or the user plane function network element may ignore the identification information of the first multicast service included in the first information.

Therefore, in this embodiment of this application, the first access network device may know, in the handover preparation phase in which the first terminal device is handed over from the first access network device to the second access network device, that the first terminal device is the last terminal device that receives the data of the first multicast service via the first access network device, and send the first information to release the first tunnel used to transmit the data of the first multicast service between the first access network device and the core network device. This helps reduce network resource overheads.

The following describes, with reference to FIG. 9A and FIG. 9B and FIG. 10A to FIG. 10C, specific examples of the communication method according to this embodiment of this application. In FIG. 9A and FIG. 9B and FIG. 10A to FIG. 10C, an example in which the multicast session management function network element is an MCF and the source access network device is an S-gNB is used for description. For implementation methods of a chip in the MCF and a chip in the S-gNB, refer to specific descriptions of the MCF and the S-gNB. Details are not described again.

Optionally, in FIG. 9A and FIG. 9B or FIG. 10A to FIG. 10C, a core network device further includes an AMF, an SMF, a UPF, and an MUF. Alternatively, in some optional embodiments, a core network device may not include an MCF and an MUF. Instead, some functions or units in the SMF implement functions of the MCF, and some functions or units in the UPF implement functions of the MUF. This is not limited in this embodiment of this application.

FIG. 9A and FIG. 9B are a schematic flowchart of another communication method 900 according to an embodiment of this application. A handover type in the method 900 is Xn handover. The S-gNB determines whether to release a multicast session tunnel between the S-gNB and the MUF.

It should be noted that in FIG. 9A and FIG. 9B, an example in which the multicast session tunnel between the S-gNB and the MUF is released is used for description. This solution is also suitable for releasing a multicast session tunnel between the S-gNB and the UPF, and some simple adaptation may be needed. FIG. 9A and FIG. 9B and some simple adaptation fall within the protection scope of this application.

In some embodiments, when a UE receives multicast service data via the S-gNB (or in other words, the UE joins a multicast service via the S-gNB), a PDU session of the UE is associated with the multicast service.

When a T-gNB to which the UE is handed over does not support a multicast function, the method 900 is applicable to the scenario shown in FIG. 5B. The following describes the method 900 with reference to the scenario in FIG. 5B. As shown in FIG. 9A and FIG. 9B, the method 900 may include steps 901 to 916. It should be noted that, this solution is also applicable to a scenario in which the T-gNB supports the multicast function. This is not limited herein. The scenario shown in FIG. 5B is merely an example.

It should be understood that FIG. 9A and FIG. 9B show steps or operations of the communication method 900 provided in this embodiment of this application, but these steps or operations are merely examples. In this embodiment of this application, other operations or variations of the operations in FIG. 9A and FIG. 9B may be further performed. In addition, steps in the figure may be performed in a sequence different from that presented in the figure, and it is possible that not all operations in the figure need to be performed.

Optionally, before step 901, the S-gNB may know a capability of the T-gNB, namely, a capability about whether the multicast function is supported. For example, when there is an Xn connection between the T-gNB and the S-gNB, the T-gNB may notify the S-gNB of capability information of the T-gNB by using an Xn interface, where Xn may be an interface of the Xn connection between the S-gNB and the T-gNB. For example, when the T-gNB does not support the multicast function, the T-gNB sends indication information #1 to the S-gNB, where the indication information #1 indicates that the T-gNB does not support the multicast function. Alternatively, in some embodiments, when the T-gNB does not support the multicast function, the T-gNB may not send indication information #1 to the S-gNB. Correspondingly, if the S-gNB does not receive the indication information #1, it may be considered that the T-gNB does not support the multicast function.

Herein, first, according to a definition of a handover preparation phase of the Xn handover in the 3GPP technical specification (TS) 38.300, the handover preparation phase includes steps 901 to 903 in a procedure shown in FIG. 9A and FIG. 9B. The handover preparation phase may be understood as a phase in which the S-gNB, the T-gNB, or a core network device prepares, for a UE to be handed over, a resource needed by the handover (which, for example, may include a forwarding tunnel, radio bearer configuration information needed by the UE to receive service data after the UE accesses the T-gNB, or an air interface resource configured by the T-gNB for the UE to be handed over).

901: The UE sends a measurement report to the S-gNB. Correspondingly, the S-gNB receives the measurement report, and decides to hand over the UE to the T-gNB.

In some optional embodiments, after receiving the measurement report sent by the UE, the S-gNB may update a quantity of UEs in a multicast context corresponding to a multicast service associated with a PDU session of the UE to be handed over (namely, a multicast service (Multicast Service) or a multicast group that the UE joins via the S-gNB), a multicast service context, a multicast group context, or a multicast session context (for example, decrease the quantity of UEs by 1). If the current UE to be handed over is a last UE in the foregoing context (in other words, no other UE receives the multicast service at the S-gNB after the UE leaves), the S-gNB may know that the UE is the last UE that receives data of the multicast service via the S-gNB. In this case, the S-gNB may determine to release a multicast session tunnel between the S-gNB and the core network device (for example, the MUF in FIG. 5B).

Herein, the multicast service may be an example of the first multicast service in FIG. 8, and the multicast session tunnel may be an example of the first tunnel in FIG. 8.

For example, a quantity of UEs that have joined the multicast service via the S-gNB (which may also be understood as a quantity of UEs that receive the multicast service via the S-gNB) may be included in the multicast session context of the multicast service (or referred to as the multicast service context, the multicast context, or the multicast group context). In other words, depending on whether another UE other than the UE in the context receives the multicast service at the S-gNB, the S-gNB may determine whether to release the multicast session tunnel in which the multicast service is located.

It should be noted herein that, at a granularity of a base station (in other words, in a unit of a base station), one multicast service may correspond to one multicast session, in other words, may correspond to a multicast session tunnel between a base station (for example, the S-gNB) and the core network device (such as the MUF or the UPF). It should be noted herein that, one multicast service may also correspond to a plurality of multicast/broadcast sessions. This is not limited herein. This solution uses a one-to-one correspondence as an example, and this solution is also applicable to a one-to-many correspondence.

902: The S-gNB sends a handover request to the T-gNB. Herein, the S-gNB may know that the T-gNB does not support the multicast function.

For example, the handover request may include PDU session information of the UE to be handed over, which includes a PDU session identifier and QoS information corresponding to a unicast service included in the PDU session. For details, refer to the description in step 702. For brevity, details are not described herein again.

It should be noted that in step 902, if the PDU session of the current UE to be handed over is associated with the multicast service, the S-gNB may map a multicast QoS flow to a unicast QoS flow based on a mapping relationship between a multicast QoS flow QFI and a unicast QoS flow QFI. That is, in this case, the unicast QoS flow included in the PDU session further includes the unicast QoS flow to which the multicast QoS flow is mapped.

In addition, the handover request may further include an identifier of a service flow that the S-gNB intends to forward through a forwarding tunnel corresponding to the PDU session tunnel. Specifically, for the scenario in FIG. 5B, because the T-gNB does not support the multicast function, only a forwarding tunnel corresponding to the PDU session tunnel can be established between the S-gNB and the T-gNB. In this case, if the multicast QoS flow needs to be forwarded through the forwarding tunnel, the handover request may include the QFI of the unicast QoS flow corresponding to the multicast QoS flow.

In some optional embodiments, if determining to release the multicast session tunnel in step 901, the S-gNB may generate information #2, used to release the multicast session tunnel used to transmit the data of the multicast service between the S-gNB and the core network device (such as the UPF or the MUF, where the MUF is used as an example herein). In this case, the handover request may further include the information #2.

In a specific example, for a multicast session tunnel in a downlink direction (that is, a sending direction from the MUF to the S-gNB), after the S-gNB determines or decides to or can release the multicast session tunnel between the S-gNB and the MUF, the S-gNB may generate the information #2.

For example, the information #2 may include an indication used to release the multicast session tunnel and information about the multicast session tunnel; or the information #2 may include an indication used to release the multicast session tunnel and identification information of the multicast service; or the information #2 may include an indication used to release the multicast session tunnel, information about the multicast session tunnel, and identification information of the multicast service. This is not limited in this embodiment of this application.

903: The T-gNB sends a handover request acknowledgement (handover request ACK) to the S-gNB.

For example, the T-gNB prepares, based on the QoS information of the unicast service (including the mapped unicast QoS flow) received from the S-gNB, a radio resource for the UE to be handed over. For example, the T-gNB may determine, based on a QoS parameter corresponding to a QFI of each service flow, a quantity of air interface data radio bearers (DRBs) and a mapping relationship between the QFI and the DRB. In addition, the T-gNB may further determine, based on a QoS parameter corresponding to a QFI to which each DRB is mapped, a configuration parameter corresponding to the DRB. The configuration parameter corresponding to the DRB is, for example, whether an acknowledged mode or an unacknowledged mode is used by a radio link control (RLC) layer corresponding to the DRB. Finally, the T-gNB creates a corresponding DRB.

After preparing the radio resource, the T-gNB sends a handover request acknowledgement (handover request ACK) to the S-gNB. In some optional embodiments, the T-gNB may send, to the S-gNB, information that needs to be relayed to the UE via the S-gNB. For example, the T-gNB may send radio bearer configuration information of the T-gNB to the UE via the S-gNB. The radio bearer configuration information may be used by the UE to receive, after the UE accesses the T-gNB, unicast service data and/or multicast service data sent by the T-gNB.

In some optional embodiments, when the handover request in step 902 includes a QFI of a service flow (including a QFI of a unicast QoS flow and/or a QFI of a multicast QoS flow) that the S-gNB intends to forward through the forwarding tunnel, and the T-gNB supports data forwarding, the T-gNB allocates an endpoint identifier of the forwarding tunnel.

In some optional embodiments, after receiving the measurement report sent by the UE in step 901, if skipping determining whether to release the multicast session tunnel, the S-gNB may update, after receiving the handover request acknowledgement, the quantity of UEs in the multicast session context (or referred to as the multicast service context, the multicast context, or the multicast group context) corresponding to the multicast service associated with the PDU session of the UE to be handed over (for example, decrease the quantity of UEs by 1). If the current UE to be handed over is the last UE in the context (in other words, no other UE receives the multicast service at the base station after the UE leaves), the S-gNB knows that the UE is the last UE that receives the data of the multicast service via the S-gNB. In this case, the S-gNB may determine to release a multicast session tunnel between the S-gNB and the core network device (for example, the MUF in FIG. 5B).

For example, a quantity of UEs that have joined the multicast service via the S-gNB (which may also be understood as a quantity of UEs that receive the multicast service via the S-gNB) and/or identification information of the UEs may be included in the multicast session context (or referred to as the multicast service context, the multicast context, or the multicast group context). In other words, depending on whether another UE other than the UE in the multicast session context (or referred to as the multicast service context, the multicast context, or the multicast group context) receives the multicast service via the S-gNB, the S-gNB may determine whether to release the multicast session tunnel in which the multicast service is located.

For example, if determining, after receiving the handover request acknowledgement, to release the multicast session tunnel, the S-gNB may generate information #2. In this case, the S-gNB may send the information #2 to the T-gNB, for example, by using separate signaling. This is not limited herein. Specifically, for the information #2, refer to the foregoing description. Details are not described again.

904: The S-gNB sends a handover command to the UE. Herein, for the handover command, refer to the description in step 704.

Then, the S-gNB replicates the multicast QoS flow received through the multicast session tunnel, maps the replicated multicast QoS flow, and forwards the mapped replicated multicast QoS flow to the T-gNB.

Different from that "the S-gNB replicates the multicast QoS flow received through the multicast session tunnel, and forwards the replicated multicast QoS flow to the T-gNB 1" in FIG. 7A and FIG. 7B, because the T-gNB does not support the multicast function in this procedure, for the multicast QoS flow that needs to be forwarded, the S-gNB may first replicate the multicast QoS flow in the multicast session tunnel of the S-gNB, and then map the multicast QoS flow to the unicast QoS flow based on the mapping relationship between the multicast QoS flow and the unicast QoS flow. Then, the unicast QoS flow is forwarded to the T-gNB through the forwarding tunnel corresponding to the PDU session tunnel between the S-gNB and the T-gNB. After receiving the unicast QoS flow through the forwarding tunnel, the T-gNB buffers the unicast QoS flow.

905: The UE accesses the T-gNB. Specifically, for step 905, refer to the description in step 705. Details are not described again.

906: The T-gNB sends an N2 path switch request (N2 Path Switch Request) to the AMF.

For example, the request includes a QFI of a unicast QoS flow that is successfully handed over and a QFI of a unicast QoS flow that fails to be handed over in the PDU session of the UE (where the QFI of the unicast QoS flow to which the multicast QoS flow is mapped is included). For example, these QFIs may be encapsulated in an N2 SM message.

In some optional embodiments, the N2 path switch request may further include an endpoint identifier that is of a PDU session tunnel and that is allocated by the T-gNB to the UE.

In some optional embodiments, if receiving the information #2 sent by the S-gNB, the T-gNB further includes the information #2 in the "N2 path switch request".

907: The AMF sends a PDU session context update request (Nsmf_PDUSession_UpdateSMContext Request) to the SMF.

For example, the PDU session context update request includes information included in the N2 SM message in step 906.

In some optional embodiments, before the UE is handed over to the T-gNB, the AMF may collect capability information of the gNB (for example, including capability information of whether the multicast function is supported). For example, when being powered on, the T-gNB may report, to the AMF, whether the T-gNB supports the multicast function. In this case, the PDU session context update request may further include the capability information of the T-gNB.

In some embodiments, if the AMF receives the information #2 sent by the S-gNB (namely, the information #2 that is sent by the S-gNB to the T-gNB, and is then relayed by the T-gNB to the AMF) in step 906, the AMF may include the information #2 in the PDU session context update request.

908: Perform N4 session update (N4 Session Modification) between the SMF and the UPF.

909: The SMF sends a first message to the MCF. For example, the first message may be an N16 message.

In some embodiments, if the SMF receives the information #2 sent by the S-gNB in step 907, the first message sent by the SMF to the MCF may include the information #2.

910: Perform N4 session update (N4 Session Modification) between the MCF and the MUF.

For example, the MCF sends the N4 session update request to the MUF. In some embodiments, if the MCF receives the information #2 sent by the S-gNB in step 909, the MCF may include the information #2 in the N4 session update request. After receiving the information #2, the MUF releases a related multicast session tunnel. For example, the MUF may remove a related resource of the tunnel based on corresponding tunnel identification information.

For example, a multicast/broadcast service usually has only downlink. When a shared tunnel between the S-gNB and the MUF is established, the MUF configures a tunnel endpoint identifier TEID generated by the S-gNB and a PDR configured by the MCF for the MUF. In this way, the MUF can send data of the multicast service to the S-gNB. Therefore, the release herein may be removing a related TEID, or removing a PDR related to the first multicast service. It should be noted herein that, the multicast service data in the entire text may be replaced with multicast/broadcast service data.

In an example, when the information #2 includes the indication used to release the multicast session tunnel and the information about the multicast session tunnel, the MUF may release the first tunnel based on the indication and the information about the multicast session tunnel. For example, when the information about the multicast session tunnel in the information #2 is a TEID of the multicast session tunnel, the MUF may release the TEID. For another example, when the information about the multicast session tunnel is an ID of the multicast session tunnel, the MUF may determine the multicast session tunnel based on the ID of the multicast session tunnel, and then release the multicast session tunnel based on the indication in the information #2, for example, remove a related resource of the multicast session tunnel, for example, a TEID, or remove a PDR related to the first multicast service.

In another example, when the information #2 includes the indication used to release the multicast session tunnel and the identification information of the multicast service, the MUF may determine the multicast service based on the identification information of the multicast service, and then determine the multicast session tunnel for transmitting the data of the multicast service between the S-gNB and the MUF. Specifically, the MUF may determine one or a plurality of multicast sessions corresponding to the multicast service, and one or a plurality of multicast session tunnels corresponding to the one multicast session, or a plurality of multicast session tunnels corresponding to the plurality of multicast sessions. Then, the MUF may release the multicast session tunnel based on the indication in the information #2, to be specific, release a related resource of the one or plurality of multicast session tunnels, for example, a TEID, or remove a PDR related to the first multicast service.

For another example, when the information #2 includes the indication used to release the multicast session tunnel, the identification information of the multicast service, and the information about the multicast session tunnel, the MUF may determine the multicast service based on the identification information of the multicast service. Then, the MUF determines, based on the information about the multicast session tunnel in the information #2, the multicast session tunnel for transmitting the data of the multicast service between the S-gNB and the MUF. Specifically, the MUF may determine one or a plurality of multicast sessions corresponding to the first multicast service, and one or a plurality of multicast session tunnels corresponding to the one multicast session, or a plurality of multicast session tunnels corresponding to the plurality of multicast sessions. Then, the MUF may further determine a multicast session tunnel from the one or plurality of multicast session tunnels based on the information about the multicast session tunnel in the information #2. Then, the multicast user plane function network element or the user plane function network element may release the multicast session tunnel based on the indication in the information #2, for example, remove a related resource of the multicast session tunnel, for example, a TED, or remove a PDR related to the first multicast service.

Then, the MUF may send an N4 session update response to the MCF.

911: The MCF sends a response to the first message to the SMF. Optionally, the response to the first message may include response information for the information #2. In addition, it should be noted that, that a response message is necessary is limited herein, in other words, the response message may not be sent.

Specifically, for steps 908 to 911, refer to the descriptions of steps 708 to 711. Details are not described herein again.

912: The SMF sends a PDU session context update response (Nsmf_PDUSession_UpdateSMContext Response) to the AMF.

In some embodiments, in addition to an existing information element that is specified in the protocol and that is included in the signaling, if the SMF receives a response information element related to the release of multicast session tunnel in step 911, for example, the response information for the information #2, optionally, the PDU session context update response may further include the response information element.

913: The AMF sends an N2 path switch acknowledgement (N2 Path Switch Request ACK) to the T-gNB.

In some embodiments, in addition to an existing information element that is specified in the protocol and that is included in the signaling, if a response information element related to the release of the multicast session tunnel, for example, the response information for the information #2, is included in step 912, optionally, the N2 path switch acknowledgement may further include the response information element.

914: The T-gNB sends a UE context release request to the S-gNB.

In some embodiments, in addition to an existing information element that is specified in the protocol and that is included in the signaling, if a response information element related to the release of the multicast session tunnel, for example, the response information for the information #2, is included in step 913, optionally, the N2 path switch acknowledgement further includes the response information element.

It should be noted that in the embodiment shown in FIG. 9A and FIG. 9B, only an example in which the T-gNB does not support the multicast function is used for description. However, embodiments of this application are not limited thereto. For example, the T-gNB may further support the multicast function. In this case, the S-gNB needs to replicate and forward, to the T-gNB, the multicast QoS flow received through the multicast session tunnel, that is, the multicast QoS flow does not need to be mapped to the unicast QoS flow. For details, refer to the description in FIG. 7A and FIG. 7B. Details are not described again.

In the foregoing step 906, 907, or 909, the information #2 is included in the existing signaling as the information element and is sent to the MCF. However, embodiments of this application are not limited thereto.

In some optional embodiments, the S-gNB may further perform step 915. To be specific, the S-gNB directly sends a notification message to the MCF, where the notification message indicates the MCF to release the multicast session tunnel in which the multicast service is located, namely, the multicast session tunnel used to transmit the multicast service between the S-gNB and the MUF. In this case, the message in step 902, 906, 907, 909, or 910 may not include the information #2. To be specific, the S-gNB does not include the information #2 in the existing signaling as the information element, but notifies, by using separate signaling, the MCF to release the multicast session tunnel.

For example, the signaling may include an indication used to release the multicast session tunnel and information about the multicast session tunnel; or the signaling may include an indication used to release the multicast session tunnel and identification information of the multicast service; or the signaling may include an indication used to release the multicast session tunnel, information about the multicast session tunnel, and identification information of the multicast service. This is not limited in this embodiment of this application.

In a possible implementation, step 915 may be performed after the S-gNB determines to release the multicast session tunnel used to transmit the multicast service between the S-gNB and the MUF, for example, may be performed between step 901 and step 914, or after step 914. This is not limited in this embodiment of this application.

916: Release a multicast session tunnel between the S-gNB and the MCF.

For example, after receiving the signaling in step 915, the MCF may send the signaling to the MUF, and the MUF may release, based on the signaling, a multicast session tunnel used to transmit the multicast service between the S-gNB and the MUF.

In addition, in some other optional embodiments, when the UE joins the multicast service, the MCF may also subscribe to a multicast session tunnel release notification from the S-gNB. In other words, when determining that the multicast session tunnel between the S-gNB and the core network device (such as the MUF or the UPF) needs to be released in the handover process, the S-gNB may send a release notification to the MCF. In this case, the signaling in steps 901 to 914 may be performed based on an existing normal handover procedure, and does not need to include additional information, for example, the information #2.

In some optional embodiments, when the S-gNB decides or determines to or can release the multicast session tunnel of the S-gNB in the handover preparation phase (a specific manner is described in steps 901 to 903, and is not described herein again), the S-gNB may further perform steps 917 to 919.

917: The S-gNB sends a third message to the AMF, where the third message may be an N2 message, and the third message carries the information #2.

It should be noted herein that, the AMF in step 917 may be a same AMF (namely, an AMF that serves the UE to be handed over) as the AMF in the handover procedure in FIG. 9A and FIG. 9B, or may be another AMF. This is not limited. In addition, the N2 message may be an existing N2 message (that is, carrying the information #2), or may be a new N2 message (for example, mainly used to release the multicast session tunnel, where the new N2 message follows a naming manner of a service-based interface signaling message, and a specific name of the N2 message is not limited, but a function notifies the MUF to release the multicast session tunnel). This is not limited in this embodiment of this application.

918: The AMF sends a fourth message to the MCF, where the fourth message may be an N11 message, and the fourth message carries the information #2. For example, the N11 message may be an existing N11 message (that is, carrying the information #2), or may be a new N11 message (for example, mainly used to release the multicast session tunnel, where the new N11 message follows a naming manner of a service-based interface signaling message, and a specific name of the N11 message is not limited, but a function notifies the MUF to release the multicast session tunnel).

919: Perform N4 session update (N4 Session Modification) between the MCF and the MUF. For example, the MCF sends a fifth message to the MUF, where the fifth message may be an N4 session update request, the fifth message carries the information #2, and the MUF releases the multicast session tunnel based on the information #2. Then, the MUF sends, to the MCF, a response to the fifth message, which, for example, may be an N4 session update response.

It should be further noted that, if the S-gNB notifies, through steps 917 to 919, the MUF to release the multicast session tunnel, in the handover procedure shown in FIG. 9A and FIG. 9B, after the S-gNB determines or decides to or can release the multicast session tunnel of a source base station in the handover preparation phase, the S-gNB performs steps 917 to 919 to notify the MUF to release the multicast session tunnel, that is, the information #2 and the response to the release of the related multicast session tunnel are no longer carried in the handover procedure (for example, steps 906 to 914).

Therefore, in this embodiment of this application, in the handover preparation phase in which the UE is handed over from the S-gNB to the T-gNB, when determining that no other UE receives the multicast service via the S-gNB in the multicast session context (or the multicast service context, the multicast context, the multicast group context, or the multicast session context), the S-gNB may notify the core network device (such as the MUF or the UPF) to release the multicast session tunnel used to transmit the multicast service between the S-gNB and the core network device, for example, notify, by using the existing signaling or the separate signaling, to release the tunnel, to release the multicast session tunnel between the S-gNB and the core network device (such as the MUF or the UPF). This helps reduce network resource overheads.

FIG. 10A to FIG. 10C are a schematic flowchart of another communication method 1000 according to an embodiment of this application. Handover in the method 1000 is N2 handover. The S-gNB determines whether to release a multicast session tunnel between the S-gNB and the MUF.

It should be noted that in FIG. 10A to FIG. 10C, an example in which the multicast session tunnel between the S-gNB and the MUF is released is used for description. This solution is also suitable for releasing a multicast session tunnel between the S-gNB and the UPF, and some simple adaptation may be needed. FIG. 10A to FIG. 10C and some simple adaptation fall within the protection scope of this application.

In some embodiments, when a UE receives multicast service data via the S-gNB (or in other words, the UE joins a multicast service via the S-gNB), a PDU session of the UE is associated with the multicast service.

When a T-gNB to which the UE is handed over does not support a multicast function, the method 1000 is applicable to the scenario shown in FIG. 5C. The following describes the method 1000 with reference to the scenario in FIG. 5C. As shown in FIG. 10A to FIG. 10C, the method 1000 may include steps 1001 to 1017. It should be noted that, this solution is also applicable to a scenario in which the T-gNB supports the multicast function. This is not limited herein. The scenario shown in FIG. 5C is merely an example.

It should be understood that FIG. 10A to FIG. 10C show steps or operations of the communication method 1000 provided in this embodiment of this application, but these steps or operations are merely examples. In this embodiment of this application, other operations or variations of the operations in FIG. 10A to FIG. 10C may be further performed. In addition, steps in the figure may be performed in a sequence different from that presented in the figure, and it is possible that not all operations in the figure need to be performed.

Optionally, before step 1001, the S-gNB may know a capability of the T-gNB, namely, a capability about whether the multicast function is supported. For example, when there is an Xn connection between the T-gNB and the S-gNB, the T-gNB may notify the S-gNB of capability information of the T-gNB by using an Xn interface, where Xn may be an interface of the Xn connection between the S-gNB and the T-gNB. For example, when the T-gNB does not support the multicast function, the T-gNB sends indication information #1 to the S-gNB, where the indication information #1 indicates that the T-gNB does not support the multicast function. Alternatively, in some embodiments, when the T-gNB does not support the multicast function, the T-gNB may not send indication information #1 to the S-gNB. Correspondingly, if the S-gNB does not receive the indication information #1, it may be considered that the T-gNB does not support the multicast function.

Herein, first, according to a definition of a handover preparation phase of the N2 handover in the 3GPP technical specification (TS) 23.502, the handover preparation phase includes steps 1001 to 1012 in a procedure shown in FIG. 10A to FIG. 10C. The handover preparation phase may be understood as a phase in which the S-gNB, the T-gNB, or a core network device prepares, for a UE to be handed over, a resource needed by the handover (which, for example, may include information about a forwarding tunnel, radio bearer configuration information needed by the UE to receive service data after the UE accesses the T-gNB, or an air interface resource configured by the T-gNB for the terminal device to be handed over).

1001: The UE sends a measurement report to the S-gNB. Correspondingly, the S-gNB receives the measurement report, and decides to hand over the UE to the T-gNB.

In some optional embodiments, after receiving the measurement report sent by the UE, the S-gNB may update a quantity of UEs in a multicast session context (or a multicast service context, a multicast context, or a multicast group context) corresponding to a multicast service associated with a PDU session of the UE to be handed over (for example, decrease the quantity of UEs by 1). If the current UE to be handed over is a last UE in the foregoing context (in other words, no other UE receives the multicast service at the base station after the UE leaves), the S-gNB may know that the UE is the last UE that receives data of the multicast service via the S-gNB. In this case, the S-gNB may determine to release a multicast session tunnel between the S-gNB and the core network device (for example, the MUF in FIG. 5C).

Herein, the multicast service may be an example of the first multicast service in FIG. 8, and the multicast session tunnel may be an example of the first tunnel in FIG. 8.

For example, a quantity of UEs that have joined the multicast service via the S-gNB (which may also be understood as a quantity of UEs that receive the multicast service via the S-gNB) and/or identification information of the UEs may be included in the multicast session context (or the multicast service context, the multicast context, or the multicast group context). In other words, depending on whether another UE other than the UE in the multicast session context (or the multicast service context, the multicast context, or the multicast group context) receives the multicast service via the S-gNB, the S-gNB may determine whether to release the multicast session tunnel in which the multicast service is located.

It should be noted herein that, at a granularity of a base station (in other words, in a unit of a base station), one multicast service may correspond to one multicast session, in other words, may correspond to a multicast session tunnel between a base station (for example, the S-gNB) and the core network device (such as the MUF or the UPF). It should be noted herein that, one multicast service may also correspond to a plurality of multicast/broadcast sessions. This is not limited herein. This solution uses a one-to-one correspondence as an example, and this solution is also applicable to a one-to-many correspondence.

1002: The S-gNB sends handover required to the S-AMF.

For example, the "handover required" includes PDU session information of the UE to be handed over and associated multicast service information (including an associated multicast service identifier), and the PDU session information includes a PDU session identifier and QoS information corresponding to a unicast service flow included in the PDU session. The QoS information of the unicast service flow includes a QFI and a QoS parameter. If the PDU session of the current UE to be handed over is associated with the multicast service, the S-gNB may map a multicast QoS flow to a unicast QoS flow based on a mapping relationship between a multicast QoS flow QFI and a unicast QoS flow QFI.

In addition, the "handover required" may further include SM N2 information. If the SM N2 information indicates that there is no direct forwarding tunnel between the S-gNB and the T-gNB, it indicates that an indirect forwarding tunnel can be established between the S-gNB and the T-gNB. In this case, the SM N2 information may include the indirect forwarding tunnel information allocated by the S-gNB.

The "handover required" may further include an identifier of a service flow that the S-gNB intends to forward through the forwarding tunnel. If the multicast QoS flow needs to be forwarded through the forwarding tunnel, the handover request includes the QFI of the unicast QoS flow corresponding to the multicast QoS flow.

In some optional embodiments, if determining to release the multicast session tunnel in step 1001, the S-gNB may generate information #2, used to release the multicast session tunnel used to transmit the data of the multicast service between the S-gNB and the core network device (such as the UPF or the MCF, where the MUF is used as an example herein). In this case, the handover required may include the information #2. Specifically, for the information #2, refer to the description in step 902 in FIG. 9A and FIG. 9B. Details are not described again.

1003: The S-AMF selects a target AMF (namely, a Target-AMF or a T-AMF) based on a target cell ID, where the T-AMF is connected to the T-gNB.

1004: The S-AMF sends a create UE context request (Namf_Communication_CreateUEContext Request) to the T-AMF, where the request may include context information that is of the UE to be handed over and that is stored in the S-AMF, and may further include information sent by the S-gNB to the S-AMF in step 1002.

Optionally, if the S-gNB sends the information #2 to the S-AMF in step 1002, the S-AMF sends the information #2 to the T-AMF in step 1004.

1005: The T-AMF sends, to the SMF, a PDU session context update request (Nsmf_PDUSession_UpdateSM-Context Request), which includes information sent by the S-gNB to the S-AMF in step 1002. Optionally, if the information #2 is included in step 1004, the PDU session context update request further carries the information #2.

1006: Perform N4 session update (N4 Session Modification) between the SMF and the UPF.

For example, the SMF sends the N4 session update request to the UPF. Optionally, the N4 session update request carries indirect forwarding tunnel information allocated by the S-gNB. Then, the UPF returns an N4 session update response to the SMF. Optionally, the N4 session update response includes indirect forwarding tunnel information allocated by the UPF, used to establish the indirect forwarding tunnel between the S-gNB and the T-gNB shown in FIG. 5C.

1007: The SMF sends a PDU session context update response (Nsmf_PDUSession_UpdateSMContext Response) to the T-AMF. The message may include the QoS information of the unicast QoS flow of the PDU session. The QoS information includes the QFI and the corresponding QoS parameter. The unicast QoS flow includes the unicast QoS flow to which the multicast QoS flow is mapped.

1008: The T-AMF sends a handover request to the T-gNB. The message may include the QoS information of the unicast QoS flow included in the PDU session (including the QoS information of the unicast QoS flow to which the multicast QoS flow is mapped). The T-gNB allocates a radio resource to the unicast QoS flow based on the QoS information of the QoS flow. Optionally, if the S-gNB supports establishment of the indirect forwarding tunnel, the handover request includes the indirect forwarding tunnel information allocated by the S-gNB and the indirect forwarding tunnel information allocated by the UPF.

1009: The T-gNB sends a handover request acknowledgement (Handover Request ACK) to the T-AMF.

For example, the handover request acknowledgement may include a QFI of a unicast QoS flow that is successfully handed over and/or fails to be handed over (for example, where a handover failure occurs because the T-gNB cannot allocate the radio resource to the unicast QoS flow due to an insufficient resource), a radio bearer configuration needed by the UE to access the T-gNB to receive service data, and the like. In addition, because there is the indirect forwarding tunnel between the S-gNB and the T-gNB, the T-gNB further includes information about the indirect forwarding tunnel in the handover request acknowledgement, (to be specific, used to establish a forwarding tunnel with the UPF), and then sends the tunnel information to the UPF through steps 1009 to 1018.

1010: The T-AMF sends, to the SMF, a PDU session context update request (Nsmf_PDUSession_UpdateSM-Context Request), which includes related information included in the handover request acknowledgement in step 1009.

1011: The SMF sends a PDU session context update response (Nsmf_PDUSession_UpdateSMContext Response) to the T-AMF. Optionally, the response further includes the indirect forwarding tunnel information of the UPF.

1012: The T-AMF sends, to the S-AMF, a create UE context response (Nsmf_PDUSession_UpdateSMContext Response), which includes information in step 1011.

1013: The S-AMF sends, to the S-gNB, a handover command, which includes information in step 1012.

Optionally, if the information #2 is not generated in step 1001 (in other words, the S-gNB does not generate the information #2 after receiving signaling in step 1001, that is, the signaling does not carry the information #2 in steps 1001 to 1005), after the S-gNB receives the handover command, the S-gNB may update the quantity of UEs in the multicast session context corresponding to the multicast service associated with the PDU session of the UE to be handed over (for example, decrease the quantity of UEs by 1). If the current UE to be handed over is a last UE in the multicast session context (or the multicast service context, the multicast context, or the multicast group context) (in other words, no other UE receives the multicast service at the base station after the UE leaves), the S-gNB knows that the UE is the last UE that receives data of the multicast service via the S-gNB. In this case, the S-gNB may determine to release a multicast session tunnel between the S-gNB and the core network device (for example, the MUF in FIG. 5C).

For example, a quantity of UEs that have joined the multicast service via the S-gNB (which may also be understood as a quantity of UEs that receive multicast service data via the S-gNB) may be included in the multicast session context of the multicast service (or the multicast service context of the multicast service (or the multicast service context, the multicast context, or the multicast group context). In other words, depending on whether another UE other than the UE in the multicast session context (or the multicast service context, the multicast context, or the multicast group context) receives the data of the multicast service via the S-gNB, the S-gNB may determine whether to release the multicast session tunnel in which the multicast service is located.

For example, after receiving the handover command, if determining to release the multicast session tunnel, the S-gNB may generate information #2, used to request, indicate, or notify the core network device (such as the MCF or the MUF, where the MUF is used as an example herein) to release the multicast session tunnel in which the multicast service is located. Specifically, for the information #2, refer to the foregoing description. Details are not described again. Then, the S-gNB may include the information #2 in signaling and send the signaling to a session management function network element.

1014: The S-gNB sends, to the UE, a handover command, which includes radio bearer configuration information needed by the UE to access a target base station (where the radio bearer configuration information herein includes radio bearer configuration information needed for the unicast QoS flow and radio bearer configuration information of the unicast QoS flow to which the multicast QoS flow is mapped).

Then, the S-gNB replicates the multicast QoS flow received through the multicast session tunnel, maps the replicated multicast QoS flow, and forwards the mapped replicated multicast QoS flow to the T-gNB through the indirect forwarding tunnel.

1015: The UE accesses the T-gNB. The T-gNB sends the received and buffered unicast QoS flow and/or multicast QoS flow to the UE. The UE receives corresponding service data based on the radio bearer configuration information sent by the S-gNB in step 1014.

1016: The T-gNB sends a handover notification (Handover Notify) to the T-AMF, where the notification indicates that the UE is successfully handed over to the T-gNB.

1017: The T-AMF sends, to the SMF, a PDU session context update request (Nsmf_PDUSession_UpdateSM-Context), which carries information about a PDU session tunnel allocated by the T-gNB. Optionally, information about an indirect forwarding tunnel generated by the T-gNB is further carried.

1018: The SMF sends a first message to the MCF. For example, the first message may be an N16 message.

In some embodiments, if the SMF receives the information #2 sent by the S-gNB in step 1005, the first message sent by the SMF to the MCF may include the information #2.

Descriptions of steps 1019 to 1021 are similar to those of steps 910 to 912. Details are not described herein again.

1022: Continue to perform a subsequent handover procedure based on an N2 handover procedure specified in the 3GPP technical specifications.

It should be noted that in the embodiment shown in FIG. 10A to FIG. 10C, only an example in which the T-gNB does not support the multicast function is used for description. However, embodiments of this application are not limited thereto. For example, the T-gNB may further support the multicast function. In this case, the S-gNB needs to replicate and forward, to the T-gNB, the multicast QoS flow received through the multicast session tunnel, that is, the multicast QoS flow does not need to be mapped to the unicast QoS flow. For details, refer to the description in FIG. 7A and FIG. 7B. Details are not described again.

In the foregoing steps (steps 1002, 1004, 1005, 1007, 1008, 1016, 1017, and 1019) or (steps 1016, 1017, and 1018), the S-gNB includes the information #2 in the existing signaling and sends the information #2 to the MCF, and the MCF further sends the information #2 to the MUF through step 1019. However, embodiments of this application are not limited thereto.

In some optional embodiments, the S-gNB may further perform step 1023. To be specific, the S-gNB directly sends a notification message to the MCF, where the notification message indicates the MCF to release the multicast session tunnel in which the multicast service is located, namely, the multicast session tunnel used to transmit the multicast service between the S-gNB and the MUF. In this case, the message in step (1002, 1004, 1005, 1007, 1008, 1016, 1017, 1018, or 1019) may not include the information #2. To be specific, the S-gNB does not include the related indication information of releasing the multicast session tunnel in the existing signaling as the information element, but notifies, by using separate signaling, the MCF to release the multicast session tunnel.

For example, the signaling may include an indication used to release the multicast session tunnel and information about the multicast session tunnel; or the signaling may include an indication used to release the multicast session tunnel and identification information of the multicast service; or the signaling may include an indication used to release the multicast session tunnel, information about the multicast session tunnel, and identification information of the multicast service. This is not limited in this embodiment of this application.

In a possible implementation, step 1023 may be performed after the S-gNB determines to release the multicast session tunnel used to transmit the multicast service between the S-gNB and the MUF, for example, may be performed between step 1001 and step 1022, or after step 1022. This is not limited in this embodiment of this application.

1024: Release a multicast session tunnel between the S-gNB and the MCF.

For example, after receiving the signaling in step 1023, the MCF may send the signaling to the MUF, and the MUF may release, based on the signaling, a multicast session tunnel used to transmit the multicast service between the S-gNB and the MUF.

In addition, in some other optional embodiments, when the UE joins the multicast service, the MCF may also subscribe to a multicast session tunnel release notification from the S-gNB. In other words, when determining that the multicast session tunnel between the S-gNB and the core network device (such as the MUF or the UPF) needs to be released in the handover process, the S-gNB may send a release notification to the MCF. In this case, the signaling in steps 1001 to 1022 may be performed based on an existing normal handover procedure, and does not need to include additional information, for example, the information #2.

In some optional embodiments, when the S-gNB decides or determines to or can release the multicast session tunnel of the S-gNB in the handover preparation phase (a specific manner is described in steps 1001 to 1012, and is not described herein again), the S-gNB may further perform steps 1025 to 1027.

1025: The S-gNB sends a third message to the S-AMF, where the third message may be an N2 message, and the third message carries the information #2.

It should be noted herein that, the S-AMF in step 1025 may be a same AMF (namely, an S-AMF that serves the UE to be handed over) as the S-AMF in the handover procedure in FIG. 10A to FIG. 10C, or may be another AMF. This is not limited. In addition, the N2 message may be an existing N2 message (that is, carrying the information #2), or may be a new N2 message (for example, mainly used to release the multicast session tunnel, where the new N2 message follows a naming manner of a service-based interface signaling message, and a specific name of the N2 message is not limited, but a function notifies the MUF to release the multicast session tunnel). This is not limited in this embodiment of this application.

1026: The S-AMF sends a fourth message to the MCF, where the fourth message may be an N11 message, and the N11 message carries the information #2. For example, the N11 message may be an existing N11 message (that is, carrying the information #2), or may be a new N11 message (for example, mainly used to release the multicast session tunnel, where the new N11 message follows a naming manner of a service-based interface signaling message, and a specific name of the N11 message is not limited, but a function notifies the MUF to release the multicast session tunnel).

1027: Perform N4 session update (N4 Session Modification) between the MCF and the MUF. For example, the MCF sends a fifth message to the MUF, where the fifth message may be an N4 session update request, and the fifth message carries the information #2. The MUF releases the multicast session tunnel based on the information #2, and then sends, to the MCF, a response to the fifth message, which, for example, may be an N4 session update response.

It should be further noted herein that, if the S-gNB notifies, through steps 1025 to 1027, the MUF to release the multicast session tunnel, in the handover procedure shown in FIG. 10A to FIG. 10C, after the S-gNB determines or decides to or can release the multicast session tunnel of a source base station in the handover preparation phase, the S-gNB performs steps 1025 to 1027 to notify the MUF to release the multicast session tunnel, that is, the information #2 and the response to the release of the related multicast session tunnel are no longer carried in the handover procedure.

Therefore, in this embodiment of this application, in the handover preparation phase in which the UE is handed over from the S-gNB to the T-gNB, when determining that no other UE receives the multicast service via the S-gNB in the multicast session context (or the multicast service context, the multicast context, or the multicast group context), the S-gNB may notify the core network device (such as the MUF or the UPF) to release the multicast session tunnel used to transmit the multicast service between the S-gNB and the core network device, for example, notify, by using the existing signaling or the separate signaling, to release the tunnel, to release the multicast session tunnel between the S-gNB and the core network device (such as the MUF or the UPF). This helps reduce network resource overheads.

Figure 11:
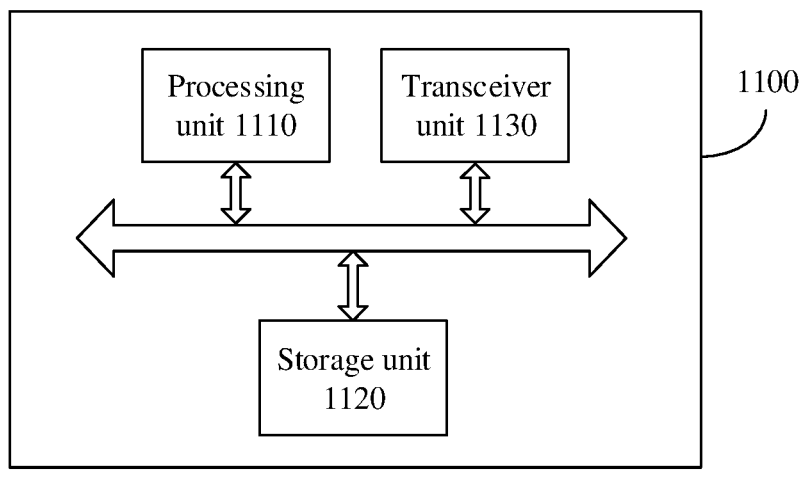
FIG. 11 is a schematic diagram of a structure of a wireless communication device according to an embodiment of this application.

According to the foregoing method, FIG. 11 is a schematic diagram of a wireless communication apparatus 1100 according to an embodiment of this application.

The apparatus 1100 may be an access network device, or may be a chip or a circuit, for example, a chip or a circuit that may be disposed in an access network device.

Alternatively, the apparatus 1100 may be an access and mobility management function network element, or may be a chip or a circuit, for example, a chip or a circuit that may be disposed in an access and mobility management function network element.

Alternatively, the apparatus 1100 may be a session management function network element, or may be a chip or a circuit, for example, a chip or a circuit that may be disposed in a session management function network element.

Alternatively, the apparatus 1100 may be a multicast session management function network element, or may be a chip or a circuit, for example, a chip or a circuit that may be disposed in a multicast session management function network element.

Alternatively, the apparatus 1100 may be a multicast user plane function network element, or may be a chip or a circuit, for example, a chip or a circuit that may be disposed in a multicast user plane function network element.

The apparatus 1100 may include a processing unit 1110 (namely, an example of a processor) and a transceiver unit 1130.

Optionally, the transceiver unit 1130 may be implemented by using a transceiver, a transceiver-related circuit, or an interface circuit.

Optionally, the apparatus 1100 may further include a storage unit 1120. In a possible manner, the storage unit 1120 is configured to store instructions. Optionally, the storage unit 1120 may alternatively be configured to store data or information. The storage unit 1120 may be implemented by using a memory.

In a possible design, the processing unit 1110 may be configured to execute the instructions stored in the storage unit 1120, to enable the apparatus 1100 to implement the steps performed by the access network device in the foregoing method.

Further, the processing unit 1110, the storage unit 1120, and the transceiver unit 1130 may communicate with each other through an internal connection path, to transmit a control signal and/or a data signal. For example, the storage unit 1120 is configured to store a computer program, and the processing unit 1110 may be configured to invoke the computer program from the storage unit 1120 and run the computer program, to control the transceiver unit 1130 to receive a signal and/or send a signal, to complete the steps of the access network device, the access and mobility management function network element, the session management function network element, the multicast session management function network element, or the multicast user plane function network element in the foregoing method. The storage unit 1120 may be integrated into the processing unit 1110, or may be disposed separately from the processing unit 1110.

Optionally, if the apparatus 1100 is a communication device, the transceiver unit 1130 may include a receiver and a transmitter. The receiver and the transmitter may be a same physical entity or different physical entities. When being the same physical entity, the receiver and the transmitter may be collectively referred to as a transceiver.

Optionally, if the apparatus 1100 is the chip or the circuit, the transceiver unit 1130 includes an input interface and an output interface.

In an implementation, it may be considered that a function of the transceiver unit 1130 is implemented by using a transceiver circuit or a dedicated transceiver chip. It may be considered that the processing unit 1110 is implemented by using a dedicated processing chip, a processing circuit, a processing unit, or a general-purpose chip.

In another implementation, it may be considered that the communication device (such as the access network device, the access and mobility management function network element, the session management function network element, the multicast session management function network element, or the multicast user plane function network element) provided in this embodiment of this application is implemented by using a general-purpose computer. That is, program code for implementing functions of the processing unit 1110 and the transceiver unit 1130 is stored in the storage unit 1120, and a general-purpose processing unit implements the functions of the processing unit 1110 and the transceiver unit 1130 by executing the code in the storage unit 1120.

In some embodiments, when the apparatus 1100 is a first access network device, or may be a chip or a circuit disposed in a first access network device, the processing unit 1110 is configured to know that a first terminal device is a last terminal device that receives data of a first multicast service via the first access network device when the first terminal device is in a handover preparation phase in which the first terminal device is handed over from the first access network device to a second access network device; and the transceiver unit 1130 is configured to send first information, where the first information is used to release a first tunnel, and the first tunnel is used to transmit the data of the first multicast service between the first access network device and a core network device.

Optionally, the transceiver unit 1130 is specifically configured to send a handover request to the second access network device, where the handover request requests to hand over the first terminal device from the first access network device to the second access network device, and the handover request includes the first information.

Optionally, the transceiver unit 1130 is specifically configured to send handover required to a first access and mobility management function network element, where the handover required includes the first information.

Optionally, the transceiver unit 1130 is specifically configured to send a third message to a third access and mobility management function network element, where the third message includes the first information, and when the first terminal device joins the first multicast service, the third access and mobility management function network element is an access and mobility management function network element selected by the first access network device for the first multicast service.

Optionally, the processing unit 1110 is further configured to update a quantity of terminal devices that have joined the first multicast service via the first access network device.

Optionally, the first information includes an indication used to release the first tunnel and information about the first tunnel;

the first information includes an indication used to release the first tunnel and identification information of the first multicast service; or the first information includes an indication used to release the first tunnel, identification information of the first multicast service, and information about the first tunnel.

Optionally, the core network device includes a multicast user plane function network element or a user plane function network element.

Functions and actions of the modules or units in the apparatus 1100 listed above are merely examples for description. When the apparatus 1100 is configured in or is the first access network device, the modules or the units in the apparatus 1100 may be configured to perform the actions or processing processes performed by the first access network device in the foregoing method.

In some embodiments, when the apparatus 1100 is a second access network device, or may be a chip or a circuit disposed in a second access network device, the transceiver unit 1130 is configured to receive a handover request from a first access network device, where the handover request requests to hand over a first terminal device from the first access network device to the second access network device, the handover request includes first information, the first information is used to release a first tunnel, and the first tunnel is used to transmit data of a first multicast service between the first access network device and a core network device; and the transceiver unit 1130 is further configured to send a path switch request to an access and mobility management function network element, where the path switch request includes the first information.

Functions and actions of the modules or units in the apparatus 1100 listed above are merely examples for description. When the apparatus 1100 is configured in or is the second access network device, the modules or the units in the apparatus 1100 may be configured to perform the actions or processing processes performed by the second access network device in the foregoing method.

In some embodiments, when the apparatus 1100 is an access and mobility management function network element, or may be a chip or a circuit disposed in an access and mobility management function network element, the transceiver unit 1130 is configured to receive a path switch request from a second access network device, where the path switch request includes first information, the first information is used to release a first tunnel, and the first tunnel is used to transmit data of a first multicast service between a first access network device and a core network device; and the transceiver unit 1130 is further configured to send a protocol data unit PDU session context update request to a session management function network element, where the PDU session context update request includes the first information.

Functions and actions of the modules or units in the apparatus 1100 listed above are merely examples for description. When the apparatus 1100 is configured in or is the access and mobility management function network element, the modules or units in the apparatus 1100 may be configured to perform the actions or processing processes performed by the access and mobility management function network element in the foregoing method.

In some embodiments, when the apparatus 1100 is a session management function network element, or may be a chip or a circuit disposed in a session management function network element, the transceiver unit 1130 is configured to receive a protocol data unit PDU session context update request from an access and mobility management function network element, where the PDU session context update request includes first information, the first information is used to release a first tunnel, and the first tunnel is used to transmit data of a first multicast service between a first access network device and a core network device; and the transceiver unit 1130 is further configured to send a first message to a multicast session management function network element, where the first message includes the first information.

Optionally, the first message may be an N16 message.

In some embodiments, when the apparatus 1100 is a session management function network element, or may be a chip or a circuit disposed in a session management function network element, the transceiver unit 1130 is configured to receive a protocol data unit PDU session context update request from an access and mobility management function network element, where the PDU session context update request includes first information, the first information is used to release a first tunnel, and the first tunnel is used to transmit data of a first multicast service between a first access network device and a core network device; and the transceiver unit 1130 is further configured to send a session update request to a user plane function network element, where the session update request includes the first information.

Functions and actions of the modules or units in the apparatus 1100 listed above are merely examples for description. When the apparatus 1100 is configured in or is the session management function network element, the modules or units in the apparatus 1100 may be configured to perform the actions or processing processes performed by the session management function network element in the foregoing method.

In some embodiments, when the apparatus 1100 is a multicast session management function network element, or may be a chip or a circuit disposed in a multicast session management function network element, the transceiver unit 1130 is configured to receive a first message from a session management function network element, where the first message includes first information, the first information is used to release a first tunnel, and the first tunnel is used to transmit data of a first multicast service between a first access network device and a core network device; and the transceiver unit 1130 is further configured to send a fifth message to a multicast user plane function network element, where the fifth message includes the first information.

Optionally, the first message is an N16 message.

Optionally, the fifth message is an N4 session update request.

Functions and actions of the modules or units in the apparatus 1100 listed above are merely examples for description. When the apparatus 1100 is configured in or is the multicast session management function network element, the modules or units in the apparatus 1100 may be configured to perform the actions or processing processes performed by the multicast session management function network element in the foregoing method.

In some embodiments, when the apparatus 1100 is a first access and mobility management function network element, or may be a chip or a circuit disposed in a first access and mobility management function network element, the transceiver unit 1130 is configured to receive handover required from a first access network device, where the handover required includes first information, the first information is used to release a first tunnel, and the first tunnel is used to transmit data of a first multicast service between the first access network device and a core network device; and the transceiver unit 1130 is further configured to send a create user equipment UE context request to a second access and mobility management function network element, where the create UE context request includes the first information.

Functions and actions of the modules or units in the apparatus 1100 listed above are merely examples for description. When the apparatus 1100 is configured in or is the first access and mobility management function network element, the modules or units in the apparatus 1100 may be configured to perform the actions or processing processes performed by the first access and mobility management function network element in the foregoing method.

In some embodiments, when the apparatus 1100 is a second access and mobility management function network element, or may be a chip or a circuit disposed in a second access and mobility management function network element, the transceiver unit 1130 is configured to receive a create user equipment UE context request from a first access and mobility management function network element, where the create UE context request includes first information, the first information is used to release a first tunnel, and the first tunnel is used to transmit data of a first multicast service between a first access network device and a core network device; and the transceiver unit 1130 is further configured to send a protocol data unit PDU session context update request to a session management function network element, where the PDU session context update request includes the first information.

Functions and actions of the modules or units in the apparatus 1100 listed above are merely examples for description. When the apparatus 1100 is configured in or is the second access and mobility management function network element, the modules or units in the apparatus 1100 may be configured to perform the actions or processing processes performed by the second access and mobility management function network element in the foregoing method.

In some embodiments, when the apparatus 1100 is a third access and mobility management function network element, or may be a chip or a circuit disposed in a third access and mobility management function network element, the transceiver unit 1130 is configured to receive a third message from a first access network device, where the third message includes first information, the first information is used to release a first tunnel, the first tunnel is used to transmit data of a first multicast service between the first access network device and a core network device, and when a first terminal device joins the first multicast service, the third access and mobility management function network element is an access and mobility management function network element selected by the first access network device for the first multicast service; and the transceiver unit 1130 is further configured to send a fourth message to a multicast session management function network element, where the fourth message includes the first information.

Optionally, the third message is an N2 message.

Optionally, the fourth message is an N11 message.

Functions and actions of the modules or units in the apparatus 1100 listed above are merely examples for description. When the apparatus 1100 is configured in or is the third access and mobility management function network element, the modules or units in the apparatus 1100 may be configured to perform the actions or processing processes performed by the third access and mobility management function network element in the foregoing method.

In some embodiments, when the apparatus 1100 is a multicast session management function network element, or may be a chip or a circuit disposed in a multicast session management function network element, the transceiver unit 1130 is configured to receive a fourth message from a third access and mobility management function network element, where the fourth message includes first information, the first information is used to release a first tunnel, the first tunnel is used to transmit data of a first multicast service between a first access network device and a core network device, and when a first terminal device joins the first multicast service, the third access and mobility management function network element is an access and mobility management function network element selected by the first access network device for the first multicast service; and the transceiver unit 1130 is further configured to send a fifth message to a multicast user plane function network element, where the fifth message includes the first information.

Optionally, the fifth message is an N4 session update request.

Optionally, the fourth message is an N11 message.

Functions and actions of the modules or units in the apparatus 1100 listed above are merely examples for description. When the apparatus 1100 is configured in or is the multicast session management function network element, the modules or units in the apparatus 1100 may be configured to perform the actions or processing processes performed by the multicast session management function network element in the foregoing method.

In some embodiments, when the apparatus 1100 is a multicast user plane function network element, or may be a chip or a circuit disposed in a multicast user plane function network element, the transceiver unit 1130 is configured to receive a fifth message from a multicast session management function network element, where the fifth message includes first information, the first information is used to release a first tunnel, and the first tunnel is used to transmit data of a first multicast service between a first access network device and a core network device; and the transceiver unit 1130 is further configured to release the first tunnel based on the first information.

Optionally, the transceiver unit 1130 is specifically configured to receive a fifth message from a multicast session management function network element, where the fifth message includes the first information.

Optionally, the fifth message is an N4 session update request.

Functions and actions of the modules or units in the apparatus 1100 listed above are merely examples for description. When the apparatus 1100 is configured in or is the multicast user plane function network element, the modules or units in the apparatus 1100 may be configured to perform the actions or processing processes performed by the multicast user plane function network element in the foregoing method.

In some embodiments, when the apparatus 1100 is a user plane function network element, or may be a chip or a circuit disposed in a user plane function network element, the transceiver unit 1130 is configured to receive a session update request from a session management network element, where the session update request includes first information, the first information is used to release a first tunnel, and the first tunnel is used to transmit data of a first multicast service between a first access network device and a core network device; and the transceiver unit 1130 is further configured to release the first tunnel based on the first information.

The units in the foregoing embodiment may also be referred to as modules, circuits, or components.

For concepts, explanations, detailed description, and other steps of the apparatus 1100 that are related to the technical solutions according to embodiments of this application, refer to description of the content in the foregoing method or other embodiments. Details are not described herein again.

Figure 12:
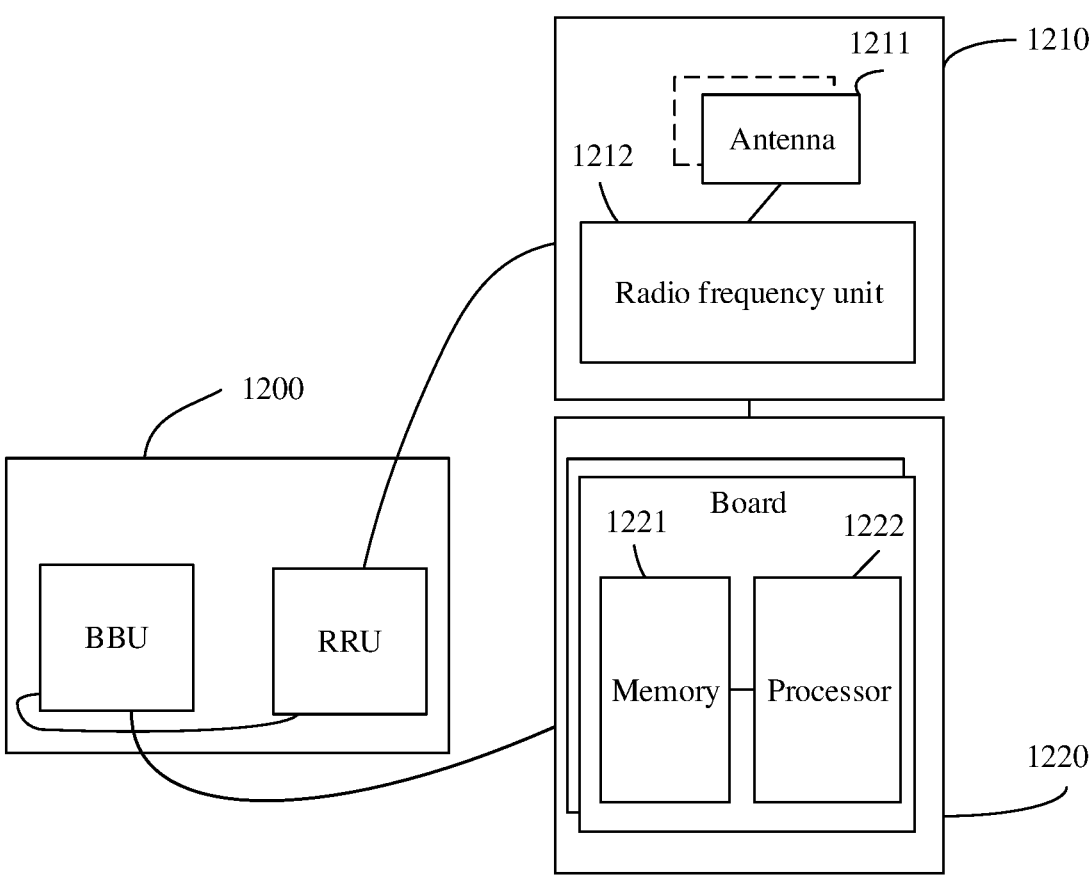
FIG. 12 is a schematic diagram of a structure of a network device according to an embodiment of this application.

FIG. 12 is a schematic diagram of a structure of a network device 1200 according to an embodiment of this application, which may be configured to implement functions of the access network device (such as the first access network device or the second access network device) in the foregoing method. The network device 1200 includes one or more radio frequency units such as a remote radio unit (RRU) 1210 and one or more baseband units (BBUs) (which may also be referred to as digital units (DUs)) 1220. The RRU 1210 may be referred to as a transceiver unit, a transceiver machine, a transceiver circuit, a transceiver, or the like, and may include at least one antenna 1211 and a radio frequency unit 1212. The RRU 1210 is mainly configured to: receive and send a radio frequency signal and perform conversion between the radio frequency signal and a baseband signal, for example, is configured to send the signaling message in the foregoing embodiments to a terminal device. The BBU 1220 is mainly configured to perform baseband processing, control a base station, and so on. The RRU 1210 and the BBU 1220 may be physically disposed together, or may be physically separate, that is, in a distributed base station.

The BBU 1220 is a control center of the base station, may also be referred to as a processing unit, and is mainly configured to implement a baseband processing function such as channel coding, multiplexing, modulation, and spreading. For example, the BBU (the processing unit) 1220 may be configured to control the access network device to perform an operation procedure related to the access network device in the foregoing method embodiments.

In an example, the BBU 1220 may include one or more boards, and a plurality of boards may jointly support a radio access network of a single access standard (such as an LTE system or a 5G system), or may respectively support radio access networks of different access standards. The BBU 1220 further includes a memory 1221 and a processor 1222. The memory 1221 is configured to store necessary instructions and data. The processor 1222 is configured to control the access network device to perform a necessary action, for example, is configured to control the access network device to perform the operation procedure related to the access network device in the foregoing method embodiments. The memory 1221 and the processor 1222 may serve the one or more boards. In other words, a memory and a processor may be separately disposed on each board. Alternatively, the plurality of boards may share a same memory and processor. In addition, a necessary circuit may further be disposed on each board.

In a possible implementation, with development of a system-on-chip (system-on-chip, SoC) technology, all or some functions of the part 1220 and the part 1210 may be implemented by using the SoC technology, for example, by using a base station function chip. The base station function chip integrates devices such as a processor, a memory, and an antenna port. A program of a base station-related function is stored in the memory. The processor executes the program to implement the base station-related function. Optionally, the base station function chip can also read an external memory of the chip, to implement the base station-related function.

It should be understood that the structure of the network device shown in FIG. 12 is merely a possible form, but should not constitute any limitation on this embodiment of this application. This application does not exclude a possibility that a base station structure of another form may appear in the future.

It should be understood that, the processor in embodiments of this application may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware device, or the like. The general-purpose processor may be a microprocessor, or the processor may be any conventional processor or the like.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example, and not limitation, many forms of random access memories (RAMs) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, infrared, radio, and microwave, or the like) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium. The computer-readable medium stores a computer program. When the computer program is executed by a computer, the steps performed by the access network device, the access and mobility management function network element, the session management function network element, the multicast session management function network element, or the multicast user plane function network element in any one of the foregoing embodiments are implemented.

An embodiment of this application further provides a computer program product. When the computer program product is executed by a computer, the steps performed by the access network device, the access and mobility management function network element, the session management function network element, the multicast session management function network element, or the multicast user plane function network element in any one of the foregoing embodiments are implemented.

An embodiment of this application further provides a system chip. The system chip includes: a communication unit and a processing unit. The processing unit may be, for example, a processor. The communication unit may be, for example, an input/output interface, a pin, or a circuit. The processing unit may execute computer instructions, so that a chip in the communication apparatus performs the steps performed by the access network device, the access and mobility management function network element, the session management function network element, the multicast session management function network element, or the multicast user plane function network element provided in embodiments of this application.

Optionally, the computer instructions are stored in a storage unit.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

It should be understood that in embodiments of this application, sequence numbers of the foregoing processes do not mean an execution sequence. An execution sequence of the processes should be determined based on functions and internal logic of the processes, and should not constitute any limitation on the implementation processes of embodiments of this application.

It should be further understood that in the foregoing shown embodiments, first and second are merely intended to distinguish between different objects, and should not constitute any limitation on this application, for example, distinguish between different access network devices and different access and mobility management function network elements.

It should be further understood that, the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, in other words, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
determining, by a first access network device, that a first terminal device is a last terminal device that receives data of a first multicast service via the first access network device in response to the first terminal device being in a handover preparation phase in which the first terminal device is handed over from the first access network device to a second access network device; and
sending, by the first access network device, a message to an access and mobility management function network element, wherein the message includes first information, wherein the first information includes identification information of the first multicast service, a request usable to release a first tunnel, and information about the first tunnel, wherein the information about the first tunnel includes a tunnel endpoint identifier TEID) uniquely identifying the first tunnel, and the first tunnel is useable for transmitting the data of the first multicast service between the first access network device and a multicast user plane function network element.

2. The method according to claim 1, further comprising:
updating, by the first access network device, a quantity of terminal devices that have joined the first multicast service via the first access network device.

3. The method according to claim 1, wherein the first information includes identification information of the first multicast service-uniquely identifying the first multicast service, wherein the identification information uniquely identifying the first multicast service includes a multicast service ID, a multicast service name, a multicast address, or a multicast group ID.

4. The method according to claim 1, wherein the first tunnel is a multicast session tunnel which is shared by terminal devices.

5. The communication method according to claim 1 further comprising preparing by the first access network device for the first terminal device, a resource for the handover, wherein the resource includes a forwarding tunnel, radio bearer configuration information needed by the first terminal device to receive service data via the first access network device, or an air interface resource configured by the first access network device for the first terminal device.

6. A communication method, comprising:
determining, by a first access network device, that a first terminal device is a last terminal device that receives data of a first multicast service via the first access network device in response to the first terminal device being in a handover preparation phase in which the first terminal device is handed over from the first access network device to a second access network device;
sending, by the first access network device, a message to an access and mobility management function network element, wherein the message includes first information, wherein the first information includes identification information of the first multicast service, a request usable to release a first tunnel, and information about the first tunnel, wherein the information about the first tunnel includes a tunnel endpoint identifier (TEID) uniquely identifying the first tunnel, and the first tunnel is usable for transmitting the data of the first multicast service between the first access network device and a multicast user plane function network element;
receiving, by the multicast user plane function network element, the first information; and
releasing, by the multicast user plane function network element, the first tunnel based on the receiving the first information.

7. The method according to claim 6, wherein the receiving the first information further includes:
updating, by the first access network device, a quantity of terminal devices that have joined the first multicast service via the first access network device.

8. The method according to claim 6, wherein the first information includes identification information of the first multicast service uniquely identifying the first multicast service, wherein the identification information uniquely identifying the first multicast service includes a multicast service ID, a multicast service name, a multicast address, or a multicast group ID.

9. The method according to claim 6, wherein the first tunnel is a multicast session tunnel which is shared by terminal devices.

10. The method according to claim 6 further comprising preparing by the first access network device for the first terminal device, a resource for the handover, wherein the resource includes a forwarding tunnel, radio bearer configuration information needed by the first terminal device to receive service data via the first access network device, or an air interface resource configured by the first access network device for the first terminal device.

11. The method according to claim 6 further comprising receiving by the first access network device, for preparing the first terminal device for the handover preparation phase, a measurement report of the first terminal device, and making a handover decision on the first terminal device based on the measurement report, where a decision result is handover; and the first access network device sends a handover request to the second access network device, and receives a handover request acknowledgement sent by the second access network device.

12. A communication system, comprising:
a first access network device configured to determine that a first terminal device is a last terminal device that receives data of a first multicast service via the first access network device in response to the first terminal device being in a handover preparation phase in which the first terminal device is handed over from the first access network device to a second access network device, and send a message to an access and mobility management function network element, wherein the message includes first information, wherein the first information includes identification information of the first multicast service, a request usable to release a first tunnel, and information about the first tunnel, wherein the information about the first tunnel includes a tunnel endpoint identifier (TEID) uniquely identifying the first tunnel, and the first tunnel is usable for transmitting the data of the first multicast service between the first access network device and a multicast user plane function network element.

13. The communication system according to claim 12, wherein the first access network device is further configured to update a quantity of terminal devices that have joined the first multicast service via the first access network device.

14. The communication system according to claim 12, wherein the first information includes identification information of the first multicast service uniquely identifying-the first multicast service, wherein the identification information uniquely identifying the first multicast service includes a multicast service ID, a multicast service name, a multicast address, or a multicast group ID.

15. The communication system according to claim 12, wherein the first tunnel is a multicast session tunnel which is shared by terminal devices.

16. A communication apparatus, comprising:

a memory storing computer-readable instructions; and at least one processor connected to the memory, wherein the at least one processor is configured to execute the computer-readable instructions to perform operations including:

determining that a first terminal device is a last terminal device that receives data of a first multicast service via a first access network device in response to the first terminal device being in a handover preparation phase in which the first terminal device is handed over from the first access network device to a second access network device; and sending a message to an access and mobility management function network element, wherein the message includes first information, wherein the first information includes identification information of the first multicast service, a request usable to release a first tunnel, and information about the first tunnel, wherein the request includes information about the first tunnel including a tunnel endpoint identifier (TEID) uniquely identifying the first tunnel, and the first tunnel is useable for transmitting the data of the first multicast service between the first access network device and a multicast user plane function network element.

17. The communication apparatus according to claim 16, wherein the at least one processor is further configured to update a quantity of terminal devices that have joined the first multicast service via the first access network device.

18. The communication apparatus according to claim 16, wherein the first information includes identification information of the first multicast service uniquely identifying-the first multicast service, wherein the identification information uniquely identifying the first multicast service includes a multicast service ID, a multicast service name, a multicast address, or a multicast group ID.

19. The communication apparatus according to claim 16, wherein the first tunnel is a multicast session tunnel which is shared by terminal devices.

20. The communication apparatus according to claim 16, wherein the at least one processor is further configured to send a message to an access and mobility management function network element, wherein the message includes the first information.

* * * * *